United States Patent [19]

Curley et al.

[11] 4,042,914

[45] Aug. 16, 1977

[54] MICROPROGRAMMED CONTROL OF FOREIGN PROCESSOR CONTROL FUNCTIONS

[75] Inventors: John L. Curley, Sudbury; C. William Dawson, East Bridgewater; Arthur A. Parmet, Waltham; Donald R. Taylor, Framingham, all of Mass.

[73] Assignee: Honeywell Information Systems Inc., Waltham, Mass.

[21] Appl. No.: 687,282

[22] Filed: May 17, 1976

[51] Int. Cl.² .................. G06F 9/16; G06F 16/16; G06F 15/38; G06F 15/18

[52] U.S. Cl. .................................................. 364/200

[58] Field of Search .................. 340/172.5; 445/1

[56] References Cited

U.S. PATENT DOCUMENTS

| | | | |
|---|---|---|---|
| 3,374,466 | 8/1968 | Hanf et al. | 340/172.5 |
| 3,544,969 | 12/1970 | Rakoczi et al. | 340/172.5 |
| 3,618,045 | 11/1971 | Campbell et al. | 340/172.5 |
| 3,631,405 | 12/1971 | Hoff et al. | 340/172.5 |
| 3,698,007 | 10/1972 | Malcolm et al. | 340/172.5 |
| 3,713,107 | 1/1973 | Barsamian | 340/172.5 |
| 3,721,961 | 3/1973 | Edstrom et al. | 340/172.5 |
| 3,760,365 | 9/1973 | Kurtzberg et al. | 340/172.5 |
| 3,766,532 | 10/1973 | Liebel | 340/172.5 |
| 3,781,807 | 12/1973 | Saltini | 340/172.5 |
| 3,811,114 | 5/1974 | Lemay et al. | 340/172.5 |
| 3,891,974 | 6/1975 | Coulter et al. | 340/172.5 |
| 3,909,802 | 9/1975 | Cassarino et al. | 340/172.5 |
| 3,911,406 | 10/1975 | McLaughlin et al. | 340/172.5 |
| 3,932,843 | 1/1976 | Trelut | 340/172.5 |
| 3,938,098 | 2/1976 | Garlic | 340/172.5 |
| 3,955,180 | 5/1976 | Hirtle | 340/172.5 |
| 3,969,723 | 7/1976 | Kennicott | 340/172.5 |
| 3,976,977 | 8/1976 | Porter et al. | 340/172.5 |
| 3,984,817 | 10/1976 | Barbour et al. | 340/172.5 |

*Primary Examiner*—Gareth D. Shaw
*Assistant Examiner*—Jan E. Rhoads
*Attorney, Agent, or Firm*—Faith F. Driscoll; Nicholas Prasinos; Ronald T. Reiling

[57] ABSTRACT

A host system includes a microprogrammed processing unit which couples a foreign processing unit to the main memory of the host system. The microprogrammed processing unit also couples to an interface connected to the foreign processor. During operation, the host processor transfers a channel command to the microprogrammed processing unit which is operative under firmware control to perform the various control functions required for initiating a particular job. In this manner, the various parameters and information necessary to dispatch a job of the foreign processor is accomplished expeditiously under the firmware control in response to commands issued by the host processor.

39 Claims, 20 Drawing Figures

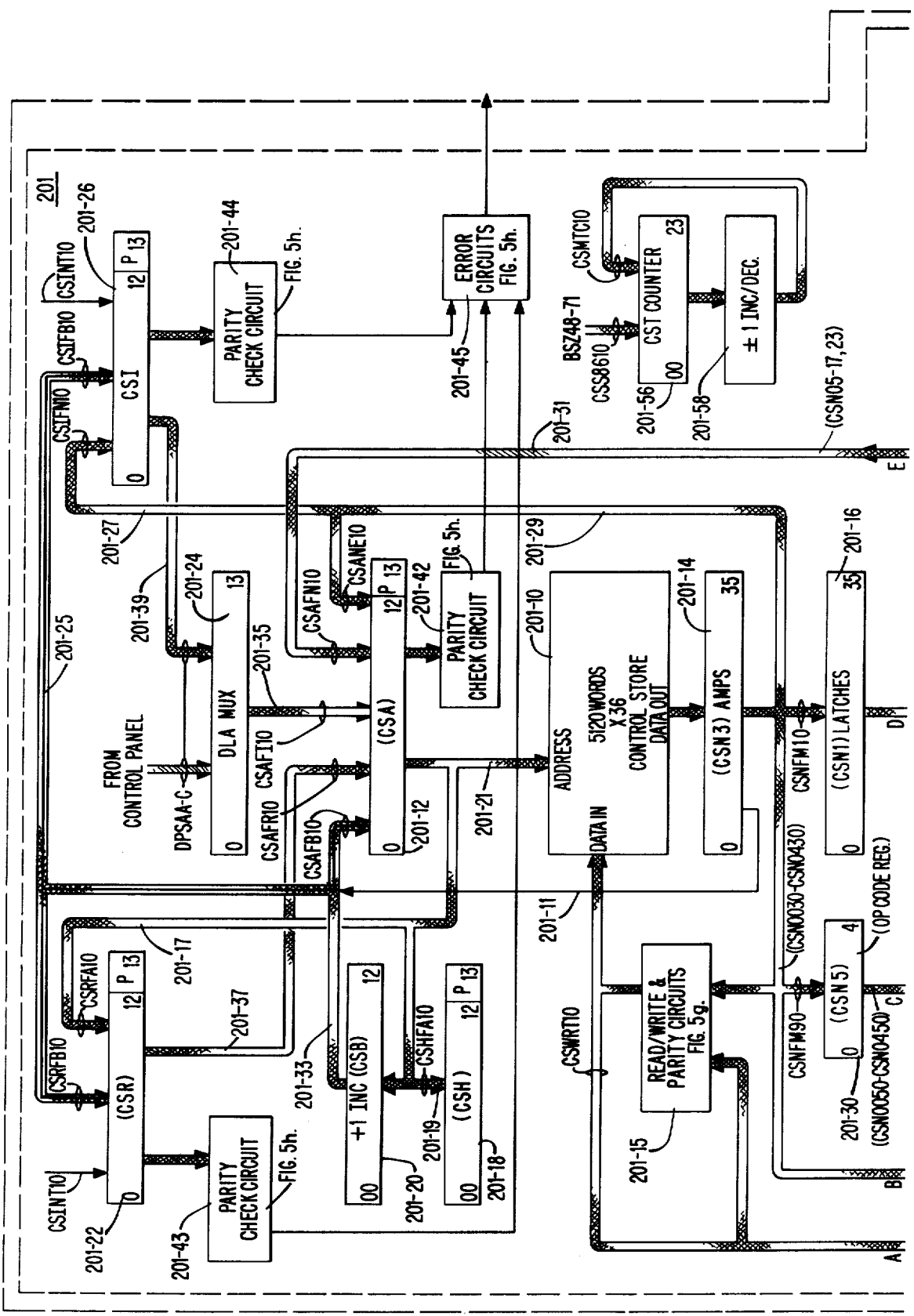
Fig. 2 (Sheet 1 of 2).

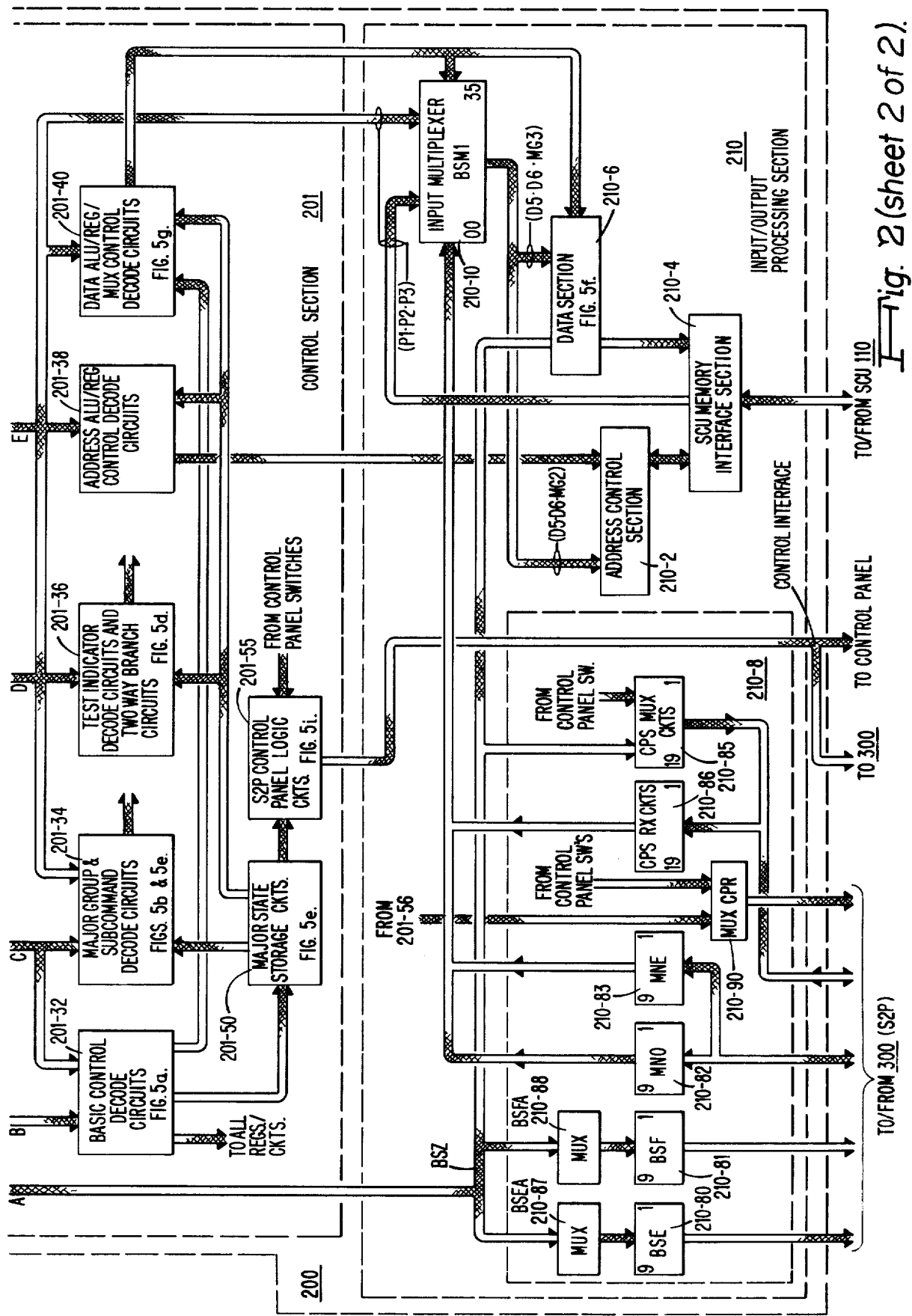
Fig. 2 (sheet 2 of 2).

MICROINSTRUCTION FORMATS

| MAJOR GROUP | μ INST. | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|---|---|---|---|---|---|---|---|---|---|---|---|---|---|---|---|---|---|
| | BIT → | OP CODE | | | | OPERANDS | | | | | | | | | | | | | | | | | | | | | | | | | | CHECK BITS | | | | |
| | | | | | | | | | | | | | | | | | | | | | | | | | | | | | | | | PI | P0 | P1 | P2 | P3 |
| 0 | NOOP | 0 | 0 | 0 | 0 | | | | | | | | | | | | | | | | | | | | | | | | | | | | | | | | |
| 1 | MMRO | 0 | 0 | 0 | 1 | 0 | K0 | K1 | K2 | K3 | K4 | Z1 | Z2 | Z3 | Z4 | 0 | 0 | 0 | R | PG | LIM | S6 | S6 | 0 | 0 | S7 | S7 | S8 | S8 | S8 | | | | | | |
| 2 | ARCA | 0 | 0 | 1 | 0 | 0 | M1 | M2 | M3 | M4 | M5 | CI | 0 | D1 | D2 | 0 | P1 | P2 | P3 | D5 | D6 | S6 | S6 | D7 | D8 | S7 | S7 | S8 | S8 | S8 | | | | | | |
| 2 | ARCL | 0 | 0 | 1 | 0 | 1 | M1 | M2 | M3 | M4 | M5 | 0 | D1 | D2 | 0 | 0 | P1 | P2 | P3 | D5 | D6 | S6 | S6 | D7 | D8 | S7 | S7 | S8 | S8 | S8 | | | | | | |
| 3 | DRCA | 0 | 0 | 1 | 1 | 0 | M1 | M2 | M3 | M4 | M5 | CI | D1 | D2 | D3 | D4 | P1 | P2 | P3 | D5 | D6 | P4 | P5 | P6 | D7 | D8 | S7 | S7 | S8 | S8 | S8 | | | | | | |
| 3 | DRCL | 0 | 0 | 1 | 1 | 1 | M1 | M2 | M3 | M4 | M5 | 0 | D1 | D2 | D3 | D4 | P1 | P2 | P3 | D5 | D6 | P4 | P5 | P6 | D7 | D8 | S7 | S7 | S8 | S8 | S8 | | | | | | |
| | LDC | 0 | 1 | 0 | 0 | 0 | C23 ••• C26 | | | | | C1 | C2 | C3 | C4 | C5 | C6 | C7 | C8 | C9 | C10 | C11 | C12 | C13 | C14 | C15 | C16 | C17 | C18 | C19 ••• C22 | | | | | | |
| 4 | DCK1 | 0 | 1 | 0 | 0 | 1 | S1 | S1 | S1 | S2 | S2 | S2 | S3 | S3 | S3 | S4 | S4 | S4 | S5 | S5 | S5 | S6 | S6 | 0 | 0 | S7 | S7 | S8 | S8 | S8 | | | | | | | |
| 4 | DCK2 | 0 | 1 | 0 | 1 | 0 | S9 | S9 | S9 | S10 | S10 | S10 | S11 | S11 | S11 | S12 | S12 | S12 | S13 | S13 | S13 | S6 | S6 | 0 | 0 | S7 | S7 | S8 | S8 | S8 | | | | | | | |
| | CBOTN | 0 | 1 | 0 | 1 | 1 | A0 | A1 | A2 | A3 | A4 | A5 | A6 | A7 | A8 | A9 | A10 | A11 | 0 | 0 | 0 | T1 | T1 | PA | T2 | T2 | T2 | T2 | T2 | 0 | | | | | | | |
| | CBOTE | 0 | 1 | 1 | 0 | 0 | A0 | A1 | A2 | A3 | A4 | A5 | A6 | A7 | A8 | A9 | A10 | A11 | 0 | 0 | 0 | T1 | T1 | PA | T2 | T2 | T2 | T2 | T2 | 0 | | | | | | | |
| 5 | CBRTN | 0 | 1 | 1 | 0 | 1 | A0 | A1 | A2 | A3 | A4 | A5 | A6 | A7 | A8 | A9 | A10 | A11 | 0 | 0 | 0 | T1 | T1 | PA | T2 | T2 | T2 | T2 | T2 | 0 | | | | | | | |
| | CBRTE | 0 | 1 | 1 | 1 | 0 | A0 | A1 | A2 | A3 | A4 | A5 | A6 | A7 | A8 | A9 | A10 | A11 | 0 | 0 | 0 | T1 | T1 | PA | T2 | T2 | T2 | T2 | T2 | 0 | | | | | | | |
| 6 | LCSIK | 0 | 1 | 1 | 1 | 1 | A0 | A1 | A2 | A3 | A4 | A5 | A6 | A7 | A8 | A9 | A10 | A11 | A12 | 0 | 0 | S6 | S6 | 0 | 0 | S7 | S7 | S8 | S8 | S8 | | | | | | | |
| | UCBK | 1 | 0 | 0 | 0 | 0 | A0 | A1 | A2 | A3 | A4 | A5 | A6 | A7 | A8 | A9 | A10 | A11 | A12 | 0 | 0 | S6 | S6 | 0 | 0 | S7 | S7 | S8 | S8 | S8 | | | | | | | |
| | UBRK | 1 | 0 | 0 | 0 | 1 | A0 | A1 | A2 | A3 | A4 | A5 | A6 | A7 | A8 | A9 | A10 | A11 | A12 | 0 | 0 | S6 | S6 | 0 | 0 | S7 | S7 | S8 | S8 | S8 | | | | | | | |
| | RTNFI | 1 | 0 | 0 | 1 | 0 | 0 | | | | | | | | | | | | 0 | 0 | 1 | S6 | S6 | 0 | 0 | S7 | S7 | S8 | S8 | S8 | | | | | | | |
| 7 | RTFIR | 1 | 0 | 0 | 1 | 1 | 0 | | | | | | | | | | | | 0 | 0 | 1 | S6 | S6 | 0 | 0 | S7 | S7 | S8 | S8 | S8 | | | | | | | |
| | RTNER | 1 | 0 | 1 | 0 | 0 | 0 | | | | | | | | | | | | 0 | 1 | 0 | S6 | S6 | 0 | 0 | S7 | S7 | S8 | S8 | S8 | | | | | | | |
| | RTFRR | 1 | 0 | 1 | 0 | 1 | 0 | | | | | | | | | | | | 0 | 1 | 0 | S6 | S6 | 0 | 0 | S7 | S7 | S8 | S8 | S8 | | | | | | | |
| | CSMR | 1 | 0 | 1 | 1 | 0 | 0 | | | | | | | | | | | | 0 | 0 | 1 | S6 | S6 | 0 | 1 | S7 | S7 | S8 | S8 | S8 | | | | | | | |
| | CSMW | 1 | 0 | 1 | 1 | 1 | 0 | | | | | | | | | | | | 0 | 0 | 1 | S6 | S6 | 0 | 1 | S7 | S7 | S8 | S8 | S8 | | | | | | | |

Fig. 3.

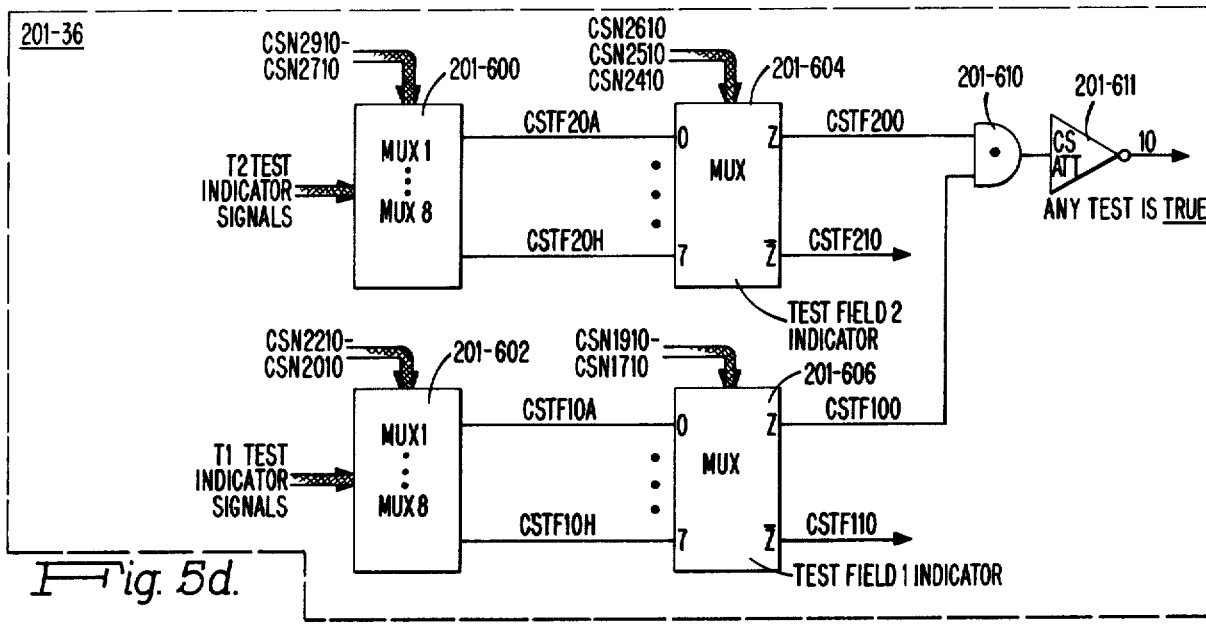
Fig. 5d.
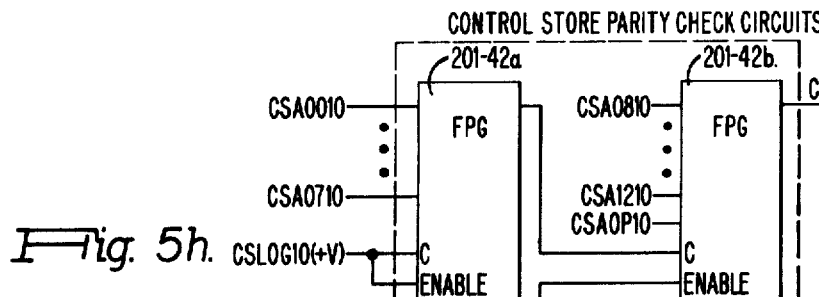
Fig. 5h.
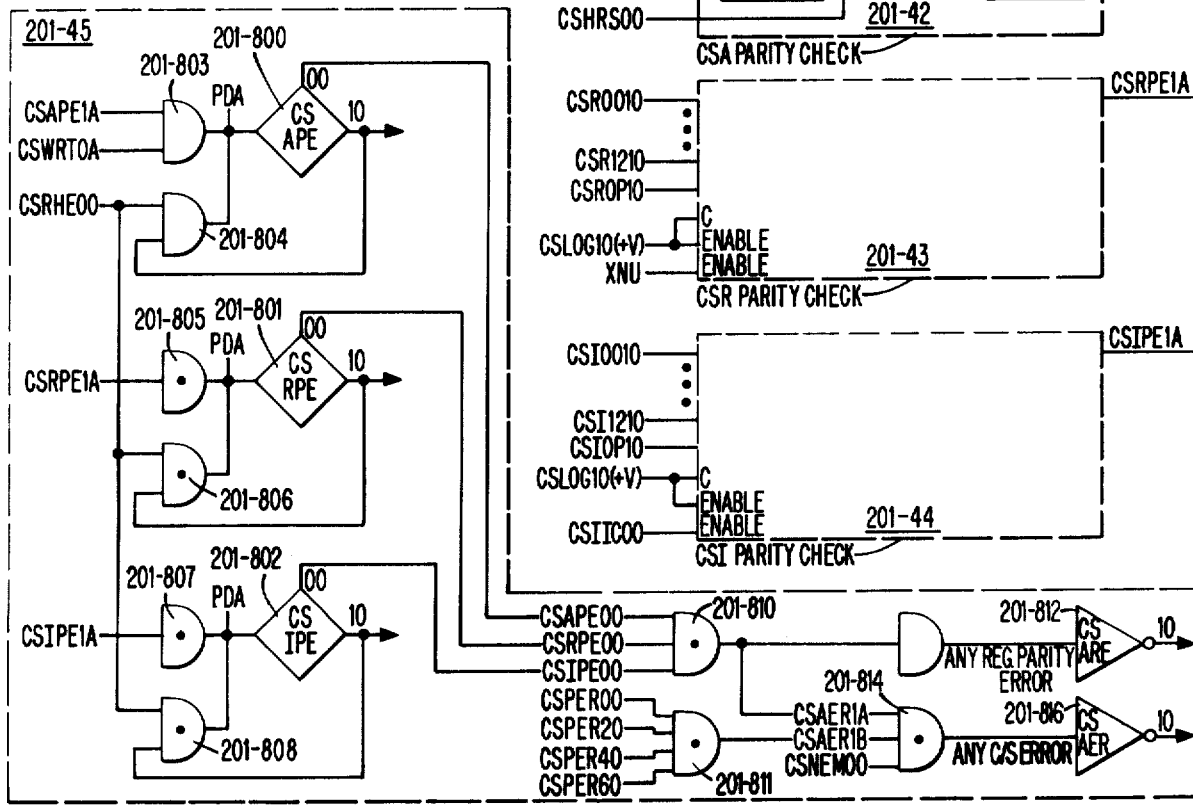

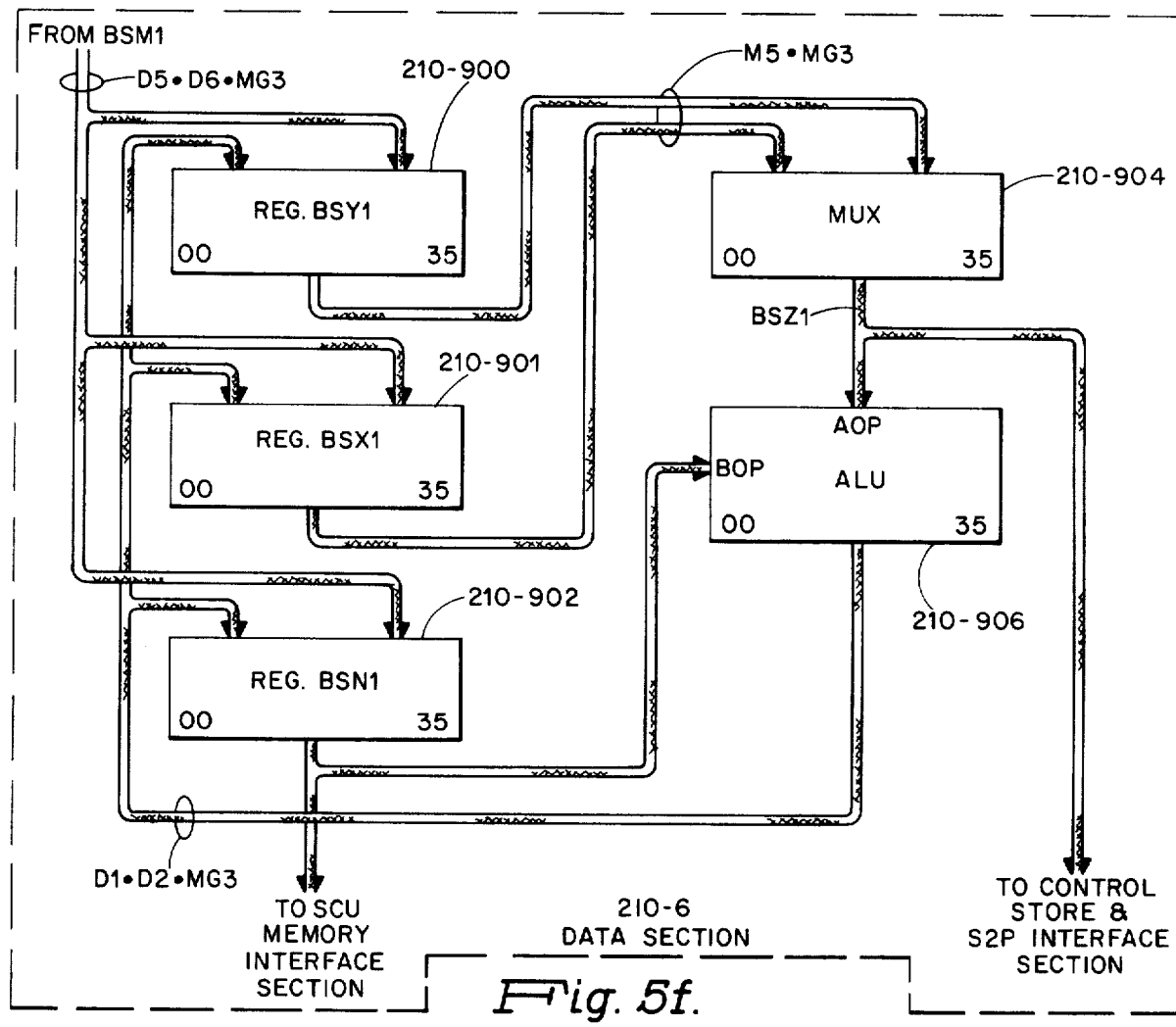
Fig. 5f.
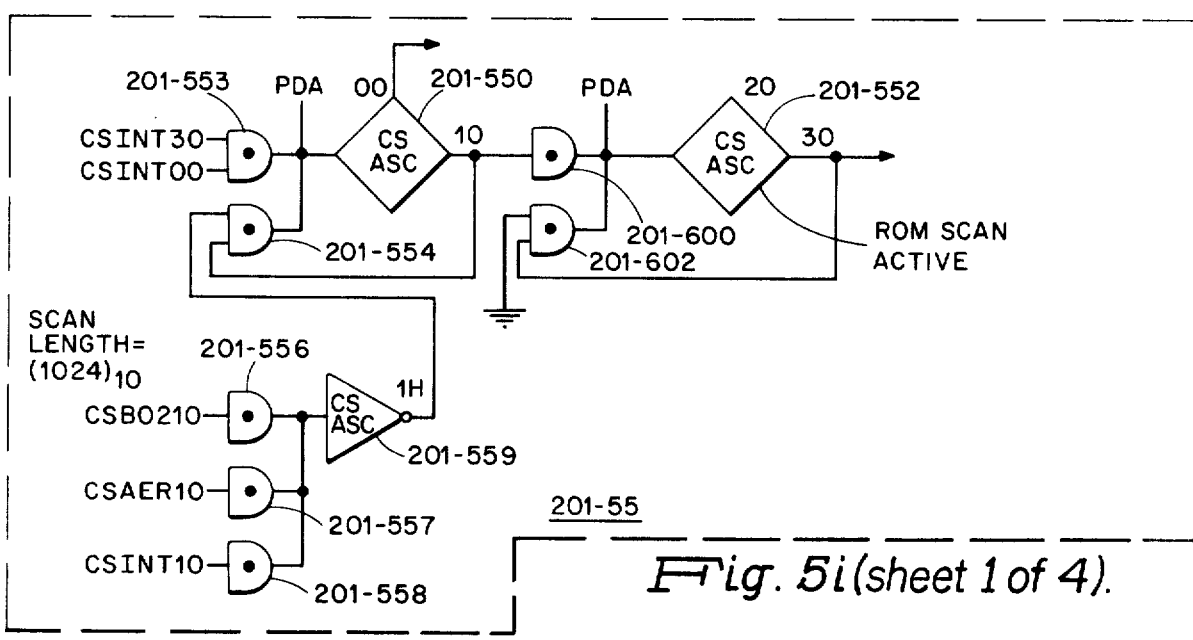
Fig. 5i (sheet 1 of 4).

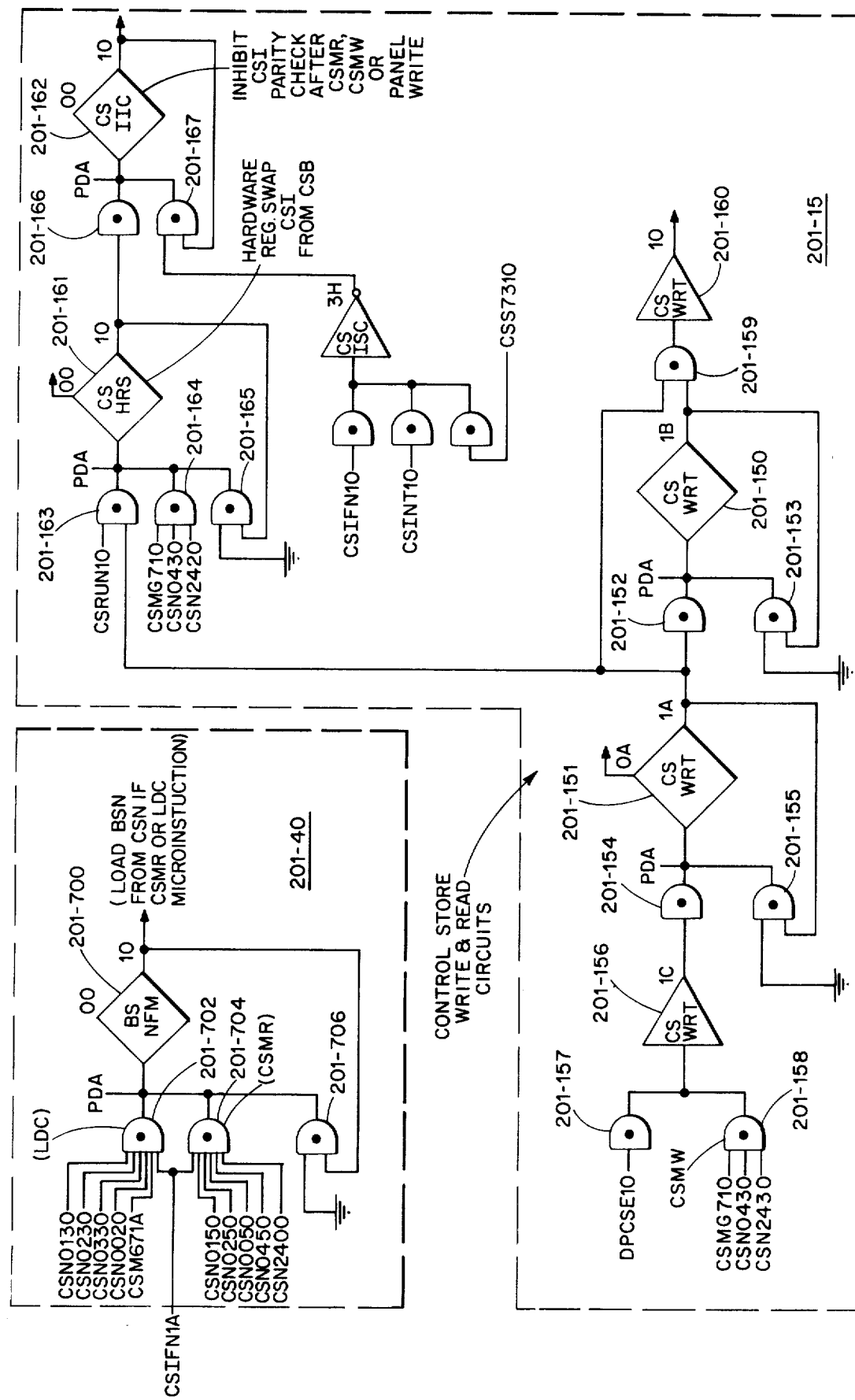
Fig. 5g. (sheet 1 of 2)

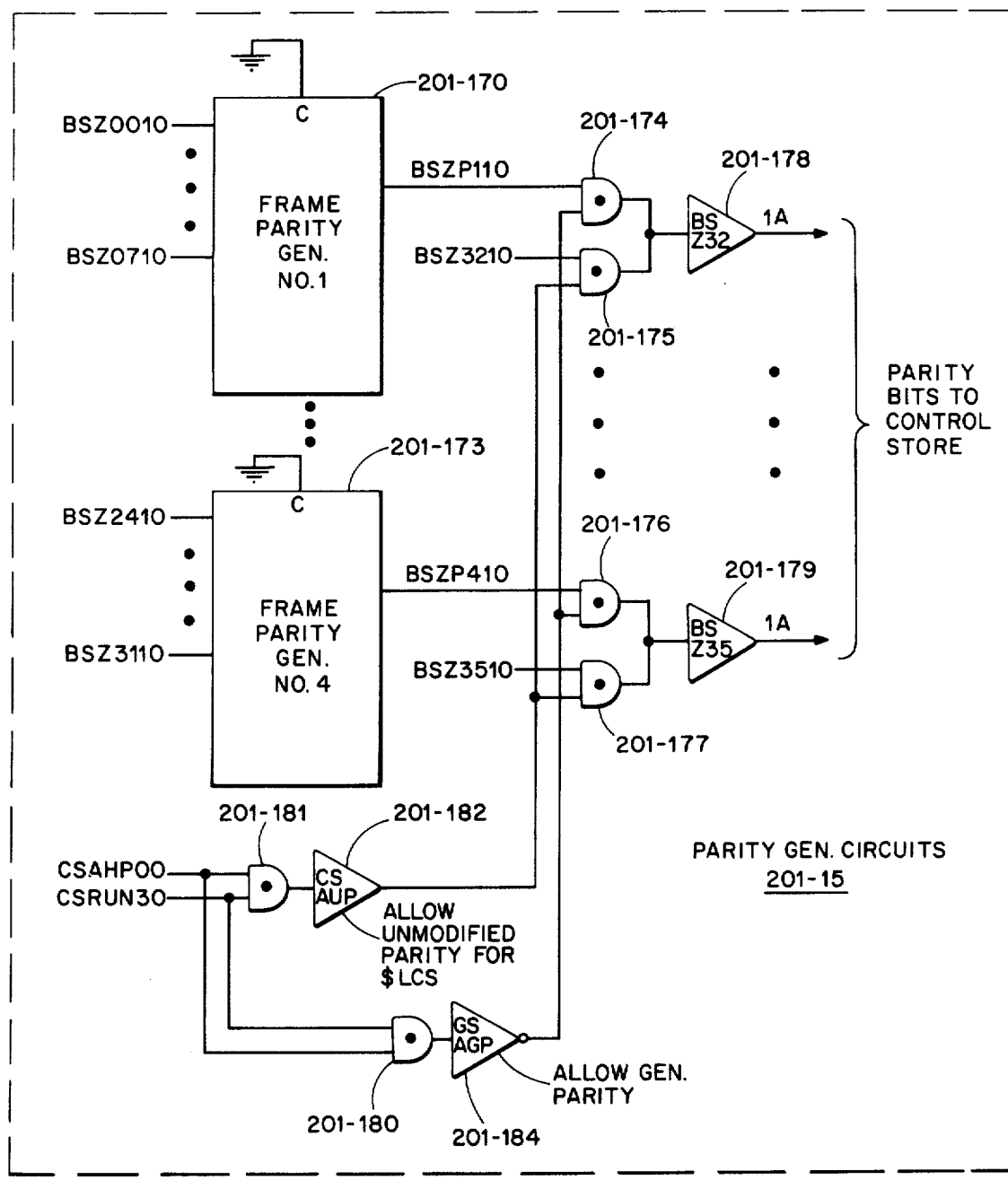
Fig. 5g. (sheet 2 of 2)

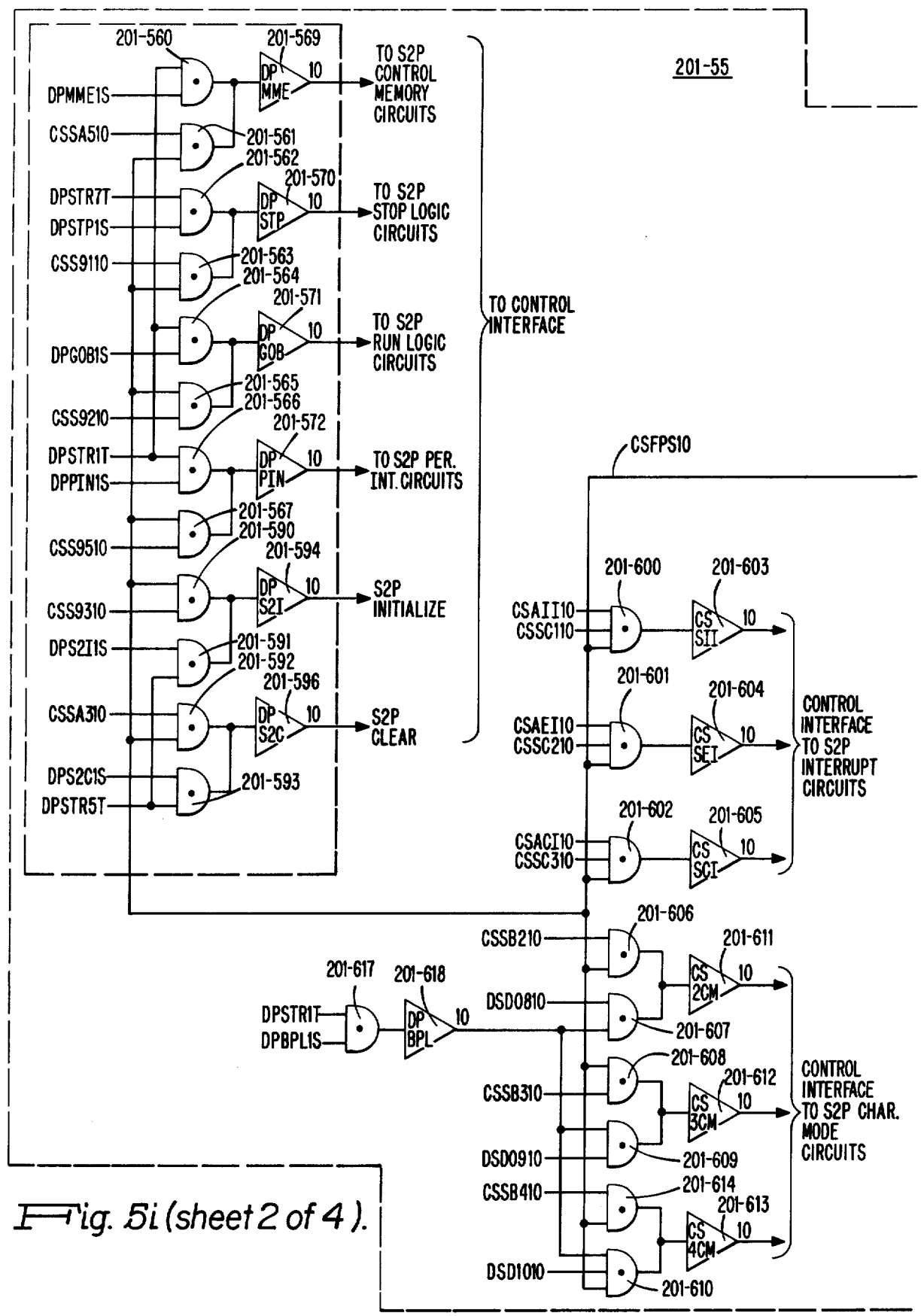
Fig. 5i (sheet 2 of 4).

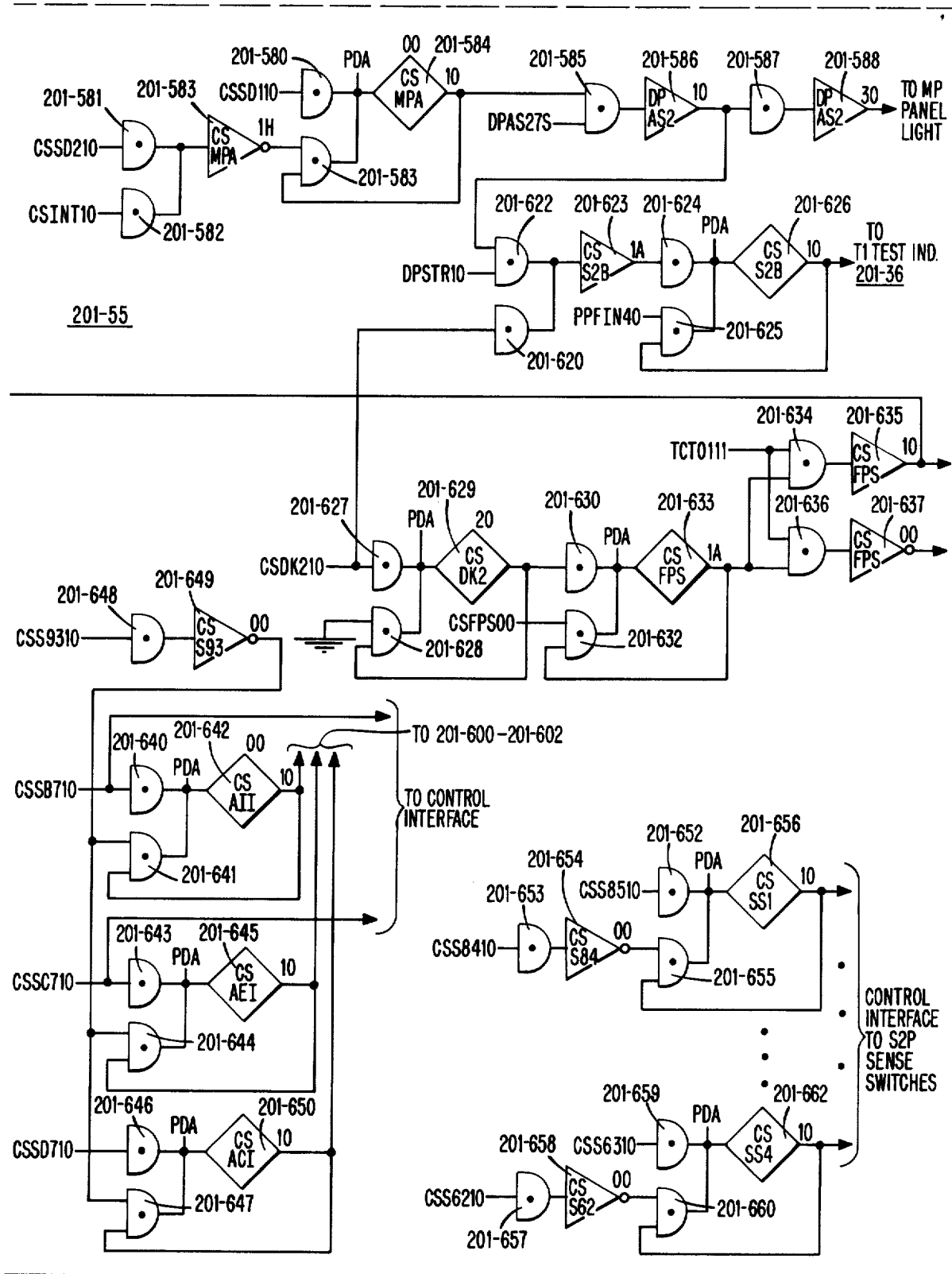
Fig. 5i (sheet 3 of 4).

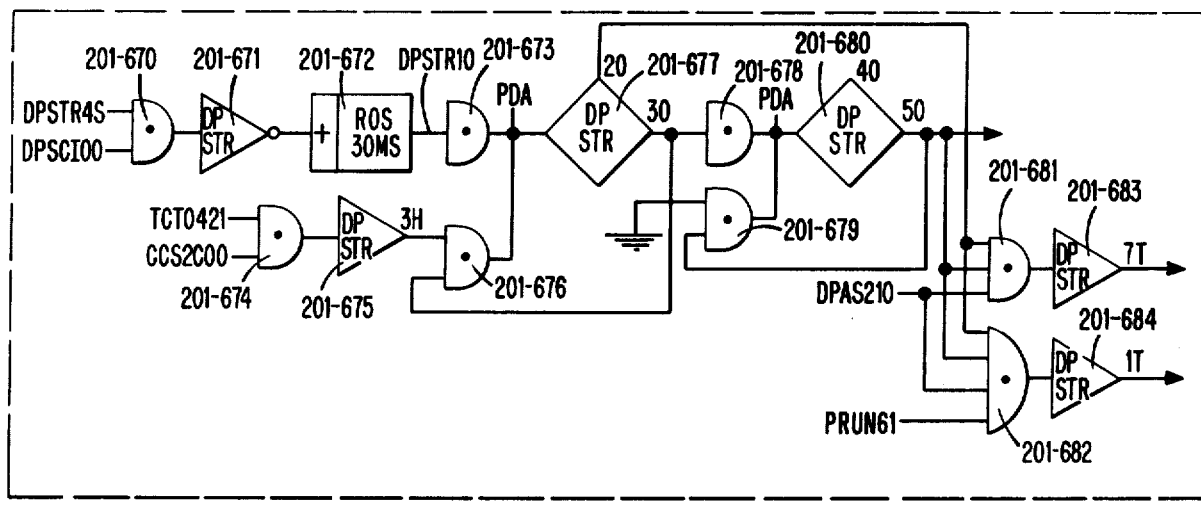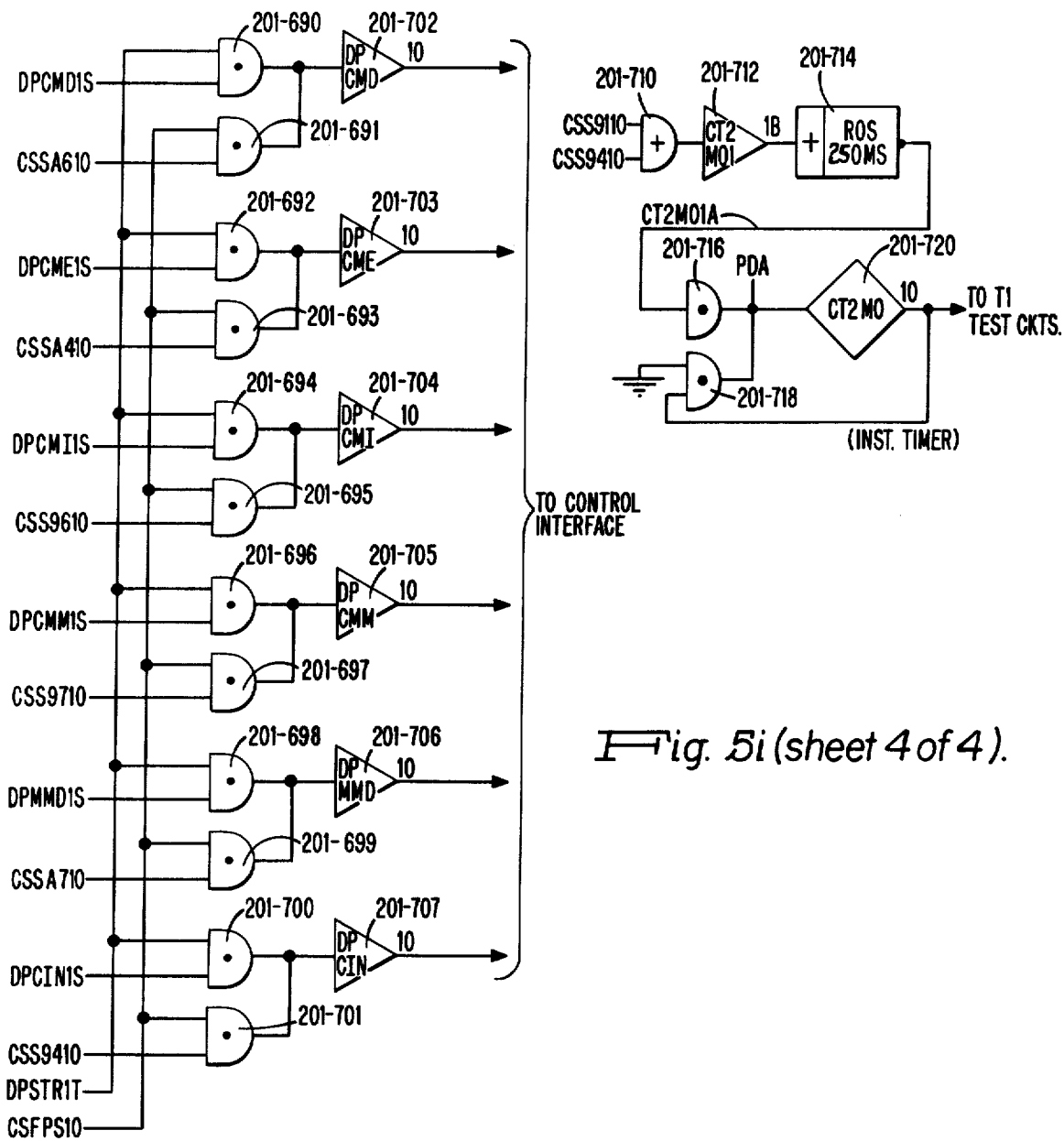
Fig. 5i (sheet 4 of 4).

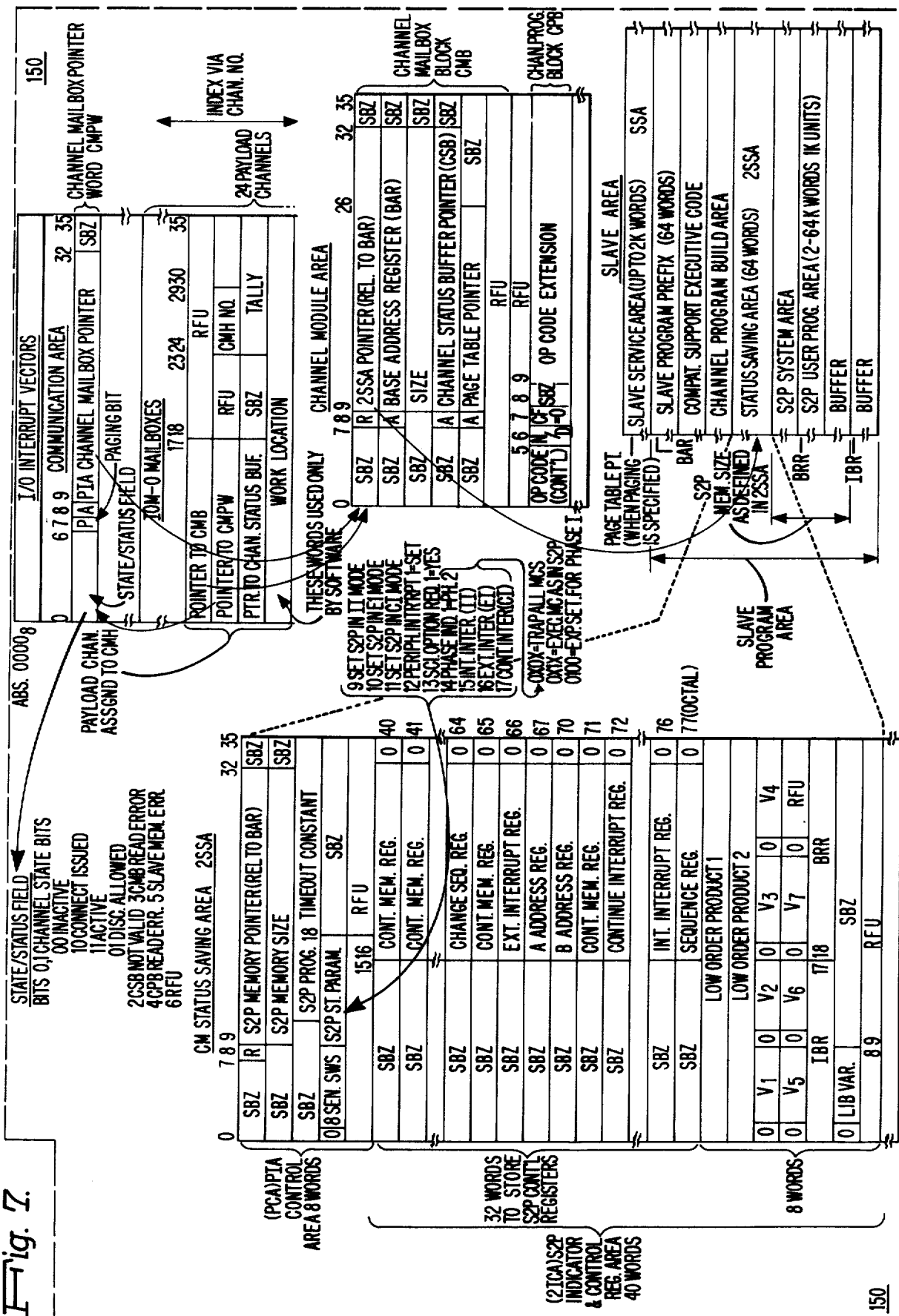
Fig. Z.

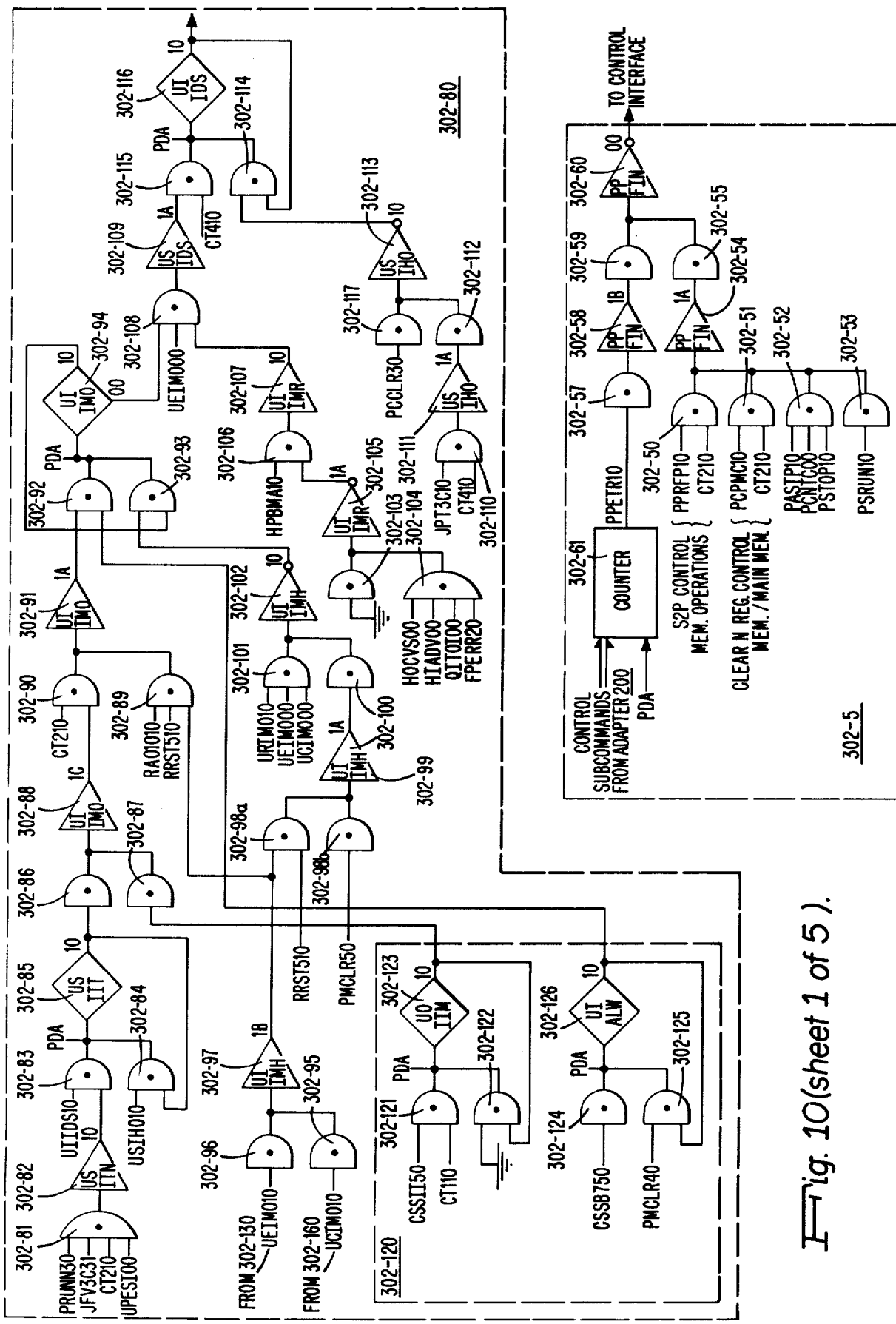
Fig. 10 (sheet 1 of 5).

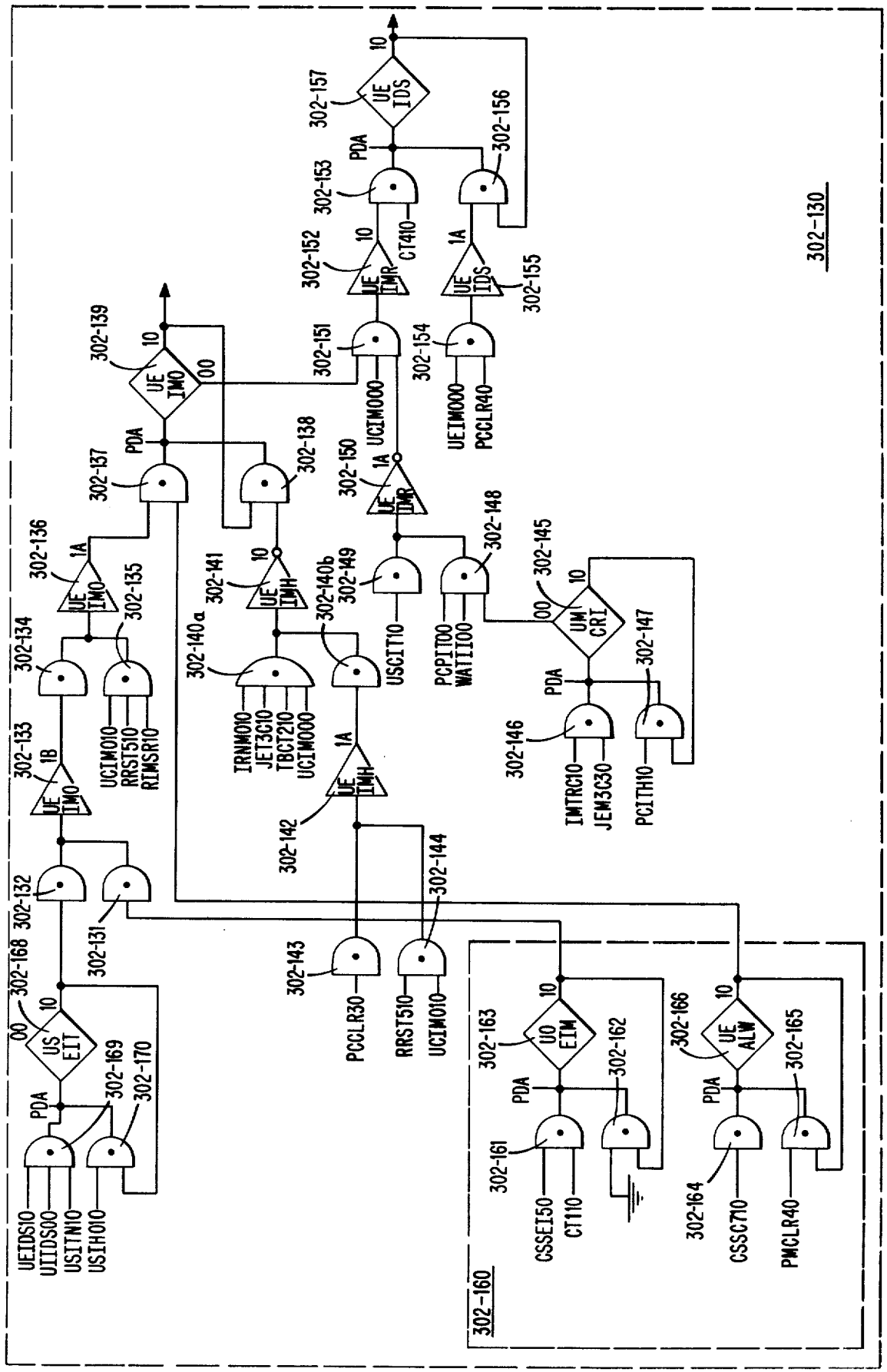
Fig. 10(sheet 2 of 5).

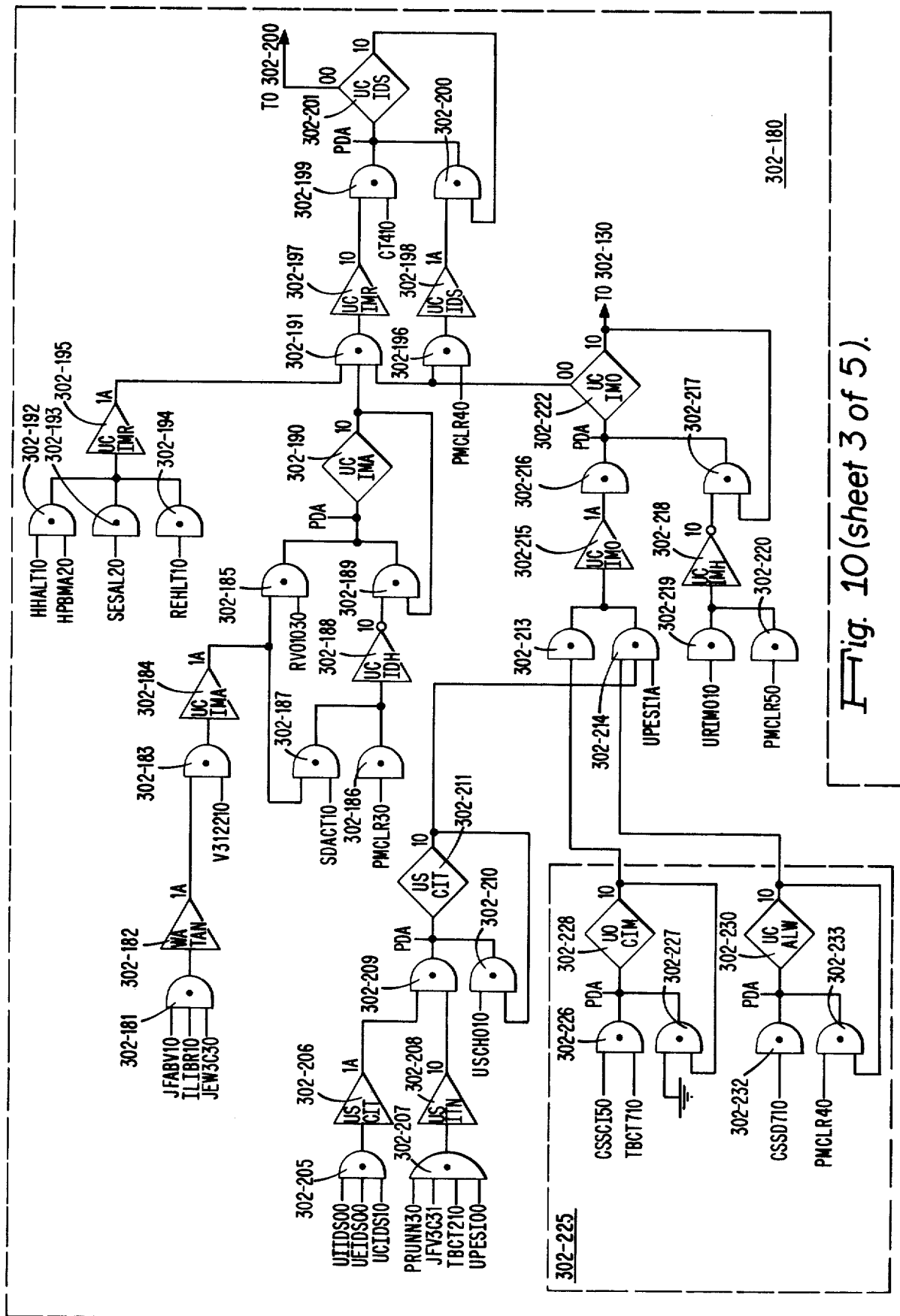
Fig. 10 (sheet 3 of 5).

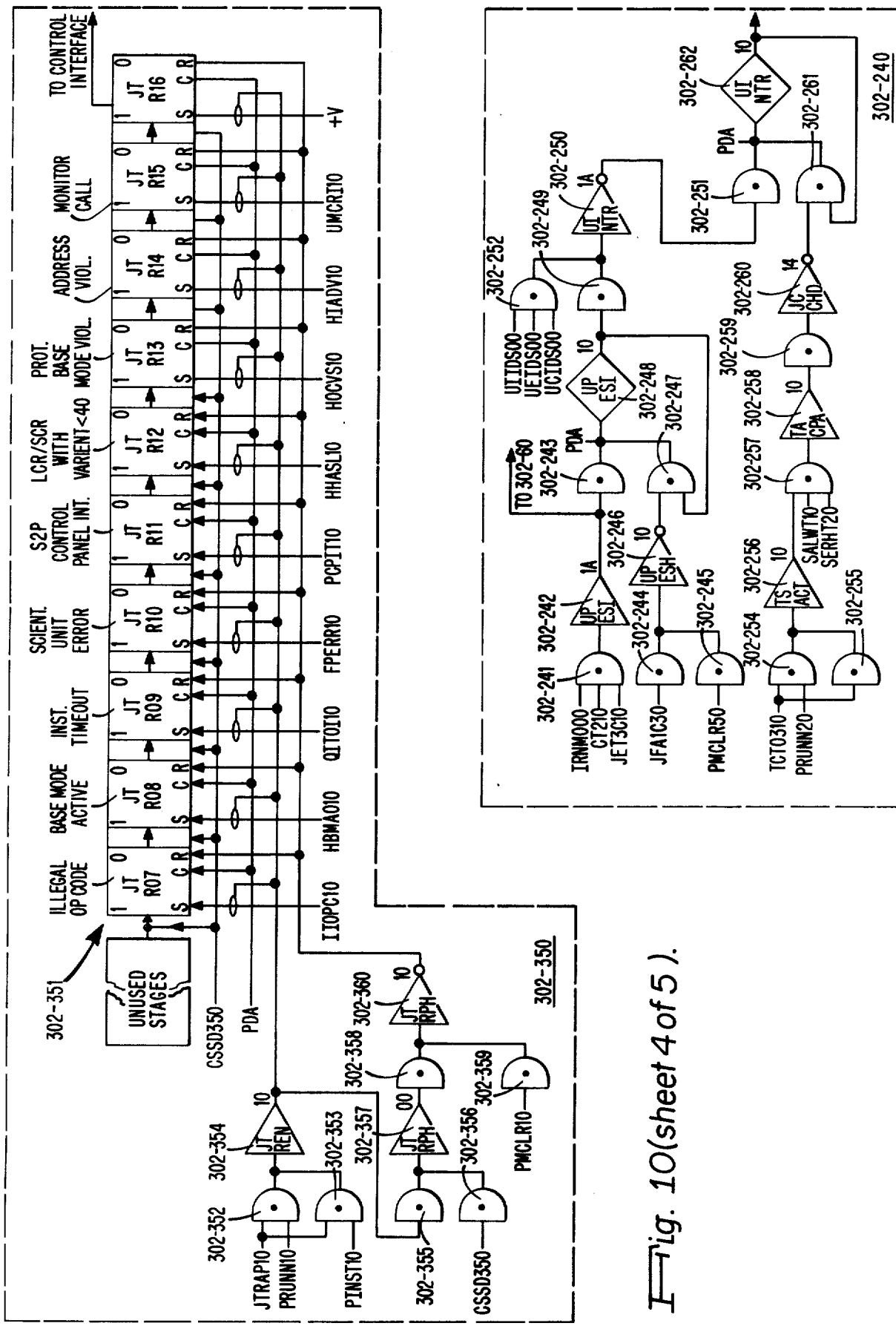
Fig. 10 (sheet 4 of 5).

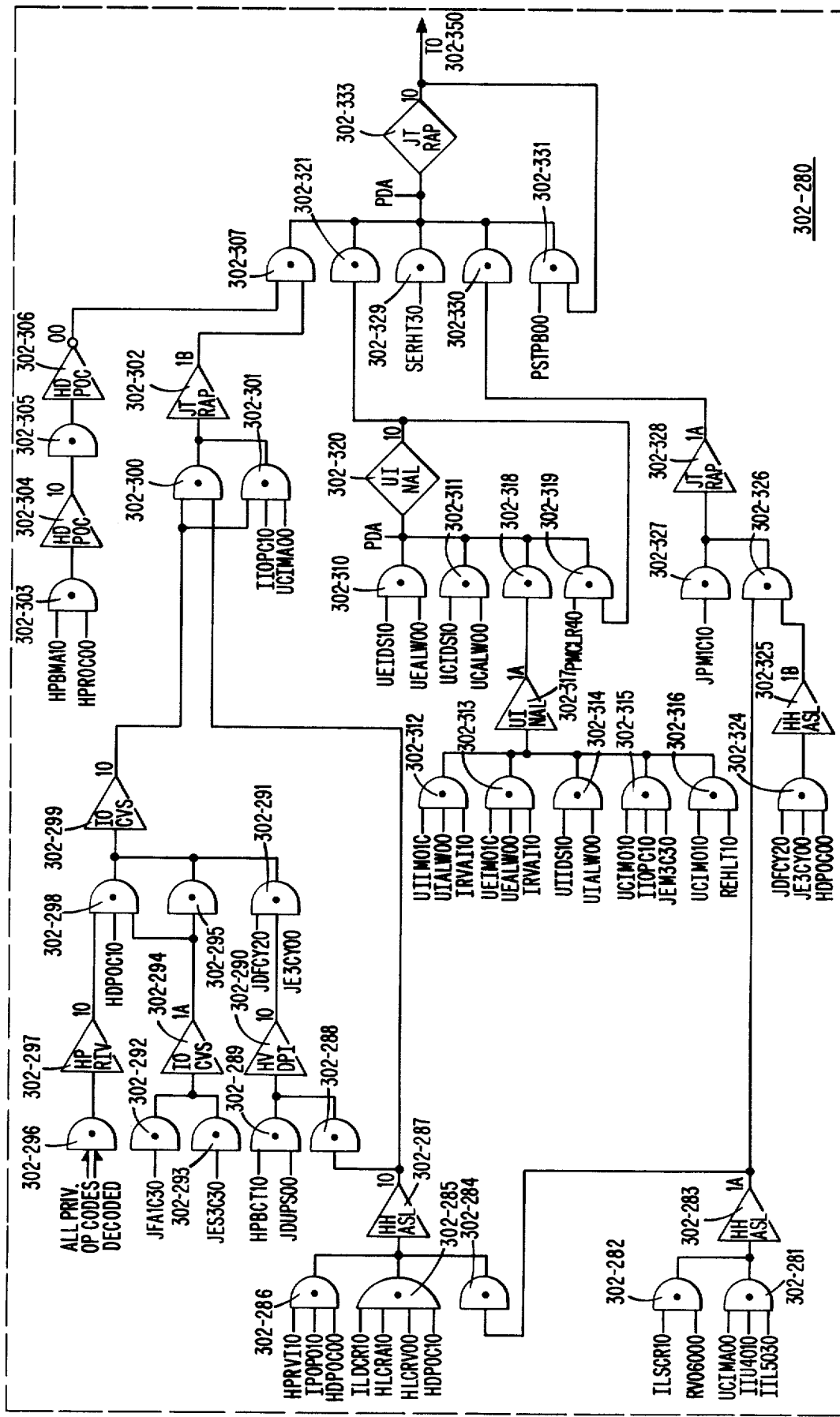
Fig. 10 (sheet 5 of 5).

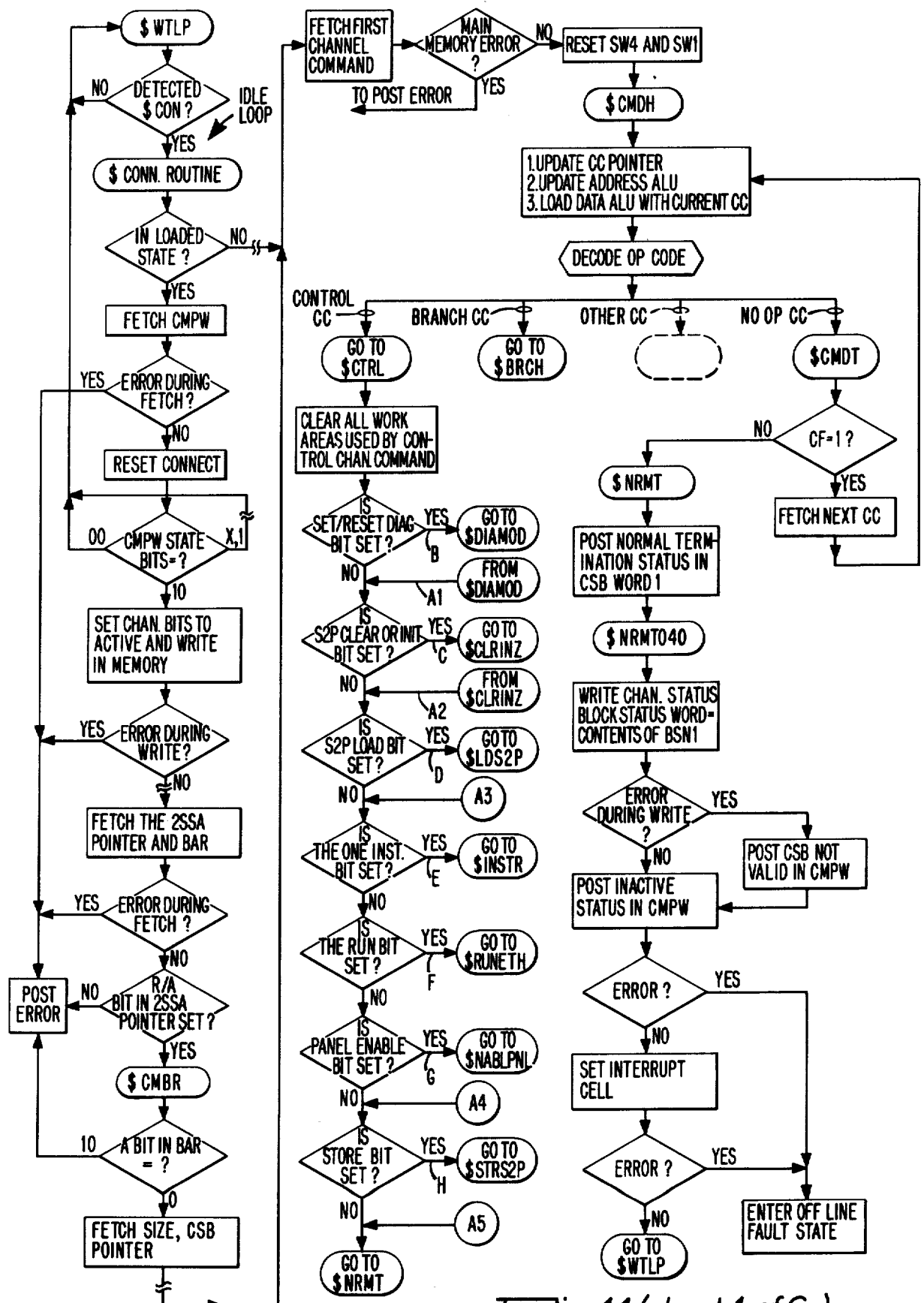
Fig. 11 (sheet 1 of 6).

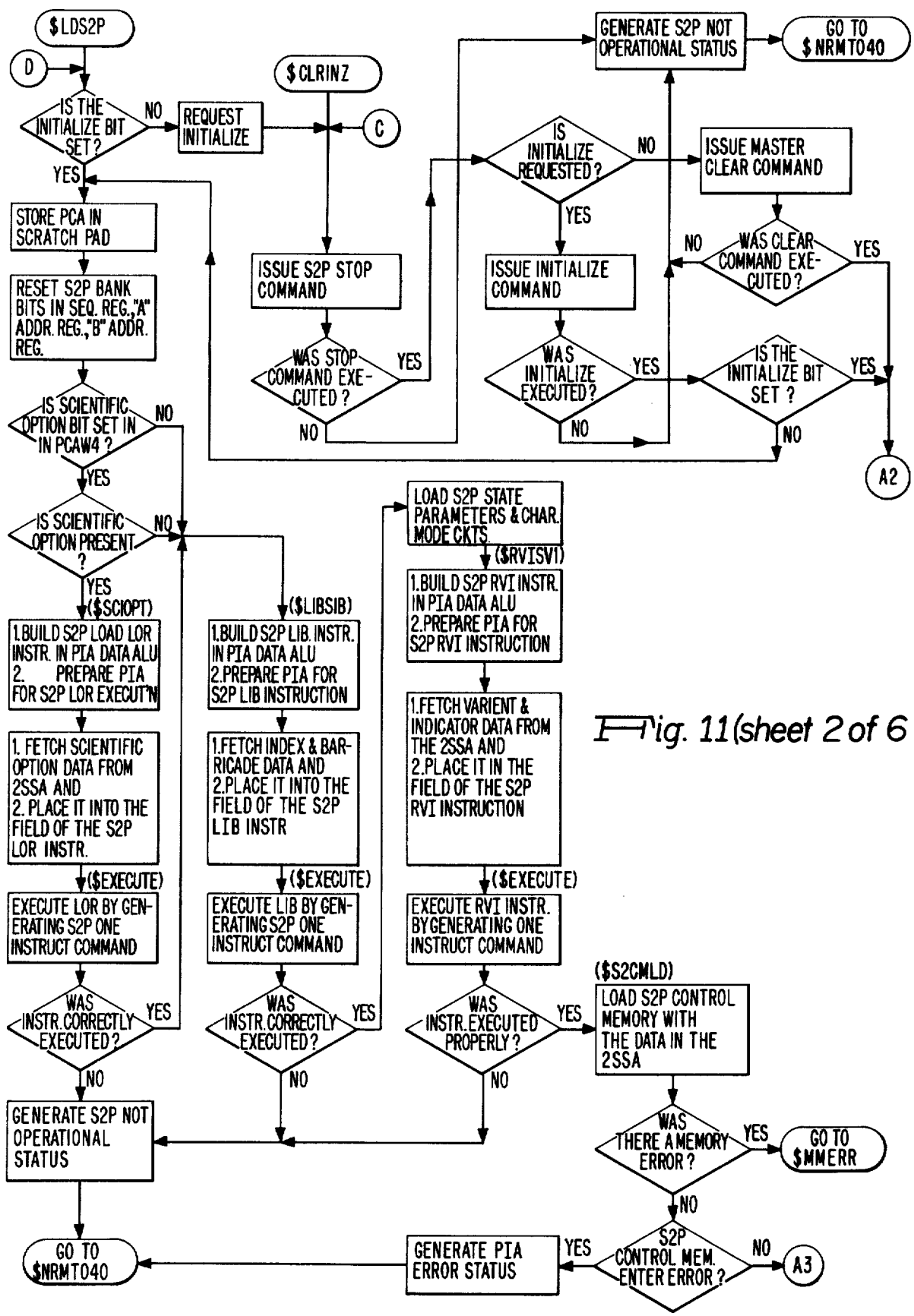
Fig. 11 (sheet 2 of 6)

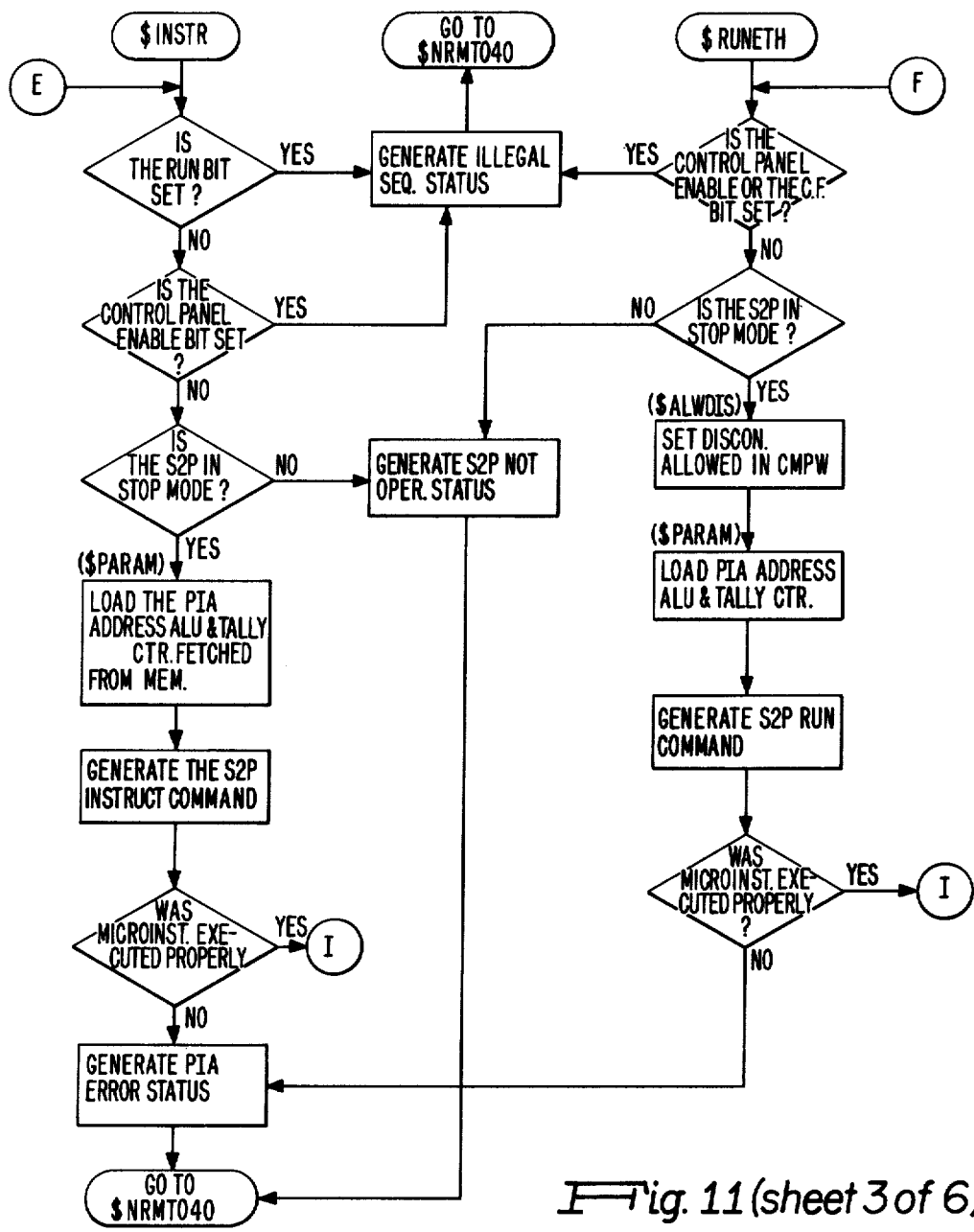
Fig. 11 (sheet 3 of 6).

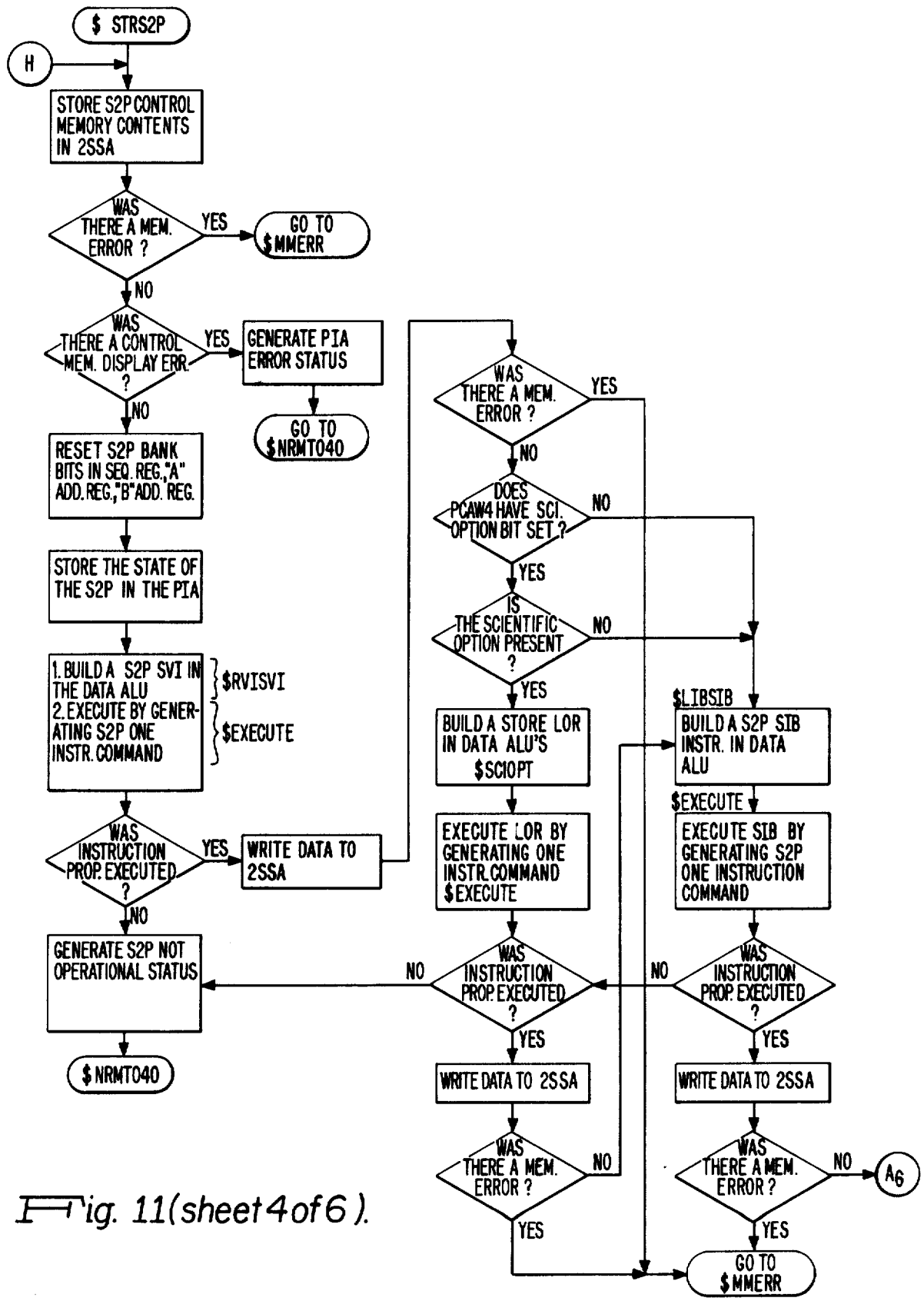
Fig. 11 (sheet 4 of 6).

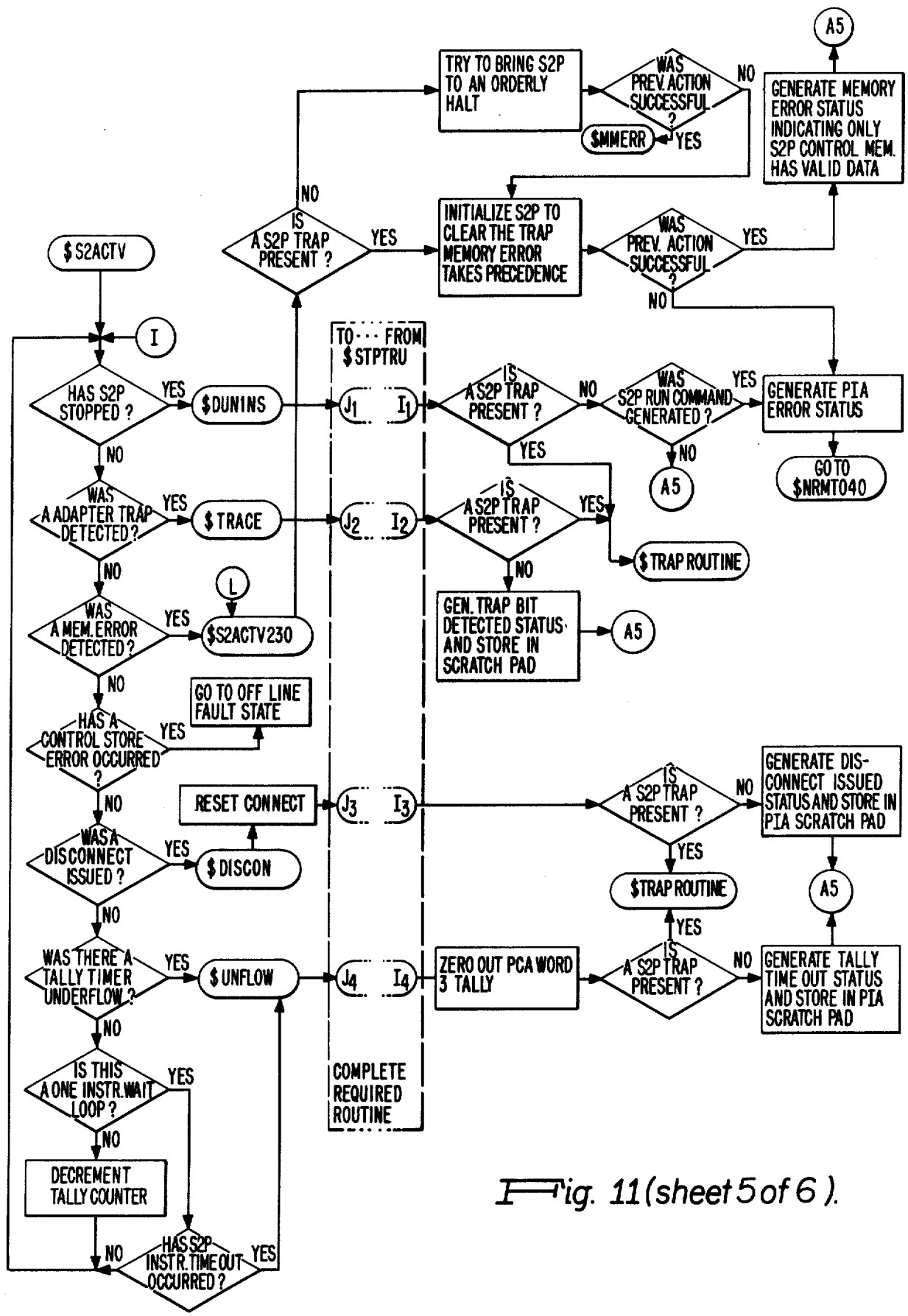
Fig. 11 (sheet 5 of 6).

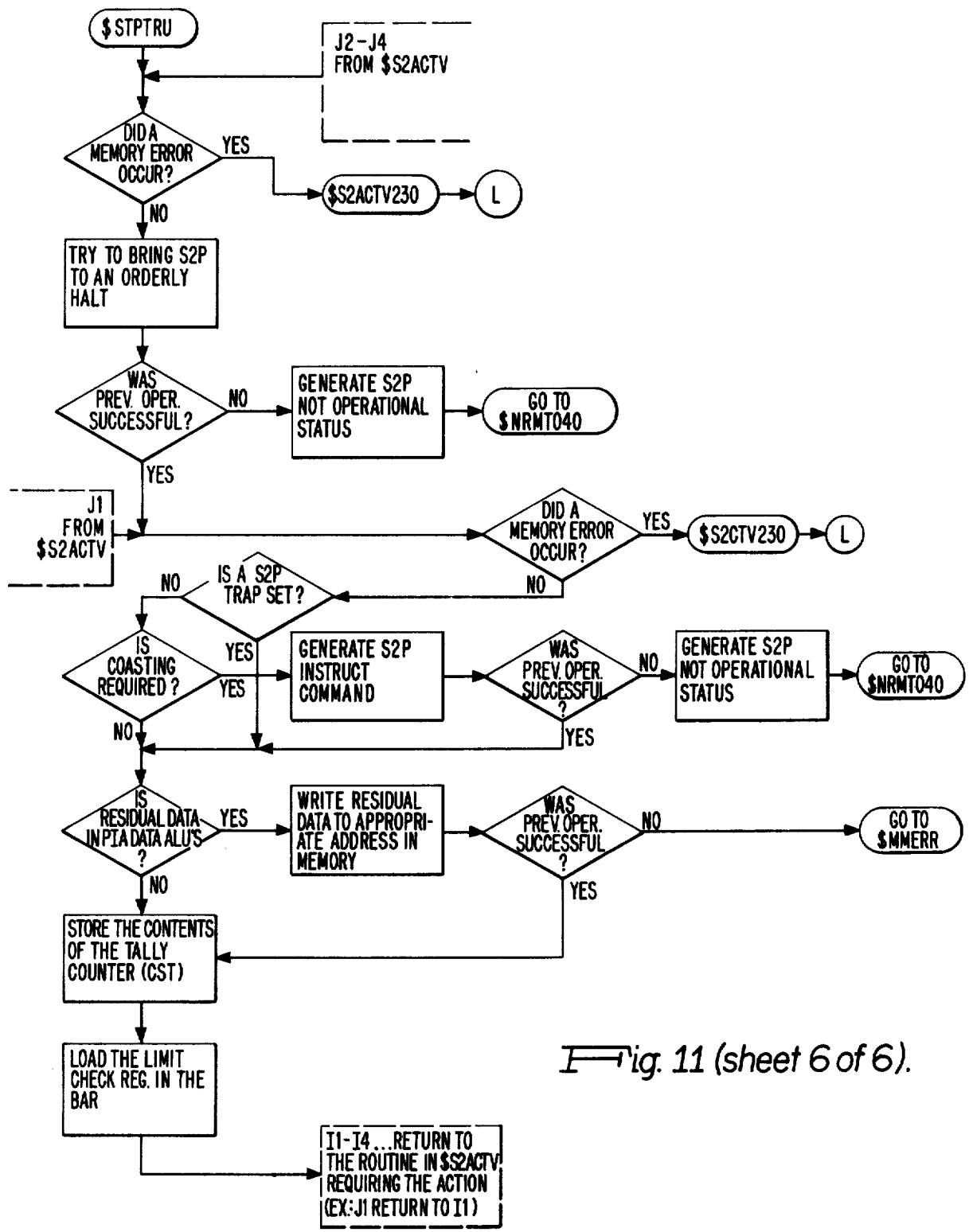
Fig. 11 (sheet 6 of 6).

MICROPROGRAMMED CONTROL OF FOREIGN PROCESSOR CONTROL FUNCTIONS

BACKGROUND OF THE INVENTION

1. Field of Use

The present invention relates to data processing apparatus and, more particularly, to apparatus for enabling a host processor system to execute operations required for execution of target system user programs by a foreign processing unit.

2. Prior Art

There are many systems which provide for emulating operations performed in response to programs written for another processor. In order to initiate running of a job of the other processor, it is normally required that an operator set up the various system parameters necessary for job execution. Of course, this can be considerably time consuming and normally requires the assistance of an experienced operator to ensure that job execution proceeds properly without inadvertently causing the destruction of valuable information stored within the system.

Accordingly, it is a primary object of the present invention to provide a method and apparatus for initiating operations necessary to dispatch a job of a foreign processor for execution by a host system.

It is a further object of the present invention to provide a system which carries out a dispatching operation in a manner which is transparent to the particular user program being dispatched.

SUMMARY OF THE INVENTION

These objects are accomplished in the preferred embodiment of the present invention which includes a microprogrammed processing unit which operatively couples to a main memory system of a host processor and to a foreign processing unit. In response to a command received from the host processor, the microprogrammed processing unit is operative under microprogrammed control to generate the necessary signals for conditioning the foreign processor for execution of a user program.

In a preferred embodiment of the present invention, the microprogrammed processing unit couples to a control interface connected to the foreign processing unit. Certain portions of the foreign processing unit are modified to connect to the control interface to enable the processing unit to be conditioned directly by the microprogrammed processing unit. Also, additional interrupt control circuits are included in the foreign processing unit. This enables the microprogrammed processing unit to monitor the operation of the foreign processing unit and to ensure that processing proceeds properly.

In response to a control command, the microprogrammed processing unit generates subcommand signals for performing functions previously initiated by operator action. Additionally, under microprogrammed control, the microprogrammed processing unit generates the necessary control signals required for loading the various internal registers and storage devices of the foreign processing unit with previously stored parameter information from main memory necessary for dispatching the user program.

The arrangement of the present invention thereby enables the user program to be dispatched in a manner which is transparent to the user program. More importantly, the conditioning of the foreign processing unit is able to proceed at computer speeds rather than at operator speed.

The above and other objects of the present invention are achieved in several illustrative embodiments described hereinafter. The novel features which are believed to be characteristic of the present invention, both as to its organization and method of operation, together with further objects and advantages thereof, will be better understood from the following description considered in connection with the accompanying drawings. It is to be expressly understood, however, that each of the drawings is for the purpose of illustration and description only and is not intended as a definition of the limits of the present invention.

BRIEF DESCRIPTION OF THE DRAWINGS

FIG. 2 shows in greater detail the processor interface adapter 200 of FIG. 1.

FIG. 3 shows the different microinstruction formats executed by the adapter 200.

FIG. 5a through 5i show in greater detail different ones of the blocks of FIG. 2.

FIG. 7 shows a section of the main memory of FIG. 1 in accordance with the present invention.

FIGS. 9 and 10 show in greater detail sections of the S2P processor 300 of FIG. 1.

FIG. 11 is a flow chart used in explaining the operation of the present invention.

GENERAL DESCRIPTION OF THE HOST SYSTEM OF FIG. 1

Figure 1:
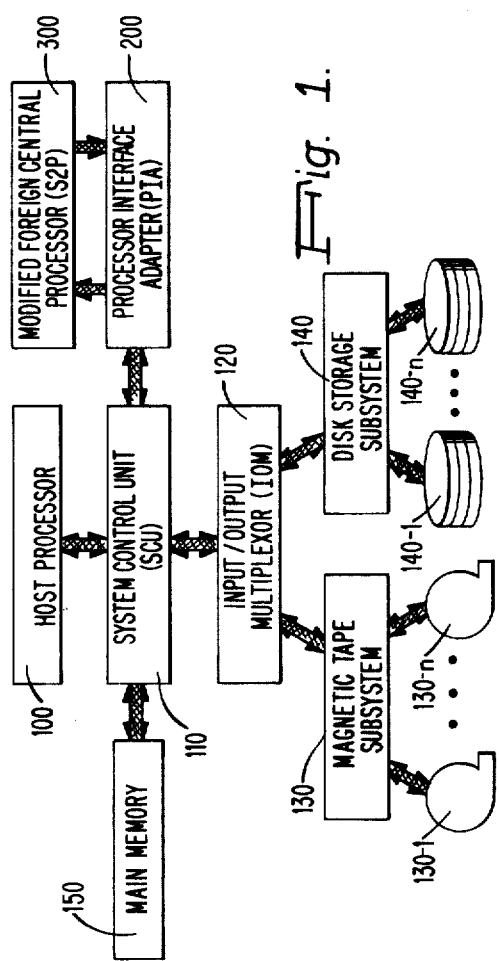
FIG. 1 shows in block diagram form a system which incorporates the principles of the present invention.

FIG. 1 illustrates a data processing system which includes the method and apparatus of the present invention. Referring to the figure, it is seen that the system includes a host processor 100 which couples to a system control unit (SCU) 110 which enables different units within the system to access any one of a number of memory modules included within main memory 150. In addition to coupling to a number of different ports of main memory 150, the system control unit also couples to a number of ports of an I/O controller or multiplexer (IOM) 120 which controls the operation of a number of input/output devices by means of subsystems 130 and 140, as shown in FIG. 1. The subsystem 130 controls a plurality of tape drives 130-1 through 130-n. The subsystem 140 controls a plurality of disk devices 140-1 through 140-N.

For the purposes of the present invention, the units 100 through 150 may take the form of the systems disclosed in U.S. Pat. No. 3,413,613, and U.S. Pat. No. 3,514,772. The management control subsystem or operating system software for supervising and managing the operation of the data processing system referenced above in the preferred embodiment may take the form of the system described in U.S. Pat. No. 3,618,045.

It will be noted from FIG. 1 that the system includes a central processor (S2P) 300 which couples to a processor interface adapter (PIA) 200. The processor 300 may, for the purposes of the present invention, be considered conventional in design. For example, it may take the form of the processing unit described in a publication, "Model 3200 Summary Description", published by Honeywell, Inc., copyrighted 1970, order number 111.0015.000.1-C52. Additionally, reference may also be made to U.S. Pat. No. 3,323,110, invented by Lewis G. Oliari et al., and U.S. Pat. No. 3,811,114, invented by Richard A. Lemay et al., both of which are assigned to the assignee of the present invention.

The processor interface adapter 200 is a microprogrammed processor which serves as a data and control interface between the foreign central processor 300 and the host system, enabling the system to emulate target system programs. The adapter 200 directly connects to one of the ports of the system control unit 100 such that no "hardware" modifications to the overall system are required.

MAIN MEMORY 150

FIG. 7 shows a portion of main memory which includes sufficient memory necessary to support the operating system of the host processor 100 or provide memory space for operating the S2P processor 300. The memory space for the S2P processor 300 is sufficient to provide storage for a compatibility support executive routine, a compatibility mode status saving area (2SSA), an S2 memory area, and a side buffer area. For the purpose of the present invention, the compatibility support executive routine can be considered conventional in design and may include, for example, a set of slave mode routines which provide an interface between the "monitor call" function of the S2P processor 300 operating system and the host operating system.

The compatibility mode status saving area provides storage for parameters used for controlling the adapter and the operation of the foreign processor. The S2 memory area provides storage for the necessary system information and the user program. The side buffer area provides storage for the necessary intermediate buffers required for output operations. The areas mentioned will be considered herein in greater detail with reference to FIG. 7.

Referring to FIG. 7, it is seen that a number of tables are used to communicate with the adapter 200. The tables include I/O interrupt vectors, a communications area, IOM mailboxes, channel module area, and a slave program area. Only those tables which are necessary to understand the present invention will be described in detail herein. The I/O interrupt vectors enable the processor to set interrupts to be processed by the host processor. The communications area includes a fixed storage location which is used for maintaining synchronization during the initiation, execution, and termination of a channel program executed in response to a "connect" sequence. The location, as shown, stores a channel mailbox pointer (CMPW). The IOM mailboxes are assigned to the channels of the I/O multiplexer 120 and allow the adapter 200 to reference the channel tables designated by pointers included within the mailbox channels.

The channel module area stores a number of words necessary to define a channel mailbox block (CMB) and a channel program block (CPB). The CMB consists of eight words and is pointed to by a channel mailbox pointer word (CMPW) located in one of the locations of the communications areas. The channel mailbox words are set to values by the adapter 200 prior to the generation of a "connect" command and are used by the adapter to properly execute the channel program specified in the channel program block.

As seen from FIG. 7, the first channel mailbox word includes a pointer to the status saving area. The second channel mailbox word includes a 24 bit absolute address used by adapter 200 to convert all relative addresses to absolute addresses. It points to the first word of the slave memory area and has its ten low order bit set to zero since the memory area starts on a 1K boundary. The third mailbox word includes a 24 bit constant which delineates the size of the slave (user) memory area. This value also has its low order ten bits set to zero since the slave memory area must end on a 1K boundary. The fourth channel mailbox word includes a 24 bit address which points to the first word of a channel status block, not shown, which provides storage for status information.

As seen from FIG. 7, the channel program block includes channel commands (CCs) each coded to specify adapter command. Each channel command consists of one or more words, depending upon the type of command. The location of the first word of the channel program is defined by the channel mailbox pointer plus eight words (i.e., it is fixed relative to the channel program block).

The slave area includes several areas, only two of which are relative to the present invention. They are the status saving area (2SSA) and memory area. The buffer area provides storage for I/O data transfer operations and will not be discussed in greater detail herein.

The status saving area contains all the necessary information required by the adapter 200 to operate the S2P processor. It also contains status generated by the adapter 200 indicating the outcome and results of an operation executed by the S2P processor. As seen from the figure, the area includes an adapter control area (PCA), an indicator and control register area (ICA), and a terminate status area, not shown. The PCA consists of eight word locations which are preloaded in order to supply adapter 200 with the necessary information required to start, control, and stop the operations of the S2P processor 300. The information contained within the PCA has the format shown in FIG. 1. The words are coded as follows.

PCAW1

BITS
0– 7: SBZ (Set bits to zero.)
33–35: SBZ
8: R — Relative Addressing specified. This bit will be preset to ONE, specifying that the S2P memory pointer is a relative address (relative to the BAR).
9–32: 200(0) Memory Pointer — This 24 bit address field specifies, in conjunction with the BAR, the beginning of the S2P memory area. It has its 10 low order bits equal to ZERO since the S2P memory area starts on a 1K boundary.

PCAW 2

BITS
0– 8: SBZ
33–35: SBZ
9–32 S2P Memory Size — This is a 24 bit constant which delineates the S2P memory area. If $n$ is the address of the last memory location in the memory area, then the memory size plus the address defining the beginning of the 200(0) memory area points to memory location $n+1$ in the slave memory area. The memory size is loaded by software and used by the PIA to perform boundary checking on all memory accesses made by the S2P. The low order 10 bits of this constant are set to ZERO since the S2P memory area must end on a 1K boundary.

PCAW3

BITS

0: SBZ

18-35: S2P Program Timeout Constant (PTC) — This 24 bit constant is loaded by software in order to condition the PIA to stop an S2P program whenever the elapsed time specified by the constant has expired. Thus, the software is provided with a time slicing capability in those cases where an internal trap within the S2P program, i.e., monitor call, has not occurred prior to the expiration of the timeout constant.

PCAW4

BITS

0: SBZ

18—35: SBZ

1- 8: Sense Switch Settings — The states of these bits reflect the state of eight S2P sense switches. If bit one is set, then sense switch 1 in the S2P is set; if reset, then sense switch 1 is reset, etc.

9-17: S2P State Parameters — These bits are coded to indicate the following conditions:

9 — During a load sequence, if this bit is set, the PIA places the S2P processor in the internal interrupt mode.

During a store sequence, the PIA sets/resets this bit if the S2P is/was not in the internal interrupt mode, respectively, upon occurrence of a trap condition.

10 — During a load sequence, when this bit is set, the PIA places the S2P in the external interrupt mode.

During a store sequence, upon the occurrence of a trap condition, the PIA sets/resets this bit if the S2P is/was not in the external interrupt mode, respectively.

11 — During a load sequence, when this bit is set, the PIA places the S2P in the continue interrupt mode.

During a store sequence, upon the occurrence of a trap condition, the PIA sets/resets this bit if the S2P is/was not in the continue interrupt mode, respectively.

12 — When this bit is set to ONE, then the PIA activates the external interrupt function during the load sequence, thus simulating an external interrupt.

13 — When this bit is set to ONE, this indicates that the S2P scientific option is required and, consequently, the PIA must also load the S2P's scientific registers during the load sequence.

14 — Phase Indicator — When this bit is set to ZERO, it indicates a first type of functionality; when set to ONE, it indicates a second type of functionality.

15 — When this bit is set to ZERO, the PIA traps the S2P if it attempts to enter the internal interrupt mode.

16 — When this bit is set to ZERO, the PIA traps the S2P if it attempts to enter the external interrupt mode.

17 — When this bit is set to ZERO, the PIA traps the S2P if it attempts to enter the continue interrupt mode.

The indicator and storage register area (2ICA) of FIG. 7 includes 40 work locations for storing an image of the contents of the various registers included within the control memory of the S2P processor 300. FIG. 7 illustrates the particular registers whose contents are stored. For further information regarding the use of these registers, reference may be made to the publication, "Series 200 Programmer's Reference Manual Models 200 through 4200", published by Honeywell Information Systems Inc., copyright 1971, order number 113.0005.0000.4-139.

As explained herein, the 2ICA area is used by the host processor 100 at the start of a job to define the state of the various registers and variant character information stored by the S2P processor 300. In accordance with the present invention, it is also subsequently used by the adapter 200 to load the various registers within the S2P processor during the execution of a control channel command. Also, the area is used for storing the current S2P processor parameters upon having completed the execution of the same channel command.

The memory area is the only area which is visible to the S2P processor. As seen from FIG. 7, it includes a system area and a user program area. This area stores instructions and data of the user program.

GENERAL DESCRIPTION OF PROCESSOR INTERFACE ADAPTER 200

FIG. 2 illustrates in block diagram form the processor interface adapter 200. Referring to the figure, it is seen that the adapter 200 includes a control section 201 and an input/output processing section 210.

The control section 201 provides subcommand signals for controlling the operation of the processor 300 in response to commands received from host processor 100. More specifically, this section generates subcommand signals which control the processor 300, transfer data to and from main memory 150, and control a control panel utilized by processor 300.

The input/output processing section 210 includes the interface circuits which couple the adapter 200 to the SCU 110, the control panel, and data lines of the processor 300. This section performs the various data manipulation operations and memory addressing operations which take place either under the control of the control section 201 or under the control of processor 300. These two main sections will now be discussed in greater detail.

Control Section

Referring to FIG. 2, it is seen that this section includes a control store 210-10 which is organized to have a maximum of 5120 words, each word containing 36 bits. The control store organization is shown diagrammatically in FIG. 4. As seen from the figure, the lower 1024 locations designated by octal addresses 00000 through 01777 include four read only memory (ROM) circuit boards, each nine bits in width. These storage locations store a number of basic hardware logic test (BLT) microprograms which are used to perform preliminary testing of the adapter circuits and control section, to gain access to main memory 115, and to load the other sections of control store 110 with verification routines and "personality" (normal operating) microprograms or firmware.

Figure 4:
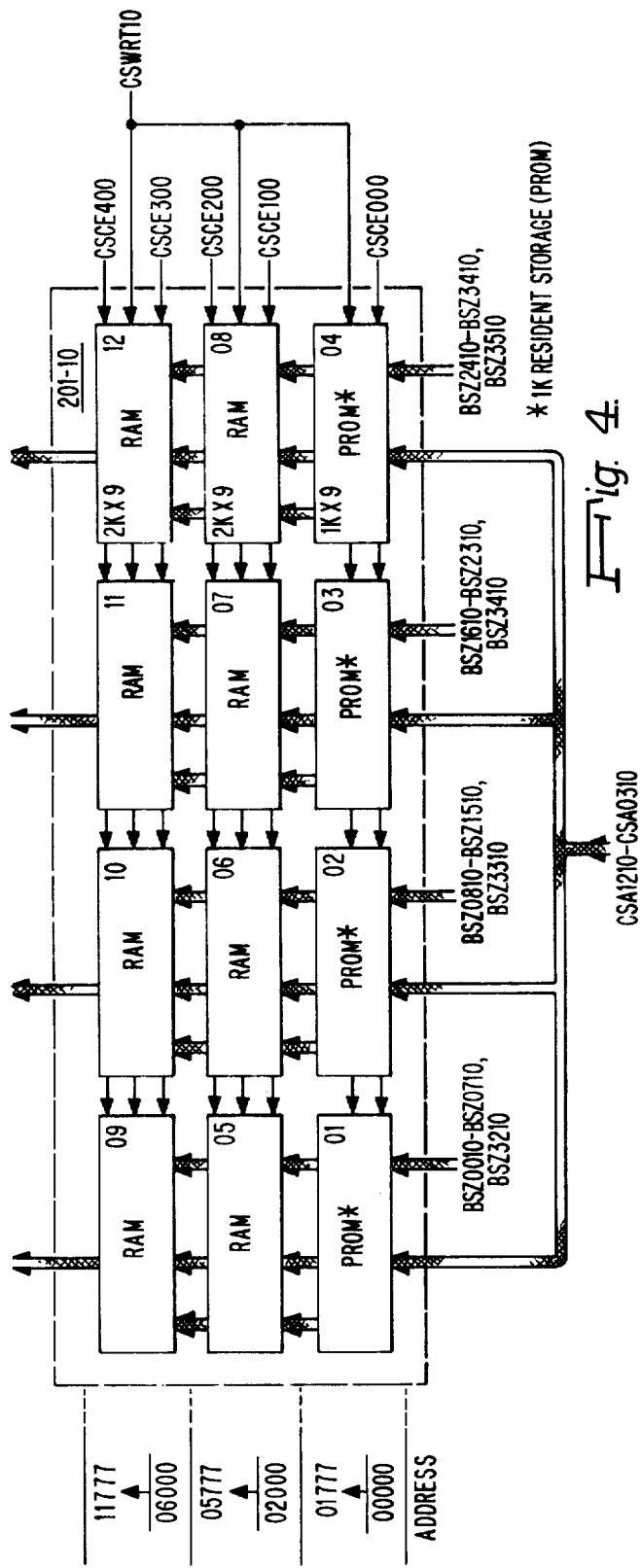
FIG. 4 shows the organization of the control store 210-10 of FIG. 2.

As seen from FIG. 4, the remaining storage locations designated by octal addresses 02000 through 11777 comprise up to two sections of writable storage locations (RAM). These locations store the verification routine "overlays" and personality firmware loaded by a microprogram loader routine also stored in the read only memory section of control store 201-10. To minimize the amount of storage locations required, the verification routines are divided into a number of different load and execute sequences which are overlayed with one another until, finally, the personality firmware is loaded into control store 210-10. For the purposes of the present invention, the control store is constructed utilizing conventional circuits which may include circuits of the type disclosed in the publication, "The Integrated Circuits Catalog for Design Engineers", published by Texas Instruments, Inc., dated 1972.

As seen in FIG. 4, the complement or negation of the signals CSA0300-CSA1200 from a memory address register (CSA) 201-12 is applied to each of the ROM circuit packages since each package includes a buffer inverter circuit in series with each address line which inverts the input address signal. Both the assertions and negations of the address signals from register 201-12 are used as inputs to the RAM chips.

The signals CSCE000 through CSCE400 are chip enable signals which are generated in response to decoding the high order address bits of CSA register 201-12 (i.e., bits 00—02). When generated, these signals condition the appropriate ROM or RAM package, enabling access to one of the storage locations of the control store 201-10. A write pulse CSWRT10 is also applied as an input to each chip enabling the signals applied to BSZ0010 through BSZ3510 to be written into a selected storage location. It will be noted that FIG. 4 shows the CSWRT10 signal also being applied to the ROM chip blocks which allows for installation of RAM packages in place of ROM packages for maintenance purposes, when necessary. For further information as to the type of circuits used to provide the enabling signals, reference may be made to U.S. Pat. No. 3,911,406, which is assigned to the same assignee as named herein.

The contents of an accessed storage location are read out via an input bus to a plurality of amplifier circuits of block 201-14. These circuits provide early data output signals CSN0030 through CSN3530 which represent valid signals 139 nanoseconds after the occurrence of a clock pulse. A four megahertz system clock, not shown, generates the clock pulses or PDA pulses which establish the basic timing for the system. For the purposes of the present invention, the clock may be considered conventional in design.

Figure 5A:
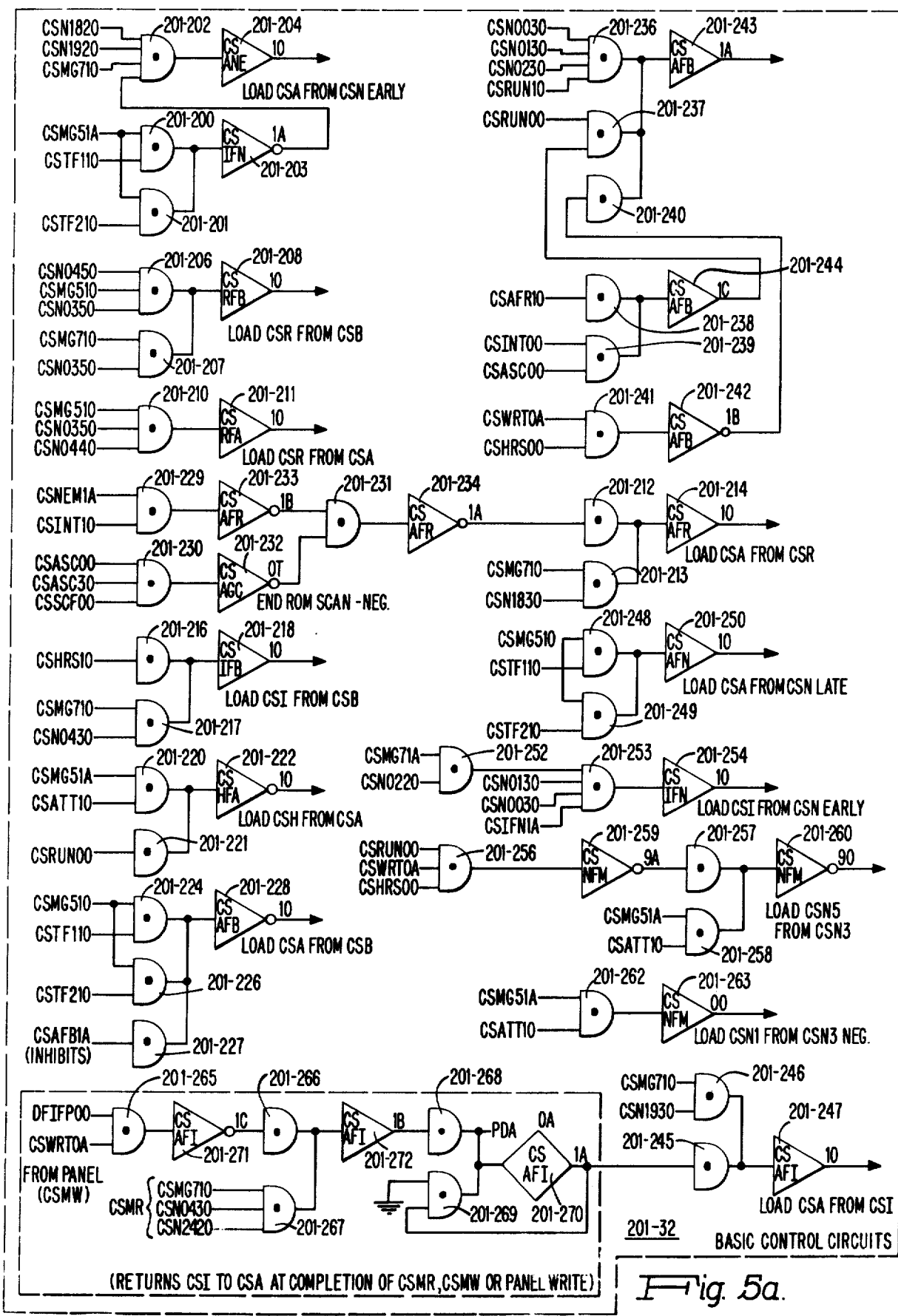

All early register transfer subcommand signals are decoded by circuits included in block 201-32, shown in detail in FIG. 5a, from the signals appearing as outputs from block 201-14. The output signals CSN0030 through CSN3530 are transferred to a 36 bit local memory register corresponding to the latch circuits of block 201-16 in response to a subcommand signal CSNFM00 which is generated by circuits included in block 301-32. Additionally, the output signals CSN0030 through CSN0430 are transferred to a five bit position op code register 201-30 in response to a subcommand signal CSNFM90 generated by the circuits of block 201-32. As explained herein, with reference to FIG. 5a, signal CSNFM90 is normally a binary ONE except when a conditional branch and a no execute condition are present preventing execution of the next microinstruction, or when the system is placed in a STOP mode or during execution of a read or write type microinstruction.

The register 201-30 always stores the op code of the current microinstruction being executed. Thus, bit signals CSN0050-CSN0450 are derived from CSN0010-CSN0410.

The register 201-16 always stores the contents of the control store location addressed by the address contained in CSA register 201-12 during the previous clock cycle. The output signals from local register 201-16 are applied to a plurality of decoder circuits of blocks 201-34, 201-36, 201-38, and 201-40 for decoding of all subcommands, data delivery and multiplier control signals, test fields, etc. The output signals from op code register 201-30 are applied to decoder circuits included in block 201-34, which generate major group decode signals and subcommand inhibit signals for inhibiting certain transfer operations, as explained herein.

As seen from FIG. 2, the circuits of block 201-34 receive signals from a block 201-50 which includes a number of state flip-flops for establishing a number of different modes of operation for adapter 200. Each state flip-flop is set or reset by subcommand signals generated by the circuits of block 201-32 or from bits within the microinstructions themselves. The output signals from different state flip-flops are applied as inputs to the control panel circuits of block 201-55. As explained herein, these circuits generate signals on a control interface for controlling the operation of S2P processor 300 via the control panel interface logic circuits normally included as part of the S2P processor 300. For example, these circuits enable the enter/display of the S2P processor program/interrupt counters included in its control memory, the operation of the S2P processor in a single instruct, RUN and STOP modes, the clearing and initialization of the S2P processor, and the changing of the address mode and sense switch settings of the S2P processor.

Figure 8:
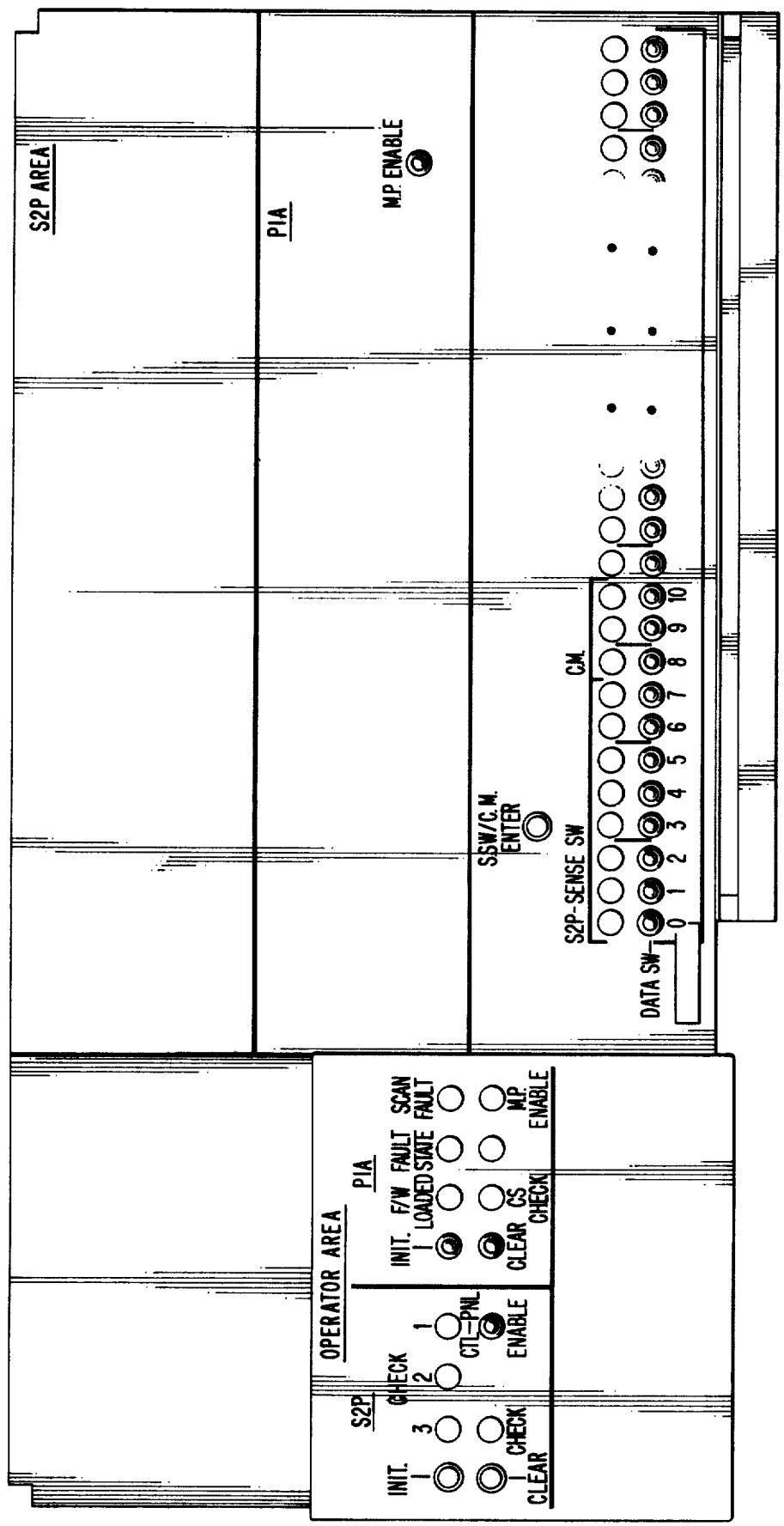
FIG. 8 illustrates the control panel used in connection with the system of FIG. 1.

The circuits also supply signals to a maintenance/control panel, shown in part in FIG. 8, which provides for all external operator or maintenance facilities necessary to control system operation. The operation of these circuits will be described only to the extent necessary for a complete understanding of the present invention. However, for information regarding the type of operations mentioned, reference may be made to U.S. Pat. No. 3,909,802, and U.S. Pat. No. 3,813,531, both of which are assigned to the same assignee as named herein.

It will be noted from FIG. 2 that the early data output signals are also applied as inputs to the circuits of block 201-15, to CSA register 201-12, and to a control store interrupt (CSI) register 201-26. The output signals condition write control circuits of block 201-15, shown in detail in FIG. 5g, to generate a write pulse signal CSWRT10. In response to certain types of microinstructions, as explained herein, the circuits of block 201-32 force corresponding ones of the subcommand signals CSANE10 and CSIFN10 to binary ONES which in turn load CSA register 201-12 and CSI register 201-26, respectively, with bit signals CSN05-CSN17 and CSN23 via transfer paths 201-29 and 201-27. It will also be noted that CSA register 201-12 can also be loaded via a path 201-31 with a branch address and parity check bit from memory local register 201-16 when subcommand signal CSAFN10 is forced to a binary ONE by the circuits of block 201-32, as explained herein.

Considering the control address registers and circuits of section 201-10, it is seen that the CSA register 201-22 serves as a control store memory address register. It is a 14 bit register which stores a 13 bit address generated by the circuits of section 201 and a single parity check bit which, in accordance with the present invention, is previously generated during the assembling of the microinstructions of the microprograms subsequently loaded into control store 201-10. As shown, bit positions 0–12 store the 13 bit address and bit position 13 stores the parity check bit. Register bit positions 0–12 supply a 13 bit address via a path 201-21 for addressing any one of the 5120 word storage locations of control store 201-10. The parity check bit signal is supplied via line 201-11 to bit position 13 of register 201-12 by the output signal from bit 31 of each microinstruction word read out to the amplifier circuits of block 201-14, as explained herein in greater detail.

The 13 bit address and parity check bit contents of CSA register 201-12 are applied as inputs to a 14 bit position control store return address (CSR) register 201-22 via a transfer path 201-17 and to a 14 bit position control store history (CSH) register 201-18 via a transfer path 201-19. The address and parity check signals are stored in CSR register 201-22 and in CSH register 201-18 when corresponding ones of the subcommand signals CSRFA10 and CSHFA10 are forced to binary ONES by the circuits of block 201-32.

The CSR register 201-22 is used to store a return address of microprogram subroutine returns. As explained herein, this register is loaded with a return address in response to branch type and return type microinstructions. The stored address is applied to CSA register 201-12 via a path 201-37. The address and parity check signals are loaded into CSR register 201-12 when the circuits of block 201-32 force a transfer signal CSAFR10 to a binary ONE. The CSH register 201-18 is used for displaying the previous contents of CSA register 201-12. This register is loaded automatically by control circuits and is not accessible with microinstructions.

Additionally, the 13 bit address from CSA register 201-12 is also applied as an input to a 13 bit adder circuit (CSB) 201-20 which automatically increments the address by one. For the purpose of the present invention, the adder circuit 201-20 can be considered conventional in design. The incremented address is applied to the high order 13 bit positions of CSR register 201-22 via a transfer path 201-23 and to the high order 13 bit positions of CSI register 201-25 via a transfer path 201-25. Similarly, the parity check bit signal on line 201-11 is applied via the aforementioned transfer paths to the least significant bit position of CSR register 201-22 and CSI register 201-26. The address and parity check signals are stored in CSR register 201-22 and CSI register 201-26, respectively, when corresponding ones of the subcommand signals CSRFB10 and CSIFB10 are forced to binary ONES by the circuits of block 201-32. The CSI register 201-26 is used as a second return address register and as an address/work register during control store read and write operations. The register is loaded via path 201-27 when subcommand signal CSIFN10 is forced to a binary ONE by the circuits of block 201-32.

Both the incremented address from the adder circuit 201-20 and the parity check signal on line 201-11 are applied as inputs to CSA register 201-12 via a transfer path 201-33. The address and parity check signals are stored in CSA register 201-12 when a subcommand signal CSAFB10 is forced to a binary ONE by the circuits of block 201-32.

As seen from FIG. 2, the output signals from CSI register 201-26 are applied to one input via a path 201-39 of a two input data selector multiplexer circuit 201-24. The circuit 201-24 has its other input connected to receive an address from a control panel. In response to signals DPSAA-C, the selected output signals of circuit 201-24 are, in turn, applied to CSA register 201-12 via a path 201-35. During normal operation, the CSI register 201-26 is selected as the source of address signals. The address and parity check signals are loaded into CSR register 201-12 when a transfer subcommand signal CSAFI10 is forced to a binary ONE by the circuits of block 201-32.

It will be noted that each of the microprogram accessible address registers CSA, CSR, and CSI connects to a parity check circuit (i.e., circuits 201-42, 201-43, and 201-44). Each of these circuits is always enabled and is operative to check the register associated therewith for good parity as explained herein. The output signal generated by each parity check circuit is applied as an input to error circuits, included in a block 201-45, which cause a halt in system operation upon the occurrence of an error signal indicative of a fault within control section 201.

The last components of control section 201 are a 24 bit tally counter 201-56 and an associated 24 bit increment/decrement circuit 201-58, connected as shown. The tally counter 201-56 is an up-down counter which is operated under microprogram and hardware control. A count to be loaded into the counter 201-56 and count direction can be specified by certain types of microinstructions. The counter 201-56 includes a pair of flip-flops (overflow and underflow) for indicating the detection of the occurrence of a boundary crossing relative to the last control microinstruction having been issued. The counter 201-56 is loaded from input lines BSZ48-BSZ71 in response to a subcommand signal CSS8610. At the same time, both boundary detection flip-flops are reset to ZEROS.

The mode of operation of the increment/decrement circuit 201-58 is defined by the state of one of the flip-flops of block 201-50. When the flip-flop is a binary ONE and a binary ZERO, the circuit 201-58 is conditioned to decrement and increment, respectively, the contents of counter 201-56. When signal CSMTC10 is forced to a binary ONE in response to a microinstruction, the incremented or decremented value is loaded into counter 201-56 and the overflow and underflow flip-flops are strobed. In the increment mode, the overflow flip-flop is switched to a binary ONE only when the count switches from 77777777 to all ZEROS. Similarly, in the decrement mode, the underflow flip-flop is switched to a binary ONE only when the count switches from an all ZERO count to 77777777.

INPUT/OUTPUT PROCESSING SECTION 210

As seen from FIG. 2, this section includes an input multiplexer circuit 210-10, a data section 210-6, an address section 210-2, an SCU memory interface section 210-4, and an S2P interface section 210-8, connected as shown. The 36 bit multiplexer (data selector) circuit 210-10 receives input signals from the data sources shown (i.e., control store 201-10, memory interface section 210-4, etc.) and applies the signals from the selected source to both section 210-2 and section 210-6.

It is the states of signals P1, P2, and P3 defined by certain microinstruction fields or by the decoding of microinstructions by the circuits of block 201-40 or by other circuits as explained herein which designate the source to be selected. In a similar fashion, the states of the groups of signals P5, D6, MG2, and D5, D6, MG3 generated in response to certain microinstruction fields and the circuits of block 201-34 designate section 210-2 and section 210-10, respectively, as the receiver of the set of signals from multiplexer circuit 210-10.

The data section 210-6, shown in greater detail in FIG. 5f, provides the adapter 200 and S2P processor 300 with a communication path to the SCU 110. The section 210-6 performs the necessary data manipulation operations for transferring data bytes and ensuring proper data byte alignment. Data transfers within the adapter 200 can be controlled by microprogram or by hardware sequences. Unless a microprogram releases control to a group of hardware control circuits which can be considered as part of block 210-6, the manipulation of registers and multiplexer circuits proceeds under direct control of the microprogram. When certain microinstructions are executed, such as for starting a data transfer operation for releasing control, the hardware control circuits control the transfer until it is completed.

From this, it can be seen that the subcommand signals (i.e., P1, P2, P3 or D5, D6, MG3, etc.) which cause the transfer of data signals are generated by logic gate circuits having at least two sets of inputs. One set includes a signal indicating that the hardware control circuits are to control the transfer, signals from a cycle counter included as part of the hardware control circuits and signals representative of system conditions. The other set includes the complement of the signal indicating that the transfer is to proceed under microprogram control, a signal designating a particular type of microinstruction and signals corresponding to a bit or bits within the particular microinstruction. For an example of the type of circuits which could be used to generate such hardware sequences, reference may be made to U.S. Pat. No. 3,909,799, which is assigned to the same assignee as named herein.

The address control section 210-2 performs operations for addressing main memory 150 during read and write operations. The section also performs the required address checking operations related to memory protection and base relocation operations. As explained herein, this section is organized in a fashion similar to data section 210-6.

The SCU memory interface section 210-4 includes registers and circuits for connecting the adapter 200 to the lines which comprise the system port interface of the SCU 110. These lines include up to 74 bidirectional data and parity lines, 24 address lines, five command lines, and a number of control lines including lines for transmitting initialize, transmit, interrupt, ready, and connect signals between the adapter 200 and SCU 110.

As shown in FIG. 2, the S2P interface section 210-8 includes a multiplexer circuit 210-90, a group of byte wide registers 210-80 through 210-83, output multiplexer and receiver circuits 210-85 and 210-86 for connecting the adapter 200 to the memory interface lines of the processor 300. These lines include two sets of 19 memory address lines 210-85 and 210-86), 36 data lines (18 in and 18 out —210-80 through 210-83), and a number of control lines of the control interface (to perform S2P clock stalls, S2P relocation, write masking). The section 210-8 also includes data selection circuits such as circuits 210-86 and 210-88, which enable the aligning and transferring of characters at a rate compatible with the memory interface requirements of processor 300.

The registers 210-80 and 210-81 connected to pairs of registers within data section 210-6 for transferring data to the local register N of the S2P processor 300. The multiplexer circuit 210-85 also connects to data section 210-6 for transferring an address to the address register (S) of the S2P processor 300. The registers 210-82 and 210-83 connect to multiplexer circuit 210-10 for transferring data from the S2P processor local register to the adapter 200. Lastly, the receiver circuits 210-86 also connect to the multiplexer circuit 210-86 for transferring an address from the S2P processor address register to adapter 200. The multiplexer circuit 210-90 receives the contents of bit positions 18-23 of tally counter 201-56. The tally counter signals are applied to a control memory address register (R) of the S2P processor 300.

It will be appreciated that, although not shown in all cases, the various multiplexer circuits of section 210-8 receive as a second source of signals the outputs from the various control panel switches. However, since the operation of the control panel is not important to an understanding of the present invention, it will not be discussed in detail herein.

In the preferred embodiment, the S2P processor 300 is a two character processor which, during normal operation, extracts two data characters from its main memory during a one microsecond cycle of operation. The two data/address bus arrangement provides an interface with two asynchronous one byte wide registers connected to a "crossbar" bus switching network. The arrangement enables the processor 300 to manipulate two characters at a time (reading or writing) in a manner which is identical to its normal operating environment. This section will be discussed in greater detail in connection with FIG. 9.

MICROINSTRUCTION FORMATS

Before describing in greater detail the different blocks of FIG. 2, the different types of microinstructions and their formats will be described with reference to FIG. 3.

Referring to FIG. 3, it will be noted that the adapter 200 is capable of executing the operations specified by the op codes of up to 25 different microinstructions which are organized into eight major groups. Each microinstruction word contains all the operands required for a given operation.

The eight major groups and the types of operations designated are:

Group 0: no-op —no operation
Group 1: MMRQ —main memory (SCU) request parameter and control operation
Group 2: ARCA —address register arithmetic and control operation
    ARCL —address register logic and control operation
Group 3: DRCA —data register arithmetic and control operation
    DRCL —data register logic and control operation
    Group 3 (Cont.):
    LDC —load constant to BSN1 register operation
Group 4: DCK1 —direct control 1 operation
    DCK2 —direct control 2 operation
Group 5: CBOTN —conditional branch on test and no execute operation 'CBOTE —conditional branch on test and execute operation CBRTN —conditional branch on test and load return register and no execute operation CBRTE —conditional branch on test and load return register and execute operation Group 6: LCSIK —load control store interrupt register and control operation Group 7: UCBK —unconditional branch and control operation UBRK —unconditional branch and control and load return register operation RTNFI —return from interrupt register and control operation RTFIR —return from interrupt register and control and load return register RTNFR —return from return register and control operation RTFRR —return from return register and control and load return register operation CSMR —control store memory read operation CSMW —control store memory write operation From FIG. 3, it is seen that each microinstruction includes a five bit op code (i.e., bits –4) for specifying the type of operation to be performed. Additionally, each microinstruction has 26 bits (bits 5–30) coded to specify subcommands, constants, addresses, etc., and five parity check bits (i.e., bits 31–35). Each of parity bits 32–35 is associated with a different byte of the microinstruction word. That is, bit 32 represents odd parity for bits 0–7, bit 33 represents odd parity for bits 8–15, bit 34 represents odd parity for bits 16–23, and bit 35 represents odd parity for bits 24–30. Bit 31 is a special parity check bit which represents odd parity for the next sequential absolute memory address to be accessed. As explained herein, the value for bit 31 is established during the assembling of the microinstructions prior to their being stored in control store 20110.

The different microinstructions of FIG. 3 will now be discussed in greater detail. The single group 0 microinstruction has an all ZERO op code which specifies no operation. The single group 1 microinstruction has an op code of 00100 and this microinstruction sets up parameters for main memory (SCU) cycles. Bits 5–9 are coded to specify the type memory command, bits 10–13 are coded to specify a zone. Bits 14, 15, and 16 are coded to specify relocation, paging, and limiting check modes, respectively. Bits 20–22, 25–27, and 28–30 are coded to specify subcommand groups 6, 7, and 8, respectively.

The first group 2 microinstruction, ARCA, has a 01000 op code. This microinstruction conditions the address control section 210-2 to perform arithmetic operations on the addresses stored in section registers required for main memory (SCU) addressing. Bits 5–10 are coded to define the type of arithmetic operation (mode) to be performed by an arithmetic and logic unit (ALU) included in section 210-2 (bit 10 is a Carry In bit). Bits 15–17 are coded to select the desired port (source) on multiplexer circuit 210-10. The pairs of bits 11–12 and 18–19 are coded to specify which register in the first and second groups of registers is to receive ALU result output signals. The bit pair 23–24 is coded to specify which register of the first group is to receive the output signals from multiplexer circuit 210-10. Bits 20–22, 23–24, and 25–26 are coded to specify subcommand groups, 6, 7, and 8, respectively.

The second group 2 microinstruction, ARCL, has a 01001 op code. This microinstruction is coded the same as the ARCA microinstruction with the exception that bits 5–10 are coded to define the type of logical operation to be performed by the section's ALU. Since it is a logical operation, there is no Carry In signal and bit 10 is a ZERO.

The first and second group 3 microinstructions are coded similar to the microinstructions of group 2. The first group 3 microinstruction, DRCA, has a 01100 op code. This microinstruction conditions the data section 210-6 for performing arithmetic operations upon the data contents of the different registers included in the section. As explained herein, operations can be performed separately or simultaneously upon the upper 36 bits (00–35) or lower 36 bits (36–71) of each register. Bits 5–10 define the type of arithmetic operation which is to be performed by the arithmetic and logic units (ALU's) of the section. Bits 15–17 are coded to select the port (source) of bits 0–35 from multiplexer circuit 210-10 and bits 20–22 similarly select the port (source) of bits 36–71 from a second multiplexer circuit, not shown. The pairs of bits 10–11 and 13–14 are coded to define which one of the registers within the first and second groups of registers is to receive result output signals from the section's ALU's. The pairs of bits 18–19 and 23–24 are coded to define which one of the registers within the first and second groups of registers is to receive output signals from the multiplexer circuit 210-10 and the second multiplexer, not shown. Again, bits 25–27 and 28–30, respectively, are coded to specify group 7 and 8 subcommands.

The second group 3 microinstruction, DRCL, has a 01101 op code. This microinstruction is coded the same as the DRCA microinstruction with the exception of mode bits 5–10 which are coded to define the type of logical operation to be performed by the section's ALU's.

The last group 3 microinstruction has a 01110 op code. This microinstruction causes a 26 bit constant (bits 5–30) to be delivered to a specific register (BSN1) within section 210-6 via the multiplexer circuit 210-10.

The first and second group 4 microinstructions DCK1 and DCK2 have op codes of 10000 and 10001, respectively. The first group 4 microinstruction has groups of bits coded to specify operations defined by subcommand groups 1–8. The DCK2 microinstruction has groups of bits coded to specify operations defined by subcommand groups 6–13 as indicated.

The group 5 microinstructions are conditional branch microinstructions used to examine the states of various test indicator circuits within the adapter 200 and branch to a location within the control store 201-10 specified by address bits 5–16 when the results of the test are true according to a specified convention. The bits 17–22 and 24–29, respectively, are coded to specify the two test indicator circuits whose states are to be examined. It will be noted that the low order branch address bit (A12) is not specified in the microinstruction. Bit 23 is an odd parity bit calculated for address bits 5–16 during the assembling of the microinstructions before being stored in control store 201-10. The bit A12 is assumed to be ZERO for the calculation.

In the branching convention employed, a control store microprogram branches to the branch address location when the state of the indicator specified by test field 1 is not true and the state of the indicator specified by test field 2 is true. Bit 12 of the CSA register 201-12 is set to a binary ZERO. When the indicator state specified by test field 1 is true, and the indicator state specified by test field 2 is true or false, the microprogram branches to the branch address location plus one (bit 12 of the CSA is set to a binary ONE). Since bit 23 is an odd parity but for the branch address when the test field 1 result is true, effective to increment the branch address by one, the state of this bit is complemented or inverted before being stored in CSA register 201-12. This preserves good parity as explained herein.

The type of operations performed by each of the branch type microinstructions will now be discussed. During the execution of each branch microinstruction, if either condition being tested by test fields 1 and 2 is true, the control store microprogram branches to the microinstruction specified by the branch address. The different microinstructions provide for the following variations in operations.

The CBOTN microinstruction has an op code of 10100. When executed, it inhibits the execution of the next microinstruction in sequence when the branch condition tested is true. When the condition being tested is not true, the microprogram sequences to the next microinstruction.

The CBOTE microinstruction has an op code of 10101. This microinstruction is executed in the same manner as the CBOTN microinstruction except that the microinstruction immediately following is always executed prior to branching.

The CBRTN microinstruction has an op code of 10110. This microinstruction is also executed in the same manner as the CBOTN microinstruction with the exception that it causes the CSR register 201-22 to be loaded with the address of the location immediately following the branch microinstruction.

The CBRTE microinstruction has an op code of 101111. This microinstruction is executed in the same manner as the CBOTE microinstruction except that it causes the CSR register 201-22 to be loaded with the address of the branch microinstruction plus two (this accounts for the microinstruction executed following the branch).

The single group 6 microinstruction, LCSIK, has a 11010 op code. This microinstruction contains a 13 bit address and an odd parity check bit corresponding to bits 5–17 and bit 23, respectively, which is loaded into CSI register 201-26. Bits 20–22, 25–27, and 28–30, respectively, are coded to specify subcommand groups 6, 7, and 8.

The group 7 microinstructions perform a modification of the CSA register 201-10 contents prior to execution. As seen from FIG. 3, each such microinstruction includes a 13 bit field (i.e., bits 5–17) coded to specify a branch address of all ZEROS. Bit 23 is coded to specify odd parity for the microinstructions containing branch addresses. In certain cases, bits 18–19 and 23–24 are also coded to further define the type of microinstruction. Bits 20–22, 25–27, and 28–30, respectively, are coded to specify subcommand groups 6, 7, and 8.

Considering each microinstruction separately, it is seen that the UCBK microinstruction has a 11100 op code. This microinstruction causes the control store microprogram to branch to the location by address bits 5–17. The UBRK microinstruction having a 11110 op code is executed in the same manner as the UCBK microinstruction except that it also causes the CSR register 201-22 to be loaded with a return address from CSB incrementing circuit 201-20.

The RTNFI microinstruction has an op code of 11100. This microinstruction causes the control store microprogram to return to the program address specified by the contents of the CSI register 201-26. The RTFIR microinstruction has an op code of 11110 and is executed in the same manner as the RTNFI microinstruction except that it also causes the CSR register to be loaded with a return address obtained from CSB incrementing circuit 201-20.

The RTNFR microinstruction has a 11100 op code. This microinstruction causes the control store microprogram to return to the program address specified by the CSR register 201-22. The RTFRR microinstruction with an op code of 11110 is executed in the same manner as the RTNFR microinstruction except that it also causes the CSR register 201-22 to be loaded with a return address obtained from CSB incrementing circuit 201-20.

The CSMR microinstruction has a 11101 op code. This microinstruction causes the contents of the storage location specified by the contents of the CSI register 201-26 to be read from the control store 201-10 and loaded into a predetermined one of the registers of data section 210-6. The CSMW microinstruction with the same op code causes the contents in a predetermined one of the registers of data section 210-6 to be written into the storage location specified by the contents of CSI register 201-26.

DETAILED DESCRIPTION OF FIGURE 2 CIRCUITS

The different ones of the blocks of FIG. 2 will now be discussed with reference to FIGS. 5a through 5i.

BASIC CONTROL DECODE CIRCUITS 201-32

FIG. 5a shows the circuits 201-200 through 201-272 which generate the different register transfer signals for conditioning the various registers of control section 201 for transfers during microinstruction execution.

Referring to the figure, it is seen that a plurality of AND gates 201-200 through 201-202, together with an inverter circuit 201-203 and amplifier circuit 201-204, are operative to generate the early transfer signal CSANE10 in response to certain group 7 microinstructions (i.e., UCBK and UBRK microinstructions). The signal CSIFN1A is forced to a binary ZERO by either a CBOTN or CBRTN microinstruction where the condition specified by test field 1 or test field 2 is true. This inhibits the generation of signal CSANE10 as well as early transfer signal CSIFN10 by an AND gate 201-253.

The AND gates 201-206 and 201-207 cause amplifier circuit 201-206 to force transfer signal CSRFB10 to a binary ONE in response to certain group 5 and group 7 microinstructions. These are the CBRTE microinstructions of group 5 and the UBRK, RTFIR, and RTFRR microinstructions of group 7.

The AND gate 201-210 causes the amplifier circuit 201-211 to force transfer signal CSRFA10 in response to a CBRTN microinstruction of group 5. The gates 201-212 and 201-213 cause the amplifier circuit 201-214 to force transfer signal CSAFR10 to a binary ONE in response to certain conditions (i.e., the end of a scan operation, CSASCOT = 0, in response to an initialize signal, or a "top of memory" signal during a prescan operation, CSAFRIB = 0) and in response to certain group 7 microinstructions (i.e., RTNFR and RTFRR microinstructions). The gates 201-230 and 201-231 and inverter circuits 201-232 through 201-234 provide the appropriate conditioning signal to gate 201-212, as shown.

The gate 201-216 causes the amplifier circuit 201-218 to force transfer signal CSIFB10 to a binary ONE during a "hardware register swap" operation (i.e., CSHRS10 = 1) in which the CSI register 201-26 is loaded with an incremented address from CSB incrementing circuit 201-20 during the CSMR and CSWR microinstructions. AND gate 201-217 causes the circuit 201-218 to force the CSIFB10 signal to a binary ONE during the fetching phase of CSMR and CSMW microinstructions.

The AND gate 201-220 inhibits the inverter circuit 201-222 from forcing the transfer signal CSHFA10 required for updating history register 201-18 during the execution of CBOTN and CBRTN branch microinstructions when any one of conditions being tested is true. (CSATT10 = 1). The gate 201-221 also inhibits signal CSHFA10 from being forced to a binary ONE when the control section 201 is not in the RUN state (i.e., CSRUN00 = 1). The conditions which set the control section to the RUN state are the pressing of a control panel one-instruct button, the panel run bottom, or the completion of a successful scan operation. The control section switches from the RUN state to a halt state upon the depression of a panel initialize button, the one instruct button, or panel stop button in addition to certain error conditions, etc.

The AND gates 201-224, 201-226, and 201-227 inhibit inverter circuit 201-228 from forcing transfer signal CSAFB10 to a binary ONE in the case of certain types of microinstructions. For example, the AND gates 201-224 and 201-226 inhibit CSAFB10 from being switched to a binary ONE during the execution of group 5 branch microinstructions when either condition tested by test field 1 or test field 2 is true. This prevents the normal (nonbranch) incrementing of the address contents of CSA register 201-12 from the CSB incrementing circuit 201-20. The AND gate 201-241 and gate 201-240 also inhibit CSAFB10 from being switched to a binary ONE during CSMR and CSMW microinstructions. The AND gate 201-237 also inhibits CSAFB10 when the control section 201 is not in the RUN state (i.e., CSRUN00 = 1) and it has not been initialized, is not in the scan mode (CSINT00 = 1, CSASC00 = 1), or signal CSAFR10 is a binary ONE. A last AND gate 201-236 inhibits CSAFB10 from switching to a binary ONE during the fetching phase of group 7 microinstructions.

The gate 201-245 causes amplifier circuit 201-247 to force transfer signal CSAFI10 to a binary ONE at the completion of a CSMR or CSMW microinstruction or at the completion of a panel write operation via the gates 201-265 through 201-268 which switch flip-flop 201-270 to a binary ONE for one clock pulse interval (reset via AND gate 201-269). In response to RTNFI and RTFIR microinstructions of group 7, the AND gate 201-246 also forces the CSAFI10 signal to a binary ONE.

The pair of AND gates 201-248 and 201-249 cause amplifier circuit 201-250 to force the late transfer signal CSAFN10 to a binary ONE during the execution of group 5 conditional branch microinstructions when the result of either condition being tested by test field 1 or test field 2 is true.

The AND gates 201-252 and 201-253 cause amplifier circuit 201-254 to force the early transfer CSIFN10 signal to a binary ONE during the fetching phase of an LSCIK group 6 microinstruction when signal CSIFN1A is a binary ONE under the conditions discussed above.

The gates 201-256 and 201-257 inhibit the op code transfer signal CSNFM90 from being forced to a binary ONE during the execution of CSMR and CSMW microinstructions of group 7. The gate 201-258 inhibits the CSNFM90 signal during the execution of CBOTN and CBRTN microinstructions of group 5 when the condition being tested by test field 1 or test field 2 is true. In a fashion, AND gate 201-262 causes amplifier circuit 201-263 to force transfer signal CSNFM00 to a binary ZERO in response to CBOTN and CBRTN microinstructions when the condition being tested is true.

MAJOR GROUP AND SUBCOMMAND DECODE CIRCUITS 201-34

Figure 5B:
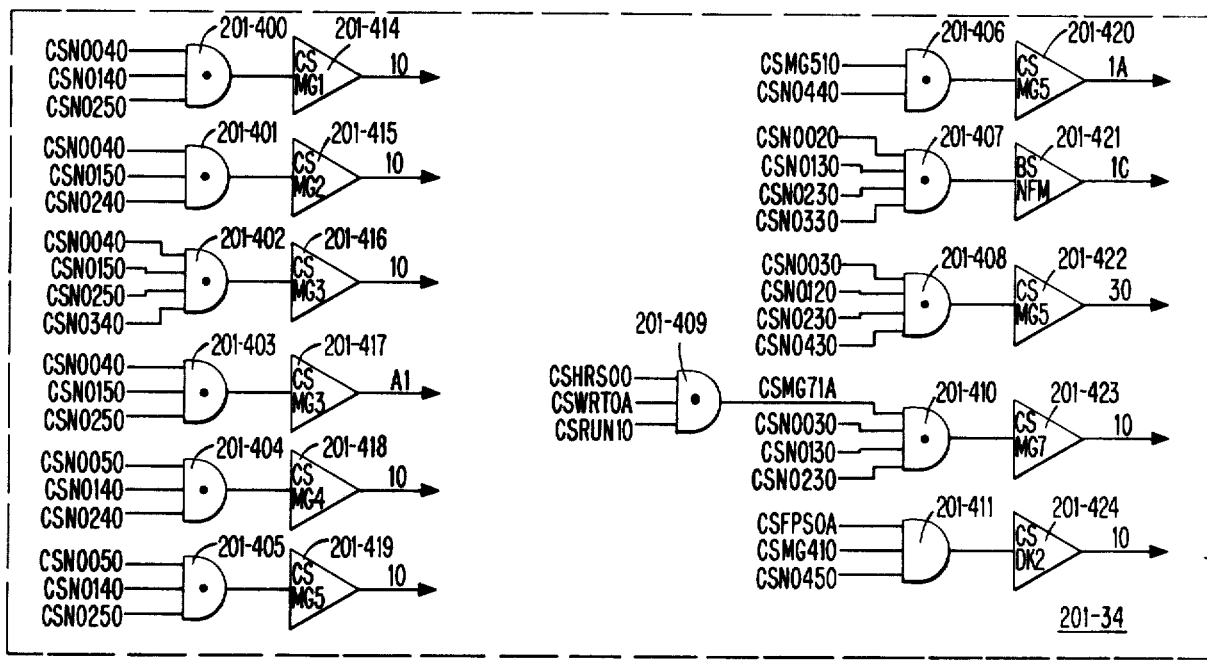

The circuits which generate the various group decode signals applied to the circuits of block 201-32 are shown in detail in FIG. 5b. Referring to the figure, it is seen that the major group signals result primarily from decoding different combinations of the op code bits 0–4. The circuits include a plurality of AND gates 201-400 through 201-411 which are operative to condition their respective amplifier circuits 201-414 through 201-424 in response to different op code bit patterns of the different microinstruction types.

Figure 5E:
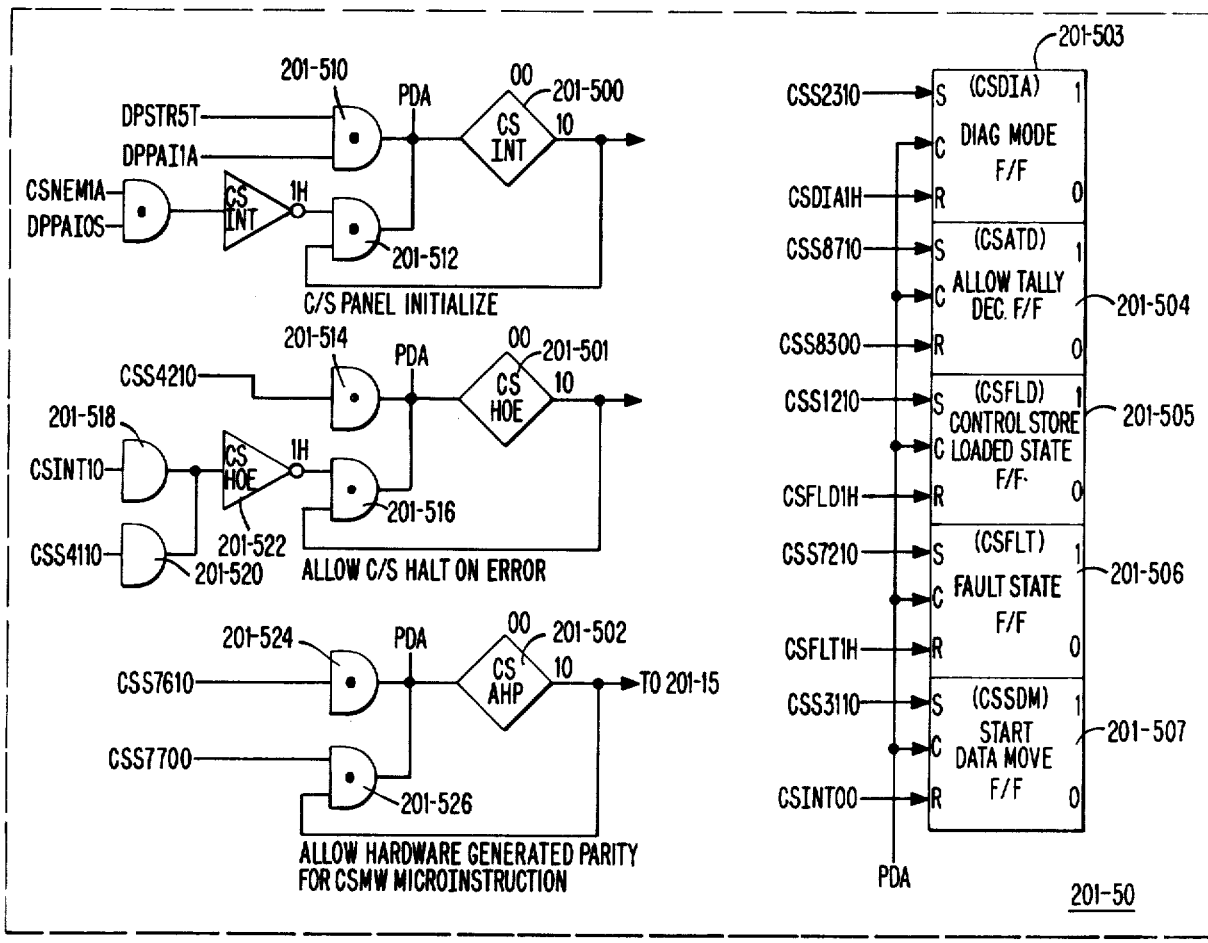
Figure 5C:
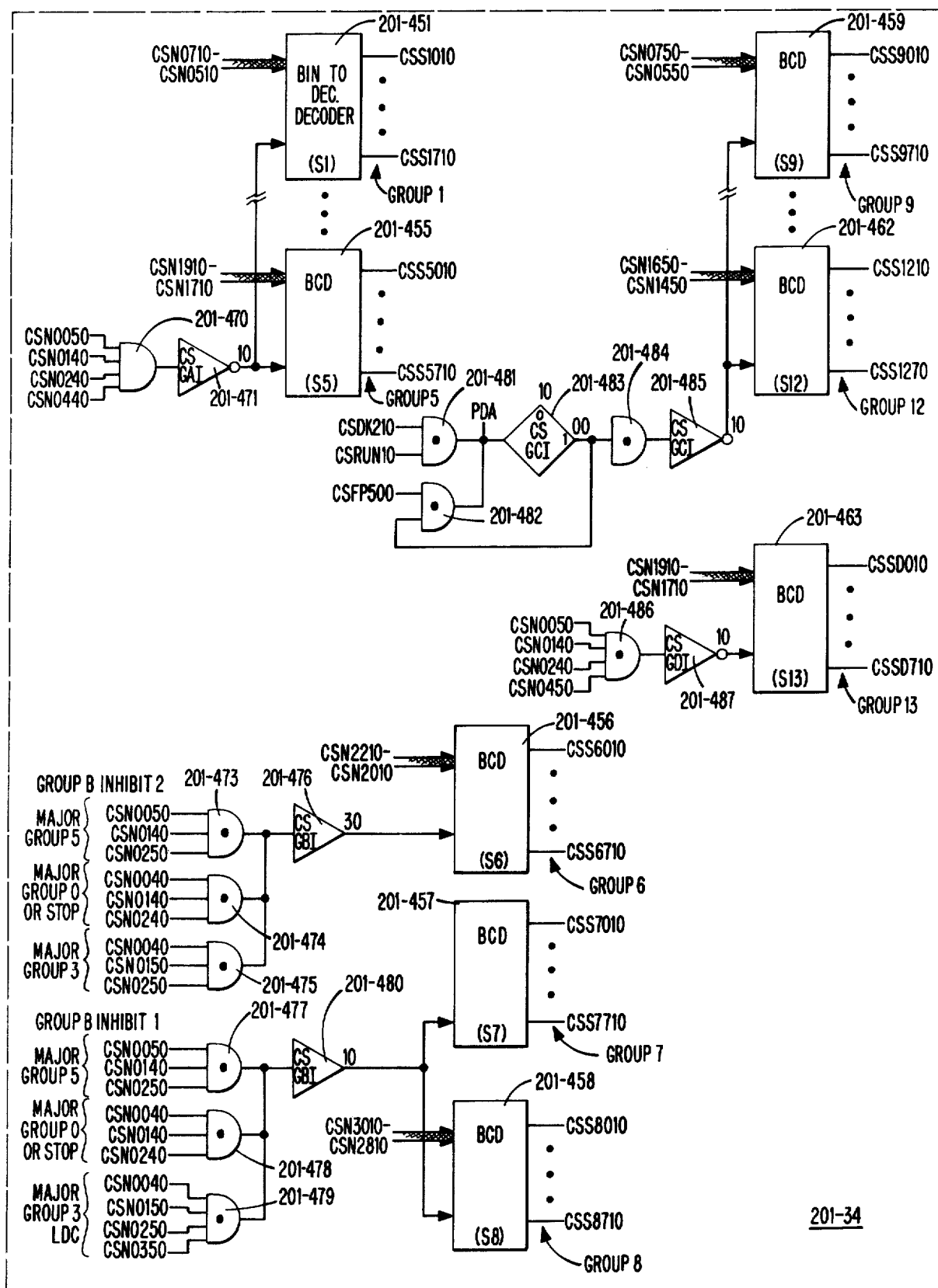

FIG. 5c shows the subcommand decoder circuits which are operative to generate the subcommand signals required for microinstruction execution. As seen from the figure, the subcommands are divided into 13 separate groups of seven subcommands. Thus, block 201-34 includes 13 binary to decimal (BCD) decoder circuits 201-451 through 201-463, each of which decodes a specific group of bits from the memory local register 201-16. The high order bit input of each decoder circuit is used as an enable input and receives inhibit signals (i.e., CSGAI10 through CSGDI10) generated by different ones of the circuits 201-470 through 201-487. This means than when an inhibit signal is forced to a binary ONE, this inhibits the decoding of subcommand signals because the input codes now have values higher than those required for generating the seven subcommands.

The inhibit signals labeled groups A through D are specified as follows:

1. CSGAI10 = (group A) for subcommand decoder groups 1–5. It is forced to a binary ZERO only in response to DCK1 microinstructions.
2. CSGBI10 = (group B) for subcommand decoder groups 7–8. It is forced to a binary ZERO in response to all microinstruction groups except group 0, group 5, or LDC microinstructions.
3. CSGBI30 = (group B) for subcommand decoder group 6. It is forced to a binary ZERO in response to all microinstruction groups except group 0, group 3, and group 5.
4. CSGCI10 = (group C) for subcommand decoder groups 9–12. It is forced to a binary ZERO only in response to DCK2 microinstructions.
5. CSGDI10 = (group D) for subcommand decoder group 13. It is forced to a binary ZERO only in response to DCK2 microinstructions.

TEST INDICATOR AND BRANCH CIRCUITS 201-36

FIG. 5d shows the circuits for decoding the two six bit groups of test field bits included within group 5 microinstructions. As seen from the figure, the circuits include four groups of multiplexer circuits. Two of the groups corresponding to blocks 201-600 and 201-602 each include eight multiplexer circuits. The other two groups corresponding to blocks 201-604 and 201-606 each include a single multiplexer circuit. Each multiplexer selector circuit has eight inputs, each of which is connected to receive a predetermined indicator signal representative of a particular condition.

The particular condition to be selected by each multiplexer circuit of blocks 201-600 and 201-602 is designated by test field 1 bits CSN20-22 and test field 2 bits CSN27-29. The remaining three bits of each test field are used to select one of the eight outputs from each group of eight multiplexer circuits (i.e., signals CSTF10A-CSTF10H and CSTF20A-CSTF20H), as shown. An AND gate and inverter circuit combine the test field 1 and test field 2 indicator output signals and forces signal CSATT10 to a binary ONE when the condition tested by test field 1 or test field 2 is true.

MAJOR STATE CIRCUITS 201-50

The major state circuits include a plurality of flip-flops 201-500 through 201-507, a number of which are shown in FIG. 5e. For the purpose of simplicity, only three of the flip-flops are shown with the circuits associated therewith. However, the other flip-flops include similar circuit arrangements.

The flip-flop 201-500 indicates when the control section 201 has been initialized. The AND gate 201-510 switches flip-flop 201-500 to a binary ONE when a control store initialize button is depressed. The AND gate 201-512 resets the flip-flop upon the release of the button and when signal CSNEM1A goes high. The CSINT10 signal is used to reset the CSR and CSI registers 201-22 and 201-26, as explained herein and places the adapter 200 and S2P processor in a known state.

The flip-flop 201-501 allows the control section 201 to halt operation upon the detection of a "hardware" error, a control store memory parity error, a register parity error (i.e., the CSA, CSI, and CSR registers), or a nonexistent memory check error. The gate 201-514 switches the flip-flop to a binary ONE in response to subcommand signal CSS4210. The flip-flop resets in response to depression of the initialize button or in response to subcommand signal CSS4110. When reset, the flip-flop 201-501 does not cause a halt in system operation in response to control store errors. The errors just cause the setting of appropriate status indicators. It will be appreciated that the mode of operation enabled by flip-flop 201-501 finds advantage when the system is conditioned to execute basic logic test and maintenance verification routines for testing checking circuit operation.

The next flip-flop 201-502 allows selection of either unmodified 36 bits for writing into the control store 201-10 (i.e., when signal CSAHP10 = 0) or parity check bits generated by circuits of block 201-15 for writing into the control store 201-10 (i.e., when signal CSAHP10 = 1). The flip-flop 201-502 is switched to a binary ONE subcommand signal CSS7610 via gate 201-524. It is reset by subcommand signal CSS7700 via AND gate 201-526.

The flip-flop 201-503 is a diagnostic mode used during the execution of maintenance verification routines as a status indicator. It is switched to a binary ONE by subcommand signal CSS2310 and reset to a binary ZERO by hold signal CSDIA1H. The flip-flop 201-504 defines the mode of the CST tally counter 201-54. When set to a binary ONE by subcommand signal CSS8710, the flip-flop indicates that the counter is in a "down-count" mode. When reset to a binary ZERO by subcommand signal CSS8300, the flip-flop indicates that the counter is in an "up-count" mode.

The flip-flop 201-506 is a status flip-flop which, when set to a binary ONE, indicates that the control store 201-10 has been loaded with "personality firmware". It is switched to a binary ONE in response to subcommand signal CSS1210 and is reset to a ZERO by hold signal CSFLD1H which is forced to a ZERO when the control store panel initialize button is depressed.

The last flip-flop 201-507 is a start data move flip-flop which activates the circuits included in the data section 210-20 to move data through the adapter 200. It is switched to a binary ONE in response to subcommand signal CSS3110. The flip-flop is reset to a binary ZERO by forcing signal CSINT00 to a binary ZERO. The signal CSINT00 is forced low by the data section circuits, an S2P initialize signal or by subcommand signals.

DATA CONTROL DECODE CIRCUITS 201-40

For the most part, these circuits are similar to the circuits of FIGS. 5a through FIG. 5c. FIG. 5g shows in greater detail the circuits which condition data section 210-6 and multiplexer circuit 210-10 during the execution of CSMR and LDC microinstructions. Referring to the figure, it is seen that the control signal BSNFM10 is generated when a flip-flop 201-700 is switched to a binary ONE via an AND gate 201-702 or an AND gate 201-704 in response to either an LDC group 3 microinstruction and CSMR group 7 microinstruction, respectively. The AND gate 201-706 resets the flip-flop to a binary ONE state upon the occurrence of the next clock pulse.

READ/WRITE AND PARITY GENERATION CIRCUITS 201-15

The circuits generate certain control signals required for the execution of a control store write operation. Referring to FIG. 5g, it is seen that the circuits include a pair of series connected flip-flops 201-150 and 201-151. The binary ONES outputs of the flip-flops are combined in an AND gate 201-159 to cause an amplifier circuit 201-160 to produce the write control pulse CSWRT10.

The flip-flop 201-151 is switched to a binary ONE in response to signal DPCSE10 generated by the depression of a control panel button and applied via gate 201-157. The AND gate 201-158 switches the flip-flop 201-151 to a binary ONE in response to a CSMW microinstruction. An AND gate 201-155 resets the flip-flop to a binary ZERO upon the occurrence of a next clock pulse.

Several of the circuits which are conditioned by signals produced from flip-flop 201-151 include a pair of flip-flops 201-161 and 201-162. The flip-flop 201-161 is switched to a binary ONE by write signal CSWRT1A via an AND gate 201-163. An AND gate 201-164 also switches the flip-flop to a binary ONE in response to a CSMR group 7 microinstruction. Upon the occurrence of a subsequent clock pulse, an AND gate 201-165 resets the flip-flop to a binary ZERO state.

The binary ONE signal from flip-flop 201-161 when applied via gate 201-166 causes flip-flop 201-162 to switch to a binary ONE. The ONE signal from this flip-flop is used to inhibit the parity check circuit 201-44 from performing a check on the address contents of CSI register 201-26 after the execution of CSMR and CSMW microinstructions or after a control panel initiated write operation. The flip-flop 201-162 is reset via an AND gate 201-167 in response to an LCSIK group 6 microinstruction (i.e., CSIFN10 = 1), a control store initialize signal (i.e., CSINT10 = 1), or a subcommand signal (i.e., CSS7310 = 1). Thus, flip-flop 201-162 inhibits parity checking of CSI register 201-26 after a control store read or write cycle of operation until the CSI register 201-26 is again loaded with good parity via an LCSIK microinstruction, an initialize signal or firmware subcommand.

FIG. 5g also includes the parity generator circuits which generate new parity bits for a word written into control store 201-10 during the execution of a CSMW microinstruction. The parity circuits are conventional in design.

As seen from the figure, each of four parity generator circuits generates an odd parity check bit for the bits of a different one of four bytes which make up the word. The odd check bit (i.e., signals BSZP110 through BSZP410) from each circuit is applied to a different one of a first group of AND gates 201-174 through 201-176. The original unmodified bits (i.e., signals BSZ3210 through BSZ3510) are applied to different ones of a second group of AND gates 201-175 through 201-177, as shown.

The circuits 201-180 through 201-184 provide for either the selection of the parity bits generated by the circuits 201-170 through 201-173 (i.e., when signal CSAHP10 = 1) or the unmodified BSZ bits (signal CSAHP10 = 0). As mentioned previously, the first mode of operation constitutes a normal mode of operation which enables data to be written into scratch pad locations of control store 201-10, as explained herein. The second mode of operation, as mentioned, is used during the execution of load control store and basic logic test routines. The signals CSAUP10 and CSAGP10 are a binary ZERO and a binary ONE, respectively, when the control store 201-10 is placed in a stop mode. This allows the generation of new parity check bits in response to control panel initiated write operations notwithstanding the state of signal CSAHP10.

PARITY CHECK CIRCUITS AND ERROR Circuits 201-42 through 201-45

FIG. 5h shows the parity check circuits of blocks 201-42, 201-43, and 201-44, together with associated flip-flops and gating circuits of block 201-45. Only one of the parity check circuits is shown in detail. Each parity check circuit includes two series connected parity generator circuits (i.e., circuit 201-428 and 201-426), which are conventional in design.

The first circuit performs an Exclusive OR of the high order eight bits of its associated register while the second circuit performs an Exclusive OR of the low order eight bits of the same register to which it adds a carry provided by the first circuit.

When the number of ONE bits is even, the second circuit forces its output terminal to a binary ONE (i.e., signal CSAPE1A = 1) to signal an error condition.

It will be noted that some of the parity check circuits receive more than one enable signal (i.e., CSHRS00, CSL0G10, CSIIC00). Normally, these signals are binary ONES which, in turn, enable the parity check circuits during system operation.

Each of the parity error signals CSAPE1A, CSRPE1A, and CSIPE1A is applied as an input to a corresponding one of the flip-flops 201-800 through 201-802. The flip-flop 201-800 is switched to a binary ONE by an AND gate 201-803 when signal CSWRT0A is a binary ONE (not a control panel or CSMW microinstruction write operation). The flip-flops 201-801 and 201-802 are switched to binary ONES in response to signals CSRPE1A and CSIPE1A, respectively.

The binary ZERO outputs from each of the flip-flops are combined to an AND gate, the output of which is applied to a gate and inverter circuit 201-812 and to an AND gate 201-814. The circuit 201-812 forces signal CSARE10 to a binary ONE when any one of the error flip-flops 201-800 through 201-802 is switched to a binary ONE. The AND gate 201-814 combines the various types of control store errors and forces the output of an inverter circuit 201-816 to a binary ONE in response to an error. The error signals include control store parity errors detected by the circuits included as part of memory output register 201-16 (i.e., signals CSPER00 through CSPER60), control store addressing conditions (i.e., signal CSNEM00) in addition to the register parity error indicated by signal CSAER1A.

DATA SECTION 210-6.

FIG. 5f shows a portion of the data section 210-6. As indicated previously, the same arrangement of circuits is used to process the low order data bits 36-71 received fro a second input multiplexer circuit, not shown.

Referring to FIG. 5f, it is seen that the section includes a group of three 36 bit labeled registers 210-900 through 210-902, BSY1, BSX1, and BSN1. The BSY1 and BSX1 registers are connected as inputs to another multiplexer circuit 210-904 which connects to bus BSZ. The output of the circuit 210-904 is applied as source of A operand signals to an arithmetic and logic unit (ALU) 210-906. The BSN1 register serves as a source of B operand signals.

The output of the ALU 210-906 is applied to a bus BSZ and as inputs to each of the registers 210-900 through 210-902, as shown. Each of the registers also receives the output from multiplexer circuit 210-10. During the execution of group 3 microinstructions (MG310 = 1), the bit pair D1.D2 enables the delivery of the ALU output simultaneously to the BSX1, BSY1, and BSN1 registers. The bit pair D5.D6 enables the delivery of the multiplexer circuit output (BSMI) to the BSX1, BSY1 and BSN1 registers when CSMG310 = 1.

As mentioned, the portion of data section 210-6 not shown includes the same arrangement of registers designated BSY2, BSY2, and BSN2. These registers, as well as registers BSY1, BSX1, and BSN1, connect to multiplexer circuits (i.e., 210-904) whose outputs apply input signals to multiplexer circuits 210-81 and 210-88.

S2P Control Panel Logic Circuits 201-55

FIG. 5i shows the interface control circuits which are pertinent to our understanding of the present invention in addition to the circuits which performed a pre-scan of the control store 201-10. All of these circuits are included as part of block 201-55 for ease of explanation. Referring to the figure, it is seen that the circuits include a pair of series connected flip-flops 201-550 and 201-552. The first flip-flop is switched to a binary ONE whenever the control store initialize button is released and remains set until the scan is successfully completed (i.e., signal CSB0210 = 1), or a control store error is detected (i.e., signal CSAER10 = 1).

The second flip-flop 201-552 switches to a binary ONE via gate 201-600 one clock pulse following the switching of flip-flop 201-550 to a binary ONE. (That is, the signals CSASC00; and CSASC30; CSAER00 are used to generate signal CSASCOT, end of ROM scan, which causes the control section 201 to enter the RUN mode at the completion of a successful scan.)

As mentioned also, FIG. 5i shows the logic circuits and flip-flops which provide an interface between the adapter 200 and the S2P processor 300 and forms part of a control interface. The control interface is utilized by adapter 200 to perform operations such as the storing in main memory 150 of program parameters upon the detection of a trap condition and the loading/restoring of program parameters from main memory 150 necessary for dispatching a job to be run on the S2P processor in addition to performing various control panel functions. In accordance with the present invention, the control interface enables the adaptor 200 to run and stop the S2P processor 300, clear and initialize the processor, change its address mode and sense switchings. As explained herein, the adapter 200 utilizes the control interface and with modifications to the interrupt mode logic circuits of the S2P processor 300, it is able to initiate and terminate at data processing speeds all operations requested by the host processor 100.

Referring to FIG. 5i, it is seen that a number of pairs of AND gate logic circuits (i.e, AND gates 201-560 through 201-567 and AND gates 201-590 through 201-593) are Ored together with the resultant outputs being applied as inputs to the different circuits normally included in the S2P processor 300. This arrangement eliminates the need for additional lines to be included in the control interface in that the two sources of control signals, the control panel of FIG. 8 when enabled and the adapter 200, provide signals which are Ored together. The resulting signals are then applied to the S2P processor 300.

In FIG. 5i, the DP prefix is used to indicate signals which are generated by means of the control panel while the CS prefix is used to designate signals generated in response to microinstructions read out from the adaptor control store of FIG. 2. The specific group codings which cause the generation of the different CS signals will be discussed later herein.

The AND gates 201-600 through 201-602 when enabled by the control signals and corresponding ones of the flip-flops 201-642, 201-645, and 201-650 force signals CSSII10, CSSEI10, and CSSCI10 to binary ONES. These signals are applied as another set of input signals to the interrupt circuits of the S2P processor 300. The interrupt circuits are described in greater detail herein with reference to FIG. 9. The group of AND gates 201-690 through 201-701, when appropriately conditioned by either subcommand signals or control panel signals condition amplifier circuits 201-702 through 201-707 to force signals DPCMD10 through DPCIN10 to binary ONES. These signals are applied via the control interface to the cycle control circuits of the S2P processor 300. Then allow various control memory panel functions such as displaying register contents, entering addresses, etc., to be performed by the S2P processor 300. The manner in which the S2P processor performs such operations can be considered as being conventional.

Another group of AND gates 201-606 through 201-610 when appropriately conditioned by either subcommand control signals or control panel signals force signals CS2CM10 through CS4CM10 to binary ONES. These signals are applied as inputs to the character mode circuits of the S2P processor 300. The mode circuits can be considered conventional in design and may take the form of those circuits described in U.S. Pat. No. 3,331,056, titled "Variable Width Addressing Arrangement", invented by W. R. Lethin et al. A control panel load signal DPBPL10 is generated via an AND gate and amplifier circuit 201-618. A control store generated strobe signal CSFPS10 and its complement signal CSFPS00 are generated via the flip-flops and gate circuits 201-627 through 201-637 only when a timing signal TCT0111 is received from the S2P processor 300.

The control store of FIG. 2 provides signals for setting different ones of a group of flip-flops (i.e., 201-656 and 201-662) via input gate circuits 201-652 through 201-660. The binary ONES sides of the flip-flops are applied as inputs to the sense switch circuits of the S2P processor 300. The circuits are also conventional in design and may take the form of the circuits described in the referenced programming manuals.

A further group of circuits 201-581 through 201-586 generates an allow S2P panel signal DPAS210 which is applied to an indicator light on the control panel of FIG. 8 and to a control store busy flip-flop 201-626. This flip-flop is set from either the control panel or by control signals from the control store of FIG. 2 via circuits 201-620 through 201-624. It is reset by an AND gate 201-625 when signal PPFIN40 is forced to a binary ZERO by the S2P processor 300, as indicated herein.

Another group of circuits in FIG. 5i generates the control panel signals DPSTR1T and DPSTRS7T which are applied to other ones of the circuits shown. The circuits include the AND gate circuit 201-670, a resettable one-shot circuit 201-672, conventional in design, a pair of series connected flip-flops 201-677 and 201-680, and a pair of output AND gates 201-681 and 201-682 and associated amplifier circuits 201-683 abd 201-684. The resettable one-shot circuit provides a 30 millisecond delay sufficient for removing any noise produced by the depression of the control panel pushbutton switches. A timing signal TCT0421 from the S2P processor 300, when forced to a binary ZERO, resets flip-flop 201-677 via AND gate 201-674 and amplifier circuit 201-675.

A last group of circuits in FIG. 5i serves as an instruction timer which generates signal CT2MO10 which is applied as another input to the T1 test circuits. The circuits include an OR gate 201-710, and amplifier circuit 201-710, a resettable one-shot circuit 201-714, a pair of gates 201-716 and 201-718, and flip-flop 201-720. The resettable one-shot circuit is triggered in response to a DCK2 microinstruction and provides a 250 millisecond delay sufficient for enabling the S2P processor 300 to come to a stop following execution for an instruction. Flip-flop 201-720 is reset and remains reset for the 250 millisecond interval. Thereafter, when the circuit 201-714 resets, flip-flop 201-720 is set via AND gate 201-716.

SYSTEM CONTROL PANEL

Referring to FIG. 8, it is seen that the portion of the control panel shown includes an operator area in which the right side is used in conjunction with the adapter 200 and the left side with the S2P processor. When a CTL-PNL-ENABLE two position toggle switch is placed to the "on" position, the S2P portion of the panel can be used. This portion includes the various features of the control panel normally associated with an S2P type processor.

In addition to the ENABLE switch, the operator area includes an "INIT" (initialize) switch and a CLEAR switch, both of which are momentary contact pushbutton switches. A CHECK indicator is illuminated any time an S2P circuit error is detected. The three CHECK indicators specify the type of error (i.e., 3,2,1 = 000 no error; 0111 = memory error; 101 = cycle or timing error, etc.). Each error causes the S2P processor to be placed in the STOP mode.

The adapter (PIA) portion of the operator area panel includes two switches and six indicators. Since several of these functions were previously discussed in connection with FIG. 2, they will not be discussed further herein.

As seen from FIG. 8, the control panel includes an S2P Sense Switch/Character Mode Enter (SSW/C.M. ENTER) pushbutton switch. The pushbutton allows an operator to set the sense switches and character mode of the S2P processor 300. The ENTER switch is enabled whenever the CTL-PNL-ENABLE switch has been set to the "on" position.

The sense switch settings are determined by the settings of the first eight two position data switches. The switches 0–7 correspond to sense switch 1 through 8. When any data switch is set to the "off" position, the corresponding sense switch in the S2P will be placed in an "off" state.

The character mode switches correspond to data switches 9–10. Only one switch can be on when the SSW/C.M. ENTER pushbutton is pressed. Data switches 8, 9, and 10 select character modes 2, 3, and 4, respectively.

The S2P portion of the control panel, as mentioned previously, duplicates all the functions of a standard S2P type processor control panel. It also includes standard diagnostic functions similar to those discussed in U.S. Pat. No. 3,813,531, invented by Richard L. King et al. The switches in this portion are enabled when either the CTL-PNL-ENABLE switch or M.P. ENABLE switch is placed to the "on" position.

S2P Processor 300

Figure 9:
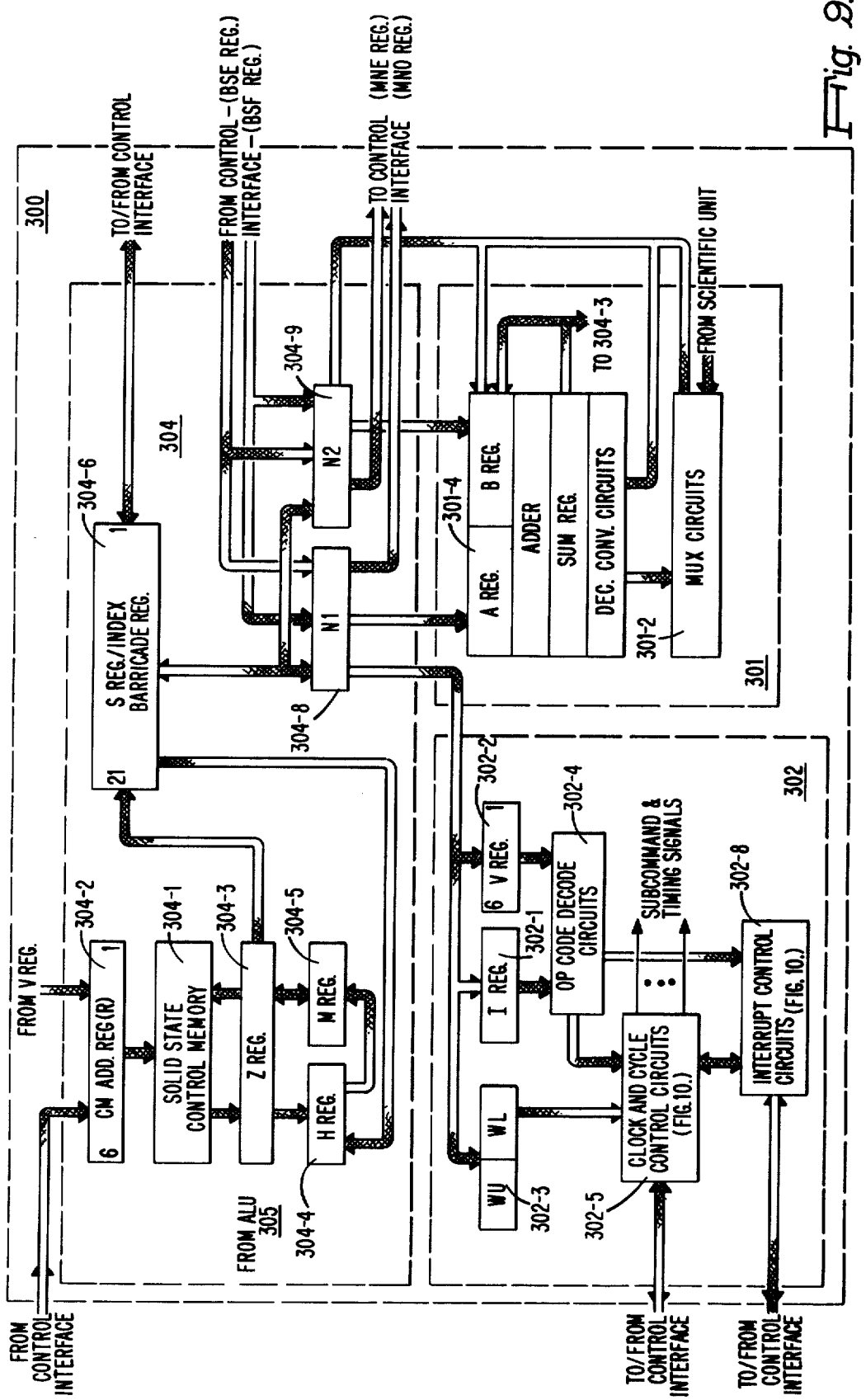

Certain portions of the S2P processor 300 are shown in block form in FIG. 9. For the most part, a number of the elements shown in the figure are described in considerable detail in U.S. Pat. No. 3,811,114, invented by Richard A. Lemay et al. However, it was necessary to alter the arrangement of certain ones of the S2P processor elements in the manner shown in FIGS. 9 and 10.

The S2P processor receives data in groups of two data characters via a pair register 304-8. The N register 304-8 couples to the registers 302-1 through 302-3 of a control section 302 and to the registers of an arithmetic and logic unit (ALU) section 301, as shown.

The S2P processor 300 also includes a memory section 304. This section has a solid state control memory 304-1 which can be addressed from either a control interface (control panel switches or by the adapter 200) or from the CPU sections via a control memory address register 304-2. This register also connects to the control interface for receiving an address generated by adapter 200. This solid state control memory 304-1 comprises 64 addressable storage locations which store addresses and data pertinent to the processing of input/output data transfer instructions and non-scientific instructions. The pair of registers 304-8 and 304-9 serve as a memory local register which are connected to receive a pair of data characters from adapter registers BSE and BSF via the control interface. Also, the contents of these registers are applied as inputs to the adapter registers MNE and MNO via the control interface. Additionally, they are applied to the memory address register 304-6 or they are applied to a temporary storage register 304-4 for modification by an auxiliary increment/decrement register 304-5. The contents read out into register 304-3 are returned either modified or unmodified an R address register(s) of block 304-6. This register also connects to the control interface for receiving a control memory address from adapter 200. The block 304-6 also includes an index/barricade register which connects to the N registers 304-8 and 304-9. Additionally, signals from the memory system 150 can be written into control memory 304-1 via the ALU adder.

The subcommands which cause the above mentioned transfers of address information and modification of the same information are generated by the control section 302. The control section 302 is operative to interpret the various instruction op-codes and, in accordance with the interpretation, generate a sequence of subcommand signals required to execute the operation specified.

Although not shown in FIGS. 9, the central processing control section 302 includes a master clocking unit which provides the basic timing signals for the system and in essence divides the CPU processing cycles into a plurality of time intervals. These timing signals, together with control signals established by a plurality of bi-stable storage devices which comprise the cycle control unit of the system, define a number of major cycles during which specified operations are carried out by the CPU during its extraction and execution of an instruction.

It is seen that section 302 includes a plurality of registers which are arranged to store various portions of an instruction when the instruction has been read out to register 301. The registers include an op code or I register 302-1, a variant character or op code modified V register 302-2, and a further variant or control character storage register designated as W register 302-3. The contents of these registers are applied to op code and decoder circuits 302-4 which, in turn, decode the contents of these various registers and condition the circuits of the clock and cycle control circuit block 302-5 to generate the required sequence of subcommand signals for processing that instruction. The clock and cycle control circuits also are connected to transmit and receive signals from the adapter 200 via the control interface. Additionally, the block includes the various mode flip-flops, such as a RUN, STOP, etc., the outputs of which also couple to the control interface.

The control section 302 includes also the circuits for detecting and processing interrupts. Since a significant number of these circuits and other circuits mentioned above form the standard interrupt circuits used in the standard S2P type processor described in previously mentioned publications, only the changes to the different sections will be discussed in detail herein.

INTERRUPT CONTROL CIRCUITS 302-8

FIG. 10 shows in greater detail the circuits of block 302-8. The circuits include an internal interrupt section 302-80, an external interrupt section 302-130, a continue nterrupt mode section 302-180, an interrupt section 302-240, an S2P trap section 302-260, and a trap register section 302-350. Certain ones of these circuits are disclosed in U.S. Pat. No. 3,803,560, invented by David M. Devoy et al.

Referring to FIG. 9, it is seen that for the most part, the modification to the interrupt control circuits 302-8 involves the addition of interrupt and allow mode flip-flops to sections 302-80, 302-130, and 302-180 which are set and reset by subcommand signals from the adapter 200. Also, the circuits of sections 302-240 and 302-280 were added to enable the adapter 200 to monitor the operation of the S2P processor 300 during its execution of user instructions and stop S2P processor operations upon detecting a "trap" condition.

Since a number of the circuits constitute part of the conventional interrupt logic circuits of an S2P type processor, their operation will be only described briefly herein. Referring first to section 302-80, it is seen that the circuits 302-81 through 302-84 enable the setting and resetting of a service internal interrupt flip-flop 302-85. The circuits 302-86 through 302-102 enable an internal interrupt mode flip-flop 302-94 to be set and reset.

It will be noted that setting of internal interrupt mode flip-flop 302-94 takes place only when an allow signal UIALW10 is a binary ONE. As seen from FIG. 9, this signal is forced to a binary ONE in response to a subcommand signal CSS8750 from adapter 200. The CSS8750 signal applied via a gate 302-124 switches an allow internal mode flip-flop 302-126 of block 302-120 to a binary ONE. An AND gate 302-125 resets the flip-flop 302-126 to a binary ZERO in response to a CLEAR signal PMCLR40 being forced to a binary ZERO.

The circuits 302-121 through 302-123 of block 120 enable the adapter 200 to force the mode flip-flop 302-94 to a binary ONE by forcing signal CSSII50 to a binary ONE.

An internal interrupt request signal UIIMR10 produced by the occurrence of a storage protection violation (i.e., signals HOCVSOO-FPERRZO) when base mode is active (HPBMA10 = 1) sets an internal interrupt demand flip-flop 302-116 when the S2P processor 300 is not in a higher priority mode of interrupt (external or continue) and is not ready in the internal interrupt mode. The demand signal UIIDS10 generated by the circuits 302-103 through 302-116 is applied as a conditioning signal required to set the service interrupt flip-flop 302-85, as shown in FIG. 9.

A similar arrangement is used in section 302-130 for processing external interrupt signals. An external interrupt is generated in response to a control panel interrupt (PCPITOO = 0), the execution of a monitor call instruction (UMCRIOO = 0) when the S2P processor 300 is not already in an external interrupt or a continue interrupt mode. The circuits 302-140 through 302-157 generate and store an external interrupt request signal. The request is serviced when an external interrupt mode flip-flop 302-139 is switched to a binary ONE state via the circuits 302-131 through 302-137 and 302-168 through 302-170. The service demand flip-flop 302-168 is switched to a binary ONE via AND gate 302-169 when an interrupt demand has been stored and an internal interrupt demand has not been stored. The circuits 302-138 through 302-144 provide for resetting of mode flip-flop 302-139 depending upon whether the S2P processor 300 is in the continue interrupt mode of operation.

It will be noted that the external interrupt mode flip-flop 302-139 of block 302-160 can only be switched to binary ONE when the adapter 200 switches an allow external mode flip-flop 302-166 to a binary ONE via circuits 302-164. The allow flip-flop 302-166 is reset via an AND gate 302-165 in response to CLEAR signal PMCLR40. Also, the adapter 200, by switching an external interrupt flip-flop 302-163 via an AND gate 302-161 to a binary ONE, can force the S2P processor 300 into an external interrupt mode of operation. An AND gate 302-162 resets the flip-flop 302-163 one PDA clock later.

The next section 302-180 includes the circuits 302-181 through 302-233 arranged as shown. The circuits include as part of a conventional arrangement, a service continue interrupt flip-flop 302-211, a continue mode allow indicator flip-flop 302-190, a continue interrupt demand flip-flop 302-201, and a continue interrupt mode flip-flop 302-222. Similar to the other sections described, flip flops 302-228 and 302-230 of block 302-225 have been included. They enable adapter 200 to force the S2P processor 300 into the continue interrupt mode or allow mode of operation by switching subcommand signal CSSCI50 or CSSD710 to a binary ONE. Switching takes place via an AND gate 302-226. AND gates 302-227 and 302-233 reset each of the flip-flops 302-228 and 302-233 a PDA clock pulse later.

A request signal UCIMR10 sets flip-flop 302-201 to a binary ONE when enabled by allow signal UCIMA10 and when not already in the continue interrupt mode of operation in response to the conditoning signals (i.e., halt, etc.) applied via the circuits 302-190 through 302-199. The stored request demand for service signal causes the service continue interrupt flip-flop 302-211 to be switched to a binary ONE via circuits 302-205 through 302-209 in the absence of an internal demand signal (UIIDSOO) and an external demand signal (UEIDSOO) having been stored when the S2P processor 300 is in a RUN mode (i.e., PRUNN30 = 1).

The section 302-240 includes circuits 302-241 through 302-242 arranged as shown. The circuits enable an any type interrupt flip-flop 302-262 to be switched to a binary ONE in response to one of the interrupt demand requests being stored (i.e., one of the signals UIIDSOO, UEIDSOO, or UCIDSOO = 1) by one of the sections 302-80, 302-130, or 302-180. The circuits shown represent the conventional arrangement included in S2P type processors.

The next sections 302-280 and 302-350 include circuits 302-281 through 302-333 and circuits 302-351 through 302-360, respectively, arranged as shown. While the S2P processor 300 is executing user program instructions, the adapter control section 201 is in a wait loop testing for memory errors, trap conditions, etc. When a trap condition is detected by section 302-280, it forces a signal JTRAP10 to a binary ONE which, in turn, enables the flip-flop stages of the 16 bit trap register 302-351 to store indications of the cause of the trap condition. This signal also forces an output stage JTR16 to a binary ONE state. The signal JTR1610 is applied via the control interface as an input to the T2 test circuits of block 201-36 and signals the adapter 200 of the need for intervention. The adapter 200, thereafter, by forcing signal CSSD350 to a binary ONE, can shift the information contents out through stage JTR16.

The information stored by the stages of trap register 302-351 is as follows:

Bit 16 — unused, set to a binary ONE to signal the occurrence of a trap condition.

Bit 15 — to a binary ONE in response to a monitor call instruction.

Bit 14 — set to a binary ONE upon the occurrence of an address violation.

Bit 13 — set to a binary ONE upon the occurrence of a protected base mode violation.

Bit 12 — set to a binary ONE in response to a peripheral instruction or an LCR or SCR instruction with a variant character having a value less than 40 (or an S2P HALT instruction).

Bit 11 — set to a binary ONE in response to a control panel interrupt.

Bit 10 — set to a binary ONE upon the occurrence of a scientific unit error.

Bit 9 — set to a binary ONE upon the occurrence of an instruction time out.

Bit 8 — set to a binary ONE when the base mode active indicator is on.

Bit 7 — set to a binary ONE upon the occurrence of an illegal op code.

Bits 6-4 — S2P check light indicators 3-1, different ones of these bits are set to binary ONES upon the occurrence of an error normally indicated on check lights of the S2P system. The specific coding is:

| 3 | 2 | 1 | |
|---|---|---|---|
| 0 | 0 | 0 | no error |
| 0 | 0 | 1 | odd parity |
| 0 | 1 | 0 | even parity |
| 0 | 1 | 1 | odd and even parity |
| 1 | 0 | 0 | non-existent memory |
| 1 | 0 | 1 | cycle or timing |
| 1 | 1 | 0 | floating point mantissa |
| 1 | 1 | 1 | floating point exponent |

Now considering the circuits of section 302-280, it is seen that gate 302-296, in response to attempted execution of privileged op codes, sets the trap flip-flop 302-333 when the S2P processor is not in base mode active or in protect mode (i.e., signals HPBMA10 or HPROCOO = 0). The circuits 302-292 through 302-294 provide the appropriate cycle timing for checking the instruction op codes. The gate 302-289 checks for certain variant characters for BCT instructions (i.e., sense switches and traps on those).

The attempted execution of PDT and PCB peripheral instruction is signalled by AND gate 302-286. The next AND gate 302-285 signals attempted execution of a privileged LCR instruction while the gate 302-284 signals the attempted execution of an SCR instruction with a variant character having a value less than 40 detected via AND gate 302-282. The AND gate 302-281 detects the occurrence of a STOP condition produced by an illegal op code or HALT instruction while the S2P processor 300 is operating in the continue interrupt mode. The AND gate 302-324 provides the appropriate timing cycle during which gate 302-330 sets the trap flip-flop 302-333 to a binary ONE. The gate 302-327 is for future use (i.e., execution of peripheral instructions).

The circuits 302-310 through 302-318 enable the setting of flip-flop 302-320 to a binary ONE when the S2P processor 300 attempts certain operations that have not been allowed. Specifically, the AND gate 302-310 traps the condition of an external interrupt allow is not on. The next AND gate 302-311 generates a trap when the S2P processor 300 tries to enter the continue mode (demand stored) when the continue mode is not allowed.

The remaining AND gates 302-312 through 302-316 trap other conditions. AND gate 302-312 generates a trap when the S2P processor 300 tries to enter internal interrupt mode which is not allowed in response to an RVI instruction. Similarly, AND gate 302-313 detects when there is an attempt to enter the external interrupt mode from internal interrupt mode in response to an RVI instruction. The next AND gate 302-314 detects when there is an internal interrupt demand stored and the internal allow is not on.

The AND gate 302-315 generates a trap when the S2P processor 300 is operating in continue mode and an illegal op code is detected. Lastly, the AND gate 302-316 generates a trap when the S2P processor 300 is in continue mode and a halt occurs.

CLOCK AND CYCLE CONTROL CIRCUITS 302-5

Additionally, FIG. 10 shows a portion of the circuits 302-5 which generate a control signal PPFIN40 via the control interface. This signals the adapter 200 that a particular control panel operation has been completed (i.e., resets the busy flip-flop 201-626). In order to ensure that the adapter 200 is signalled of the completion of an operation in the earliest possible time, a number of logic gates are included for early detection of completion of different types of control operations initiated by adapter 200. This will be seen by referring to FIG. 10.

Referring to FIG. 10, it is seen that the circuits 302-5 include a counter 302-61 and a plurality of AND gate and amplifier circuits 302-51 through 302-60, arranged as shown. When the S2P RUN flip-flop is set to a binary ONE in response to a subcommand from adapter 200, signal PSRUN10 forces the signal PPFINOO to a binary ZERO via a gate 302-53. In a similar fashion, when the S2P STOP flip-flop is set to a binary ONE in response to another subcommand from adapter 200, AND gate 302-52 switches the PPFINOO signal to a binary ZERO.

In both instances, the adapter 200 receives a signal immediately from the S2P processor 300 indicating completion of operations just described.

In the case of commands from adapter 200 specifying control memory operations or clear register operations, there is a fixed amount of time after which either AND gate 305-50 or AND gate 305-51 forces signal PPFINOO to a binary ZERO. For example, each of the signals PPRFP10 and PCPMC10 are forced to binary ONES in response to one of the subcommand signals from adapter 200 (i.e., subcommand signals switch S2P flip-flops to binary ONES) upon the occurrence of signal CT210. During the next occurrence of signal CT210, the AND gates 302-51 and 302-55 force signal PPFINOO to a binary ZERO. Thus, the adapter 200 is signaled of the completion of an operation after a predetermined interval of time (i.e., time between successive occurrences of signal CT210).

In addition to enabling different ones of the AND gates, the adapter generated subcommands also condition the counter 302-61 to load it with a predetermined count. This count establishes a maximum time interval for the remaining operations after which signal PPRTR10 is forced to a binary ONE. This, in turn, causes circuits 302-57 through 302-59 to force signal PPFINOO to a binary ZERO.

DESCRIPTION OF OPERATION

The operation of the system of the present invention will be described with specific reference to the flow charts of FIG. 11. As mentioned previously, the host processor 300 will have loaded into the 2SSA section of memory of FIG. 5 appropriate values for different ones of the parameters. The loading operation for the purpose of the present invention can be assumed to have been accomplished in a conventional manner. For further information, reference may be made to U.S. Pat. No. 3,618,045, cited previously.

In the case of a new "job" (i.e., a slave job or program) to be run under system control, the various sections of memory shown in FIG. 5 will have been loaded with the necessary parameters, pointers and channel commands as explained herein. It is assumed by way of example that the first channel command to be executed by the adapter 200 is a control command. A channel command consists of one or more words and has the following basic format:

```
       0     5 6  7 8 9                    35
Word 1 |OP CODE|N/D|CF|R/A|COMMAND SPECIFIC|
Word 2 |         COMMAND SPECIFIC          |
```

For a control type channel command, the op code is: 00001; bit 6 = 1; bit 7 = 0/1; and bit 8 = SBZ. Bit 6 is coded to be set to designate a normal or diagnostic mode command; bit 7 is coded to set to a 0 or 1 unless the RUN or S2P control panel enable bit is set; then bit 7 must be set to a 0.

In accordance with the present invention, bits 9-35 serve as an extension of the op code field. These bits of the control command are coded as follows:

| Bits 9-35 | Op Code Extension Field |
|---|---|
| 9[1] | SET DIAGNOSTIC MODE ALLOWED - When set to a binary ONE, this bit conditions the adapter to allow execution of all subsequent diagnostic type channel commands until a control command with bit 10 set to a binary ONE is executed. |
| 10[1] | RESET Diagnostic Mode Allowed - When set to a binary ONE, this bit conditions the adapter to reject all subsequent diagnostic type channel commands. |
| 11[1] | CLEAR - When set to a binary ONE, this bit conditions the adapter to clear the S2P processor. |
| 12[1] | INITIALIZE - When set to a binary ONE, this bit conditions the adapter to initialize the S2P processor. |
| 13[1] | LOAD - With this bit set to a binary ONE, the adapter is conditioned to load the S2P processor with the parameters contained in the 2SSA section of main memory. |
| 14[1] | ONE INSTRUCT - When set to a binary ONE, this bit conditions the adapter to cause the S2P processor to execute the next user program instruction pointed to by the sequence register. |
| 15[2] | RUN - When set to a binary ONE, this bit conditions the adapter to place the S2P processor in the RUN mode. The adapter also enters an execution phase and sets the channel state bits to specify disconnect allowed. |
| 16[2] | S2P CONTROL PANEL ENABLE - When set to a binary ONE, this bit conditions the adapter to enable the S2P control panel section and place the S2P processor in the STOP mode and sets the channel state bits to disconnect allowed. |
| 17[1,2] | STORE - When set to a binary ONE, this bit conditions the adapter to store all S2P parameter information in the 2SSA section of main memory. |
| 18-35 | Reserved for future use. |

[1]This operation is performed during the set-up phase.
[2]This operation is performed during the execution phase.

By way of example, it will be assumed that bits 9, 10, 14, and 16 are set to binary ZEROS. Bits 11, 12, 13, 15, and 17 are set to binary ONES. Referring to FIG. 1, it is seen that the adpater 200 is in an "idle loop" which includes a branch microinstruction which is coded to test the state of an input line connected to a latching amplifier circuit which is forced to a set state when a connect pulse is received from host processor 100 via one of the lines connected to SCU 110. For the purpose of the present invention, the connect pulse is generated in the manner described in U.S. Pat. No. 3,413,613, invented by D. L. Bahrs et al. In this example, it is assumed that the host processor 100 has issued a "connect instruction".

The adapter control section 201 tests the state of one of the major state flip-flops of block 201-50 to establish whether the control section 201 is in a loaded state. Assuming it is loaded, the control section 201 then generates signals required for fetching the channel mailbox pointer word (CMPW) from the communications area of main memory 150 (see FIG. 7). It uses the CMPW pointer address contents of one of the scratchpad locations of control store 201-10 previously loaded. For further information about this section, reference should be made to the copending U.S. Pat. application of Donald R. Taylor titled "Control Store System and Method", bearing Ser. No. 644,777.

Before describing the remaining operations which involve the generation of various subcommand signals, it will be appreciated that these various subcommand signals are produced by including certain codes in different groups S1-S13. The following lists the group codes relevant to a discussion of the present invention.

GROUP S2

| Code | Action |
|---|---|
| 000 | none |
| 001 | reset connect |
| 010 | reset T & D allow |
| 011 | set T & D allow |

GROUP S6

| Code | Action |
|---|---|
| 000 | none |
| 001 | halt PIA |
| 010 | F/W SS4 → 0 |
| 011 | F/W SS4 → 1 |
| 100 | F/W SS3 → 0 |
| 101 | F/W SS3 → 1 |
| 110 | CLEAR MEM ERRS |
| 111 | not used |

GROUP S7

| Code | Action |
|---|---|
| 000 | none |
| 001 | MAIN MEM REQ |
| 010 | SET FAULT STATE |
| 011 | ALLOW CSI PARITY CHECK - not used |
| 100 | F/W SS2 → 0 |
| 101 | F/W SS2 → 1 |
| 110 | ALLOW H/W WRT PAR |
| 111 | INHIBIT W/W WRT PAR |

GROUP S8

| Code | Action |
|---|---|
| 000 | none |
| 001 | WRITE ASSOC |
| 010 | MODIFY TALLY CTR |
| 011 | ALLOW TALLY CTR |
| 100 | F/W SS1 → 0 |
| 101 | F/W SS1 → 1 |
| 110 | LOAD TALLY CTR |
| 111 | ALLOW TALLY DECR |

GROUP S9

| Code | Action |
|---|---|
| 000 | none |
| 001 | S2P STOP |
| 010 | S2P RUN |
| 011 | S2P INITIALIZE |
| 100 | S2P ONE INST |
| 101 | S2P PER INT |
| 110 | S2P S+1 |
| 111 | S2P S−1 |

GROUP S10

| Code | Action |
|---|---|
| 000 | none |
| 001 | LOAD S2P SENSE SWITCH |
| 010 | not used |
| 011 | S2P SYSTEM CLEAR |
| 100 | S2P ENTER S |
| 101 | S2P ENTER N |
| 110 | S2P DISPLAY S |
| 111 | S2P DISPLAY N |

GROUP S11

| Code | Action |
|---|---|
| 000 | none |
| 001 | not used |
| 010 | S2P SET 2 C.M. |
| 011 | S2P SET 3 C.M. |
| 100 | S2P SET 4 C.M. |
| 101 | START DATA PUMP |
| 110 | STOP DATA PUMP |
| 111 | S2P SET II ALLOW |

GROUP S12

| Code | Action |
|---|---|
| 000 | none |
| 001 | S2P SET II MODE |
| 010 | S2P SET EI MODE |
| 011 | S2P SET CI MODE |
| 100 | not used |
| 101 | not used |
| 110 | ALLOW S2R REG FROM PANEL |
| 111 | S2P SET EI ALLOW |

GROUP S13

| Code | Action |
|---|---|
| 000 | none |
| 001 | CONTROL PANEL ALLOW |
| 010 | CONTROL PANEL INHIBIT |
| 011 | N/A |
| 100 | not used |
| 101 | not used |
| 110 | not used |
| 111 | S2P SET C.I. ALLOW |

From FIG. 11, it is seen that following testing for errors, the adapter control section 201 reads out a microinstruction word which when decoded generates a reset connect subcommand signal (group S2 = 001). Next, the section 201 tests the states of bits 1-2 of the CMPW upon its transfer to the X1 register of the data section 210-6. When a branch and test microinstruction detects that bits 0-1 are in states "10" indicative that the "connect" was issued, the adapter sets the CMPW bits 0-1 to a binary ONE state. The modified CMPW is written back into main memory 150. This signals the host processor 100 that it cannot issue further "connects" (i.e., processing a connect).

As seen from FIG. 11, the adapter control section 201 fetches the 2SSA pointer and BAR of the CMB section of main memory 150 using the pointer address contained in the CMPW (see FIG. 7). Assuming no memory errors, bit 8 of the address is tested. This bit should be a binary ONE indicating that it is a relative and not an absolute address. Assuming no error, the adapter control section checks bit 8 of the BAR which must be zero (i.e., absolute address).

Next, the size and channel status buffer (CSB) pointer are fetched from the CMB. Assuming that CSB pointer is valid (i.e., within a certain value), the first channel command CC1 is then fetched from main memory 150. The address for the command is obtained by adding the appropriate value of 8 to the channel mailbox pointer address used to fetch words from the CMB area of main memory 150.

Assuming no error, the adapter control section 201 executes a microinstruction which resets a pair of sense switch indicator flip-flops SW1 and SW4, not shown, whose binary ONE outputs connect to the test and branch circuits 201-36 of control section 201 (T2 test indicators). The states of these flip-flops are tested to determine what sections of main memory 150 information is being fetched from (i.e., slave area) for the purpose of error detection and whether the first channel command is being fetched. When SW1 and SW4 are reset, this indicates that the fetch is not from the slave area (user program) of main memory 150 and that the first channel command is being processed by the adapter 200.

As seen from FIG. 11, the channel command address pointer is updated and stored in the address ALU section 210-2. The channel command CC1 is loaded into the data ALU section 210-6. Next, the adapter control section 201 executes a series of conditional branch on test microinstructions to decode the channel command op code. Since the channel command is a control command, the adapter control section 201 next clears all working registers in the adapter 200.

As seen from FIG. 11, the adapter control section 201 executes another conditional branch on test microinstruction which tests the state of bit 9 of the channel command. Since it is assumed that bit 9 is a binary ZERO, a further microinstruction is executed which tests the state of bit 10 of the channel command. Since this bit is a binary ONE in the example, the control store 201-10 branches to a routine SCLRINZ as shown in FIG. 11.

The first operation the adapter 200 performs is to test whether the S2P processor 300 is in a STOP condition. This is done by testing the state of a RUN flip-flop, not shown, included in processor 300. The output of the flip-flop connects to one of the control interface lines which is applied as an input to the T2 test indicator circuits of block 201-36. If the RUN flip-flop is in a binary ONE state, a DCK2 microinstruction is executed which issues an S2P stop command, as discussed herein.

Figure 6A:
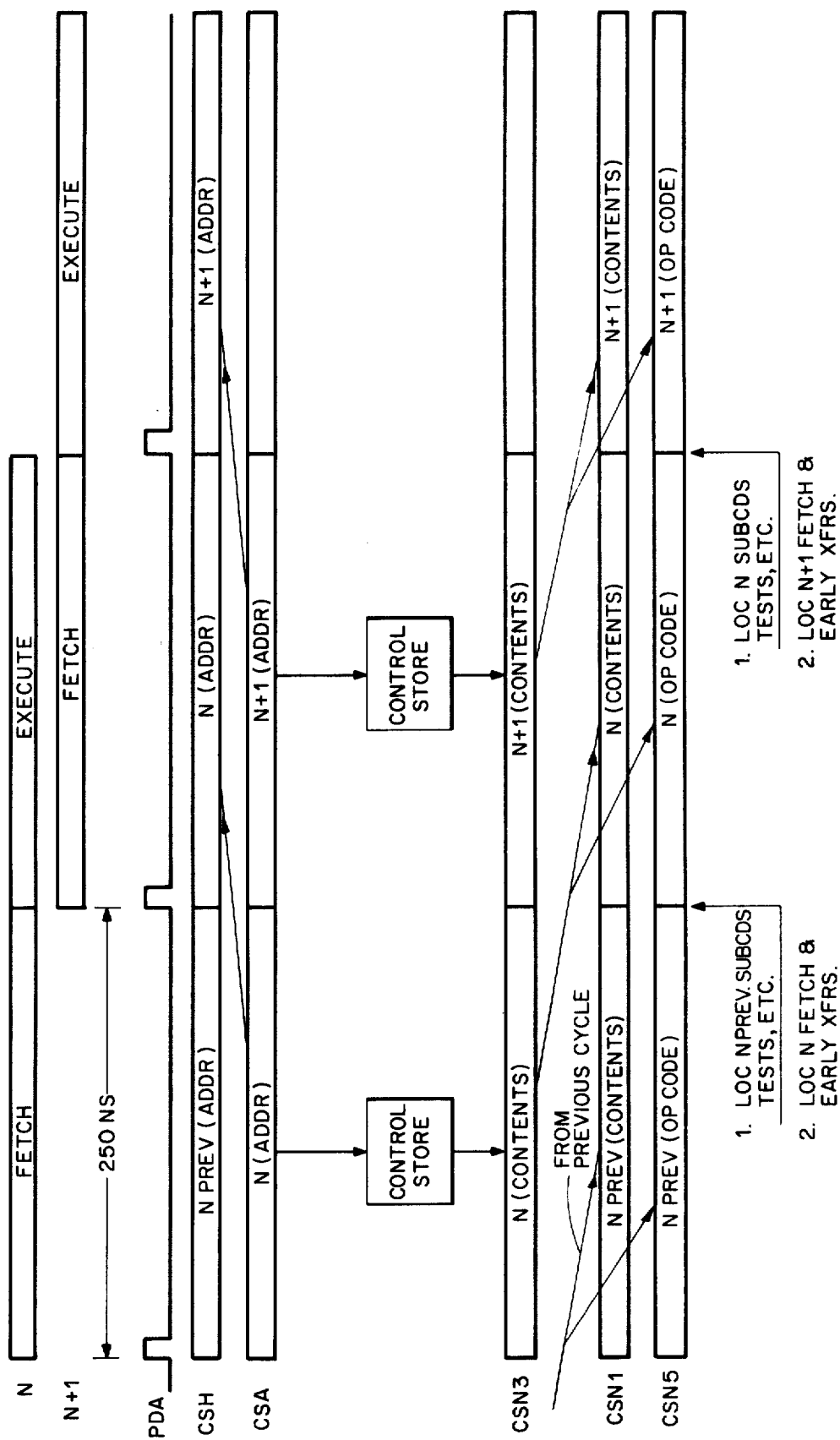
FIGS. 6a and 6b are timing diagrams used in describing the operation of the system of FIG. 2.
Figure 6B:
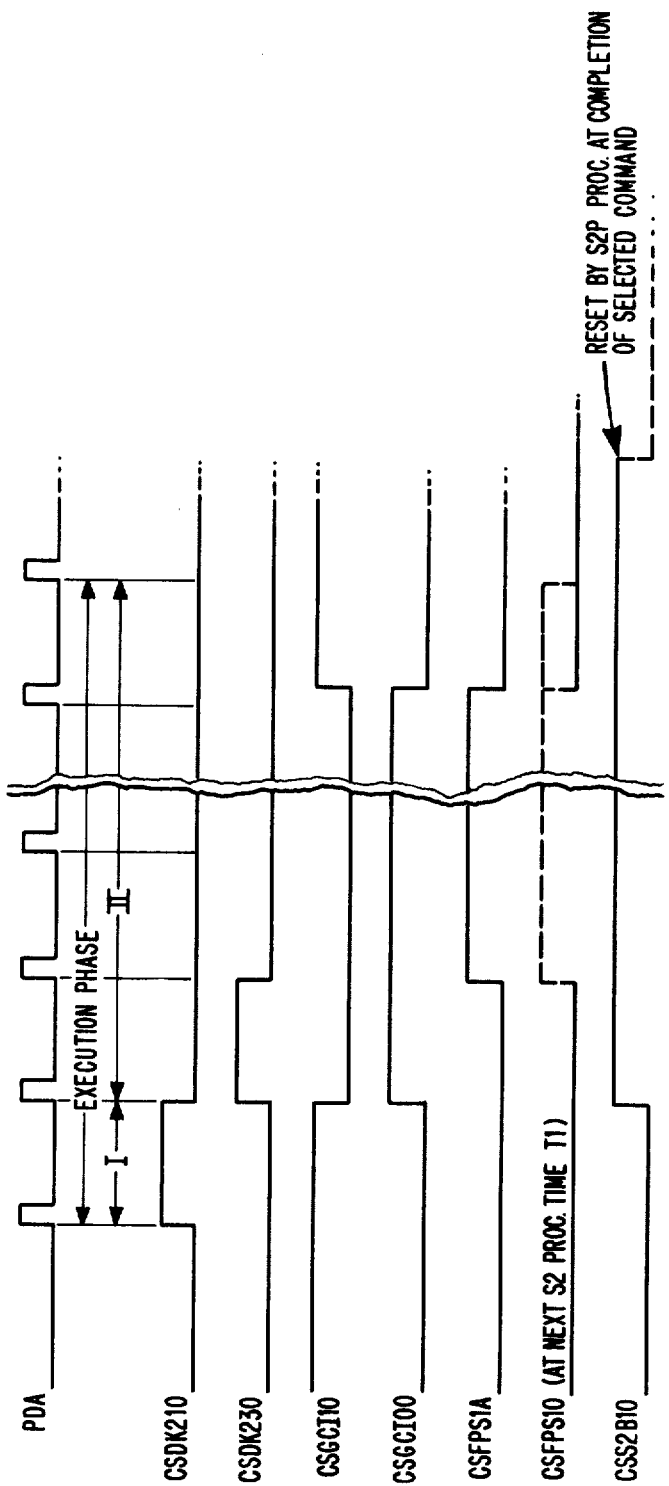

The manner in which the DCK2 microinstruction execution takes place is illustrated in FIG. 6b. Referring to the figure, it is seen that during a first phase I, the subcommand fields containing groups S6-S13 are decoded. This results in forcing signal CSDK210 to a binary ONE which upon the occurrence of a PDA clock pulse switches the allow F/W panel strobe flip-flop 201-629 and the S2 busy flip-flop 201-626 of FIG. 5i to binary ONES. One clock pulse later, the allow panel strobe flip-flop 201-629 switches to a binary ZERO while the panel strobe flip-flop 201-633 switches signal CSFPS1A to a binary ONE (see FIG.10). Also, as a result of decoding the DCK2 microinstruction, subcommand signal CSS9110 is forced to a binary ONE which enables signal DPSTP10 to be switched at the appropriate time to a binary ONE. That is, when the S2P processor clocking circuits force timing signal TCT0111 to a binary ONE, this forces the strobe signal CSFPS10 to a binary ONE. This signal strobes AND gate 201-563, forcing signal DPSTP10 to a binary ONE. This signal is applied via one of the lines of the control interface as an input the clock and cycle control circuits 302-5 of FIG. 9. When the S2P processor is in RUN mode, this indicates that the STOP is allowed (i.e., flip-flop is set to a binary ONE). During a next V3 cycle of the S2P processor, processor cycling is brought to an orderly halt as is the case in normal operation. At that time the S2P RUN flip-flop is switched to a binary ZERO.

As seen from FIG. 11, the adapter control section following execution of the DCK2 microinstruction begins execution of a branch and test microinstruction to test the state of the RUN flip-flop included in the S2P processor 300. Although in normal operation depression of the STOP pushbutton causes the S2P processor to enter the STOP mode, the mode is not entered until the instruction currently being processed will be fully executed and all peripheral data transfers still in progress are completed. Therefore, a STOP flip-flop is not tested in this instance.

Since the operation is a panel operation, a certain amount of time is normally required to carry out the operation. Therefore, following execution of each DCK2 microinstruction, a panel busy routine is executed which tests the state of the busy flip-flop 201-626. Briefly, this routine counts how many PDA clock pulses to keep track of, how many microseconds which have elapsed from the time the command was issued to the S2P processor 300. The busy flip-flop 201-626 can be reset as early as 1.75 microseconds and as late as 9.5 microseconds following its setting. When the routine detects that the flip-flop has not been reset after 9.5 microseconds, it causes the control store 201-10 to branch to a routine which generates status signals indicating to the host processor 100 that the S2P processor 300 is not operational (see FIG. 10).

As seen from FIG. 9, the busy flip-flop remains set until signal PPFIN40 is forced to a binary ZERO by S2P processor 300. The S2P processor 300 forces the PPFIN40 low upon completion of an operation (i.e., DISPLAY, CLEAR, STOP, RUN, etc.) which could be initiated from the control panel. All of the signals normally generated by the S2P type processor upon the completion of such operations are essentially Ored together to provide the PPFIN40 signal applied to adapter 200 via one of the lines of the control interface (see FIG. 9).

Continuing on with the description of operation, it is seen from FIG. 11 that the adapter control section 201 tests the state of bit 12 to establish whether the S2P processor 300 is to be initialized. During the first time through this routine, the adapter 300 executes a branch on test microinstruction for testing the state of bit 12. When the bit is set, the adapter control section 201 executes another DCK2 microinstruction. This microinstruction causes an initialize command to be sent to the S2P processor 300 via one of the lines of the control interface. That is, it causes signal DPS2I10 to be forced to a binary ONE in the same manner as described previously (i.e., when signal CSFPS10 is forced to a binary ONE at time interval TCT0111).

The adapter 300 establishes that the S2P processor 300 has executed the initialize command by executing a branch and test microinstruction, as explained herein. During normal S2P operation, the initialize signal is effective when the S2P processor signals that the STOP mode is allowed or when the STOP command (pushbutton) is generated prior to the initialize command (pushbutton). An initialize signal normally causes the S2P processor 300 to terminate processing operations immediately, to reset the cycle counter and various indicators, mode flip-flops, clear registers, etc.

That is, when the STOP mode is allowed, the initialize command is generated and control section 201 again references the busy routine which tests the state of the busy flip-flop 201-626 to establish that the S2P processor 300 has completed execution of the DCK2 microinstruction.

Assuming that the busy flip-flop is reset by the S2P processor 300 within the appropriate time period, the control section 201 then executes successive branch and test microinstructions resulting in a return to the $CTRL routine and the testing of load bit 13 of the control channel command.

As seen from FIG. 11, when the initialize bit 12 is not set and clear bit 11 is set, the adapter 300 issues a master clear command by executing a DCK2 microinstruction. This causes signal DPSZC10 to be forced to a binary ONE in the manner previously described. As seen from FIG. 5i, this signal is applied via a control interface line to the S2P processor 300. When a binary ONE, the busy flip-flop 201-626 is tested to determine that the clear command had been executed by the S2P processor 300. Thereafter, the control section 201 returns to the $CTRL routine.

The $CLRINZ routine is also entered in other situations. For example, when the initialize bit 12 of the control channel command is a binary ZERO, and load bit 13 of the command is a binary ONE, routine $CLRINZ is entered from a routine $LDS2P. That is, when the initialize bit is a binary ZERO, the exit point is A2 and the $LDS2P routine is entered at point D where the state of the initialize bit is again tested by a branch and test microinstruction. This test is included to detect the situation when a control channel command is coded to specify a load operation and by mistake the initialize bit has not been set. In this case, the adapter 300 causes an initialize request during a first pass through the $CLRINZ routine at the appropriate point as seen from FIG. 11.

As seen from FIG. 11, the adapter control section 201 during its second pass through the $CLRINZ routine automatically sends an initialize command to the S2P processor 300 in the manner previously described. However, when it tests the state of the initialize bit, it will not be set to a binary ONE. This causes an exit through point D1 into the $LDS2P routine.

From the above, it is seen that the state of the initialize bit 12 signals whether the entry into the $CLRINZ routine was from the control channel decode routine $CTRL or from the load routine $LDS2P. No matter what entry path was selected, the adapter 200 places the S2P processor 300 in a known state before actually proceeding with the load operation.

Referring to FIG. 11, it is seen that the 2SSA pointer to the PCA of FIG. 7 is stored in the scratchpad location of the control store 201-10. The adapter 200 then begins resetting the contents of various S2P control memory registers (i.e., sequence register, A and B address registers). The adapter 200 under microprogram control executes a load constant microinstruction for loading ZEROS into the BSN1 register of the data section 210-6 (FIG. 5f). This is followed by execution of a DRCL microinstruction which transfers the ZERO contents of the BSN1 register to the BSX1 register.

By executing another microinstruction, a constant of 77 is loaded into the BSN1 register. This constant corresponds to the address of the sequence register location in the S2P control memory 304-1 of FIG. 9. Via another DRCL microinstruction, the address constant is transferred from the BSN1 register to the BSX2 register of the data section 210-6 (duplicate of FIG. 5f). Another DRCL microinstruction is executed which loads the tally counter 201-56 with the 77 value of the address constant.

With the appropriate registers having been loaded, the adapter control section 201 executes a DCK2 microinstruction coded to include a control memory enter subcommand. That is, signal CSSA410 is forced to a binary ONE which causes AND gate 201-693 to force subcommand signal DPCME10 to a binary ONE when strobe signal CSFPS10 switches to a binary ONE (see FIG. 5i).

The DPCME10 signal causes the S2P processor 300 to take the constant contents of the six most significant bit positions of the tally counter 201-56 and store them in the R register 304-2 of the S2P processor 30. Simultaneously with loading the R register 304-2, the data contents of the X1 register of data section 210-6 are loaded into the S register 304-6 shifted left by one bit position. That is, bits 15-34 are loaded into the S register 304-6 (bit 35 is not used). The loading is done in response to subcommand signal DPCME10. The S2P processor 300, in response to signal DPCME10, loads control memory register No. 77 (contents of R register 304-2) with the data contents of the S register 304-6 generated by the adapter 200. The S2P processor 300 performs the operation in a conventional manner.

Since signal DPCME10 is a subcommand required to be executed by S2P processor 300, the adapter control section 201 enters the panel busy routine and waits for signal PPFIN40 from the S2P processor 300 indicating completion of the operation. As soon as the operation is completed, the same sequence of operations is repeated for loading the "A" address register (octal 70) and "B" address register (octal 74).

Following the loading of the control memory registers, as seen from FIG. 11, the adapter 200 executes a branch and test microinstruction which tests the state of the scientific option bit 13 of PCAW4. If a binary ONE, the adapter 200 executes a further branch and test microinstruction to determine if the scientific option is included within the S2P processor 300 (i.e., tests the state of another indicator signal from the S2P processor 300).

When the scientific option is present, the adapter 200 enters a $SCIOPT routine which generates signals resulting in the construction of a low order result (LOR) instruction in the data section 210-6. This instruction, as well as the other two instructions discussed next, has the format described in the previously referenced manuals. The adapter 200 also fetches the scientific option data from the 2SSA area of main memory 150 and loads it into the appropriate field of the LOR instruction.

Also, the adapter 200 executes microinstructions for setting the appropriate registers with the address control section 210-2 to addresses which specify registers within data section 210-6. For example, by setting a first address register to ZEROS and a second address register to octal 10, this specifies that the first 20 octal locations are to be taken from the registers of the data section 210-6. When the LOR instruction is executed by the S2P processor 300 when in the STOP mode, data stored in the BSX registers of the data section 210-6 is referenced in lieu of referencing locations in main memory 150.

As seen in FIG. 11, the adapter control section 201 executes a $EXECUTE routine which includes another DCK2 microinstruction. This generates an instruct command signal DPCIN10 via AND gate 201-701 of FIG. 5i. That is, signal CSS9410 is forced to a binary ONE which, in turn, causes AND gate 201-701 to force signal DPCIN10 to a binary ONE when strobe signal CSFPS10 switches to a binary ONE. This causes the S2P processor 300 and the scientific option unit to execute the LOR instruction which results in loading data into the LOR register of the scientific unit. Additionally, signal CSS9410 triggers the instruction timer of FIG. 5i which, in turn, switches flip-flop 201-270 to a binary ONE.

The adapter 200 establishes that the LOR instruction was executed correctly by checking that section 302-80 did not generate a trap signal and that the S2P processor 300 came to an orderly halt within 250 milliseconds established by the resettable one-shot timer circuit 201-714 of FIG. 5i. That is, via branch and test microinstructions, the adapter 200 tests the state of the busy flip-flop 201-626 to establish that the DCK2 microinstruction was executed successfully. Next, it tests the state of the S2P STOP flip-flop and the state of instruction timer flip-flop 201-720. When the S2P processor 300 is operating properly, it should come to a STOP within 250 milliseconds. Upon establishing that the S2P processor 300 is in the STOP mode, the adapter tests the state of trap signal JTR1610. When the instruction has been properly executed, no trap signal will be present and the S2P processor will be in the STOP mode. As seen from FIG. 11, when the S2P processor 300 does not enter the STOP mode within the required time, the adapter 300 signals that the S2P processor 300 is not operational. It will be noted that the above sequence is similar to the operations performed by the $LDS2P and $STRS2P routines of FIG. 11 which will be discussed later herein. Since the testing sequence of operations described in verifying instruction execution is performed in connection with all instructions, it will not be discussed further herein.

Referring to FIG. 11, it is seen that, next, adapter 200 executes a routine $LIBSIB which constructs an S2P LIB instruction. The adapter 200 also fetches index/-barricade register value from the 2SSA area of main memory 150. The address of the value is loaded into the field of the S2P LIB instruction. The adapter 200, as seen from FIG. 11, again executes the $EXECUTE routine which includes a DCK2 microinstruction coded to specify another instruct command. In the manner indicated above, the instruct command causes the S2P processor 300 to execute the LIB instruction which results in the loading of the index/barricade register of the S2P processor 300 included in block 304-6 of FIG. 9 via the registers 304-8 and 304-9.

The adapter 200 then determines that the operation has proceeded properly and that the busy flip-flop 201-626 has been reset indicating completion of the operation. Next, the S2P parameters which are coded to specify the state of the S2P processor 300 (i.e., character mode, interrupt mode, allowed modes) are loaded into the S2P processor 300. The adapter 200 executes a series of branch and test microinstructions which decode the states of the PCAW4 interrupt and allow bits. Based upon the results, the adapter 200 sets states of allow flip-flops 201-642, 201-645, and 201-650 and generates the command signals CSSII10, CSSEI10, and CSSCI10, as appropriate.

That is, other DCK2 microinstructions are executed which generate subcommand signals CSSB710, CSSC710, CSSD710, CSSC110, CSSC210, and CSSC310.

The signals CSSB710, CSSC710, and CSSD710, when generated, switch corresponding ones of the allow flip-flops 201-642, 201-645, and 201-650 of FIG. 5i, respectively, to binary ONES. The states of the PCAW4 establish which ones of the flip-flops will be set. The same subcommand signals are applied via the control interface to the corresponding ones of the allow interrupt mode flip-flops of block 301-8 of FIG. 9.

In a similar fashion, the subcommand signals CSSC110, CSSC210, and CSSC310, when generated in response to a DCK2 microinstruction, force corresponding ones of the AND gates 201-600, 201-601, and 201-602 to binary ONES. The set S2P interrupt command signals are also applied as inputs to the interrupt control circuits of block 302-8 and in turn set different ones of the interrupt mode flip-flops of FIG. 10.

In each of the above cases, the DCK2 microinstruction sets the busy flip-flop 201-626 and waits for the S2P processor 300 to reset it by forcing signal PPFIN40 to a binary ZERO. Accordingly, the adapter 200 enters the busy routine following testing of the S2P STOP flip-flop.

As seen from FIG. 11, the adapter 200 next constructs an S2P RVI instruction in the manner previously described. The variant character indicator data is fetched from the 2SSA area of main memory 150 and loaded into data section 210-6. Since it is one of the variant characters which defines the character mode, the states of the bits within one of variant characters are used to force one of the AND gates 201-606, 201-608, or 201-614 of FIG. 5i to a binary ONE. This, in turn, forces one of the character mode command signals CS2CM10, CS3CM10, or CS4CM10 to a binary ONE. The command signal is applied to the clock and cycle control circuits of block 302-5 of FIG. 9.

Next, as seen from FIG. 11, the adapter section 201 enters the $EXECUTE routine which generates an instruct command by executing a DCK2 microinstruction which generates the command signal DPCIN10. The same DCK2 microinstruction when executed generates an appropriate one of the subcommand signals CSSB210, CSSB310, or CSSB410, forcing a corresponding one of the character mode command signals CS2CM10, CS3CM10, or CS4CM10 to a binary ONE.

In the manner discussed above, the DCK2 microinstruction when executed switches the busy flip-flop 201-626 on and the adapter 200 waits for the S2P processor 300 to reset busy flip-flop 201-626. The S2P processor 300 in response to the RVI instruction loads the variant indicator characters therein (i.e., V register 302-2, WU/WL register 302-3, S mode, Proceed, Relocation char. mode, and option indicators).

Assuming that the RVI instruction was executed properly (i.e., no trap condition detected and orderly STOP), the adapter 200 next loads the various registers (octal addresses 40 through 77) of S2P control memory 304-1 with data fetched from the 2SSA area of main memory 150. The loading operation is carried out in a fashion similar to that of loading the sequence registers. However, in this case, the data resides in the 2SSA area. Therefore, the address registers in the address control section 210-2 now designate locations in main memory 150.

Assuming no errors during the fetching of data from main memory 150 and the writing or entering of the data into the S2P control memory 304-1, the adapter 200 executes a microinstruction which loads the program timeout constant value in PCAW3 into tally counter 201-58. The adapter control section 201 returns to control channel command decode routine $CTRL.

Next, the adapter 200 executes a test and branch microinstruction at point A3 which tests the state of INSTRUCT bit 14 of the control command. When the bit is a binary ONE, the adapter 200 enters the $INSTR routine of FIG. 11. As seen from the figure, the adapter 200 continues execution of the routine by testing the state of the control channel command RUN bit 15 via another test and branch microinstruction. Since the RUN bit should not be set, a further branch and test microinstruction tests the state of the control panel enable bit 16. Since it is assumed that the operation is not a maintenance panel operation, the adapter 200 executes a further branch and test microinstruction.

The above tests ensure that neither of the above bits was inadvertently set. The INSTRUCT, RUN, and control panel enable are defined to be mutually exclusive, otherwise it is declared an illegal sequence. Next, the adapter 200 tests the adapter 200 tests the state of the S2P STOP flip-flop via another branch and test microinstruction. The appropriate addresses are loaded into the address and control section 210-2 via a $PARAM routine. This routine loads the address registers such that the S2P processor 300 first fetches data from main memory 150 and not from data section 210-6. As seen from FIG. 11, the adapter 200 generates an INSTRUCT command to the S2P processor 300. The adapter 200 tests the state of the busy flip-flop to determine that the S2P processor 300 executed the INSTRUCT command.

Assuming that the above mentioned command was executed properly, the adapter 200 sequences to a RUN wait loop routine $S2ACTV of FIG. 11. The $ACTV routine represents the completion of those operations required for setup of the S2P processor 300 and the start of the execution portion of the control channel command.

During the execution, the S2P processor 300 enters the RUN mode in response to the INSTRUCT command and executes one instruction whose main memory address is specified by the contents of the control memory sequence counter. As seen from the figure, the adapter 200 executes a series of test and branch microinstructions. The first microinstruction tests the state of the S2P STOP flip-flop to determine whether the S2P processor has completed execution of the instruction. When a binary ZERO, the adapter 200 exits to routine $DUNINS. As explained herein, this routine establishes whether the S2P processor 300 came to an orderly halt. When the adapter 200 detects that the S2P instruction timer was not set, this indicates that the previous operation was successful. However, when the S2P STOP flip-flop has not been reset, the adapter 200 continues to perform the tests indicated. That is, it executes test and branch microinstructions to determine whether a trap bit was detected indicating that the S2P processor 300 was accessing data from outside the assigned user memory area, or a main memory or control store occurred (i.e., tests error indicator signals applied to test circuits of block 201-36). These tests ensure that S2P system operation is proceeding properly. Next, the adapter 200 checks whether the host processor 100 has issued a disconnect signal concluding further operation of the S2P processor. The host processor 100 issues the disconnect signal in the same manner as the connect.

In addition to the above tests, the adapter 200 tests whether the tally counter 201-56 has been decremented beyond zero. As mentioned previously, the counter 201-58 was loaded with a timeout constant. This count is decremented by one every six microseconds by the adapter 200 (complete full cycle of operation when the S2P processor 300 is executing more than one instruction). Once having been decremented to zero, the counter sets the underflow indicator signalling that the time for the particular user program being executed by the S2P processor 300 has been exhausted.

The last test which is particularly pertinent to the INSTRUCT operation determines whether the S2P processor 300 is executing one instruction. When it is (i.e., instruct bit = 1), the adapter 200 executes a further test and branch microinstruction which tests the state of an indicator signal which is applied as one input to the T1 test circuits 201-36 via the control interface. When the S2P processor is not in a one instruct mode, the adapter 200 decrements the tally counter 201-56 by one.

It will be noted that when the INSTRUCT bit 14 is a binary ZERO, the adapter 200 executes a further test and branch microinstruction of the $CTRL routine which tests the state of RUN bit 15. When this bit of the channel control command is a binary ONE, the adapter 200 references a routine $RUNETH.

It is seen that the routine $RUNETH causes the adapter 200 to execute a first test and branch microinstruction which tests the state of the control panel enable bit 16 and the C. F. bit 7, both of which should be binary ZEROS (i.e., illegal sequence if both are not ZEROS). A next test and branch microinstruction tests the state of the S2P STOP flip-flop which sould be a binary ONE at the time. The adapter 200 next executes a $ALWDIS routine which sets the state bits of the CMPW previously fetched from main memory 150 to a code indicating that disconnect is allowed by the host processor 100 (more than one instruction). The Address Control Section 210-2 is then loaded with the appropriate address via the $PARAM routine so as to cause data to be fetched from main memory 150.

The adapter 200 then generates a RUN command signal DPGOB10 by executing a DCK2 microinstruction. The DCK2 microinstruction forces subcommand signal CSS9210 to a binary ONE which conditions AND gate 201-565 to switch signal DPGOB10 to a binary ONE. The RUN command is applied to the S2P RUN flip-flop via the control interface switching it to a binary ONE. As soon as switching takes place, the circuits of FIG. 11 force signal PPFIN40 to a binary ZERO signaling the adapter 200 that the operation has been completed.

As seen from FIG. 11, the adapter 200 executes another test and branch microinstruction which examines the state of busy flip-flop 201-626 and when it switches to ZERO, this indicates that the command execution proceeded properly.

The adapter 200 then begins execution of the $S2ACTV routine discussed above. This routine as mentioned above, signals the start of control command execution. The S2P processor 300 upon being switched to the RUN mode executes user instructions from main memory 150 until a trap condition or other condition has been detected by the adapter 200 as explained herein.

Assuming normal operation, the adapter 200 continues execution of the $S2ACTV routine until the tally counter 201-56 decrements to zero. This causes the adapter 200 to enter the $STPTRU routine from the entry point $UNFLOW. The $STPTRU routine, as described previously, checks to see that the S2P processor 300 came to an orderly halt. It then tests the state of trap signal JTR1610 to determine whether any of the conditions defined by the contents of the trap register were detected. When signal JTR1610 is a binary ZERO, the adapter 200 tests to determine whether additional cycles are required to complete execution of certain types of instructions. More specifically, if an S2P monitor call instruction was being executed by the S2P processor 300, but did not generate a trap signal, additional cycles would be required to exchange the sequence counters. Accordingly, the adapter 200 upon detecting that "coasting is required" executes a further DCK2 microinstruction which generates another ONE INSTRUCT command.

As seen from FIG. 11, the adapter 200 completes execution of the $STPTRU routine by writing any residue data back into main memory 150, storing the address contents of the tally counter 501-56 in main memory 150 and load the BAR in memory.

As shown, the adapter 200 returns to point I4 in the S2ACTV routine from the entry $UNFLOW from the point at which the above action was requested. The adapter 200 zeros out the PCAW3 and, assuming no trap, generates tally time-out states and stores that in the scratchpad area of adapter control store 201-10. The adapter 200 then returns to the control channel command decode routine $CTRL.

It is seen that the adapter 200 executes a further test and branch microinstruction for determining the state of the STORE bit 17 of the control channel command. Assuming the bit is a binary ONE, the adapter 200 begins execution of a $STRS2P routine. This routine can be viewed as performing operations opposite to those performed by the $LDS2P routine. That is, the adapter 200 executes microinstruction which load the tally counter with a control memory address and the X register of data section 210-6 receives the contents of the control memory location specified.

For each location, a DCK2 microinstruction is executed by adapter 200. This microinstruction is coded to specify a display control memory command DPCMM10. That is, the microinstruction when executed forces subcommand signal CSS9710 to a binary ONE which conditions AND gate 201-697 to force signal DPCMM10 to a binary ONE. The signal applied via the control interface conditions the circuits of block 302-5 of FIG. 9. The S2P processor 300 then reads out the contents from each control memory 304-1 location via the N1 and N2 registers 304-8 and 304-9 to data section 210-6. From there, the contents are written into the 2SSA area of main memory 150.

The adapter 200 executes test and branch microinstruction to ensure that there were no memory errors or control memory display errors (i.e., tests the states of indicator signals applied to circuits 201-36). The bank bits in the control memory sequence register, A and B address registers are reset. Next, the adapter 200 stores the state of the S2P processor 300 (i.e., continue, external, or internal interrupt mode).

The adapter 200 then constructs an SVI instruction in the same manner it constructed other user instructions. This is followed by the execution of a DCK2 microinstruction coded to generate a ONE INSTRUCT command. In response to the command, the S2P processor 300 executes the SVI instruction which results in a transfer to the adapter 200 of seven variant characters coded to specify the state of the S2P processor 300. When the adapter 200 detects that no error conditions were generated (i.e., no trap condition was generated), that the busy flip-flop 201-626 was reset within the appropriate time period, and that the STOP flip-flop was set (i.e., the instruction was executed properly), the adapter 200 writes the variant characters from the register of data section 210-6 into the 2SSA area of main memory 150.

Assuming no main memory error, the adapter 200 tests the state of the scientific option bit in PCAW4 and whether the scientific option is present (tests the state of an address indicator). When present, the adapter 200 executes a microinstruction sequence $SCIOPT by which it constructs a STORE LOR instruction. This instruction is coded to store the contents of the low order result register of the S2P scientific unit.

Again, the adapter 200 executes a DCK2 microinstruction included in the $EXECUTE routine which generates another ONE INSTRUCT command. The adapter 200 then writes the LOR value into the 2SSA area. The last instruction constructed by adapter 200 is an SIB instruction for storing the contents of the S2P index/barricade register of block 304-6. The S2P processor 300 in response to another ONE INSTRUCT command delivers the contents of the index/barricade register to the adapter 200 which writes same from the data section 210-6 into the 2SSA area of memory 150.

Assuming no errors, the adapter 200 returns to a normal termination routine $NRMT. The $NRMT routine causes the adapter 200 to modify the CMPW state bits to specify a ready status indicating that the adapter 200 is ready to process another connect instruction (i.e., sets state bits = 0.1).

In the case where there was a normal termination, the adapter 200 enters the $NRMT routine at point $NRMT040. Next, the appropriate information is written into the CSB status word 1 in main memory 150 and sets the state bits in the CMPW to 00, indicating an inactive status (i.e., ready for another CONNECT) and returns to the wait routine $WTLP.

From the above, it is seen how the preferred embodiment of the present invention enables expeditious processing of user program instructions by a foreign processor by means of a single channel command issued by the host processor. In the preferred embodiment, the setup of the various registers and indicators of the foreign processor established in accordance with information stored in the system's main memory proceeds at computer speeds during a setup phase of the channel command. Moreover, during the execution phase of the same command, the operation of the foreign processor is maintained to ensure that execution proceeds properly and does not interfere with the normal operation of the host processor.

Additionally, the preferred embodiment of the present invention minimizes the amount of circuits required for controlling the operation of the foreign processor by generating certain user program instructions for storage and read out of information for the processing of user program instructions.

It will be obvious that many changes can be made to the adapter and processor of the preferred embodiment.

To prevent undue burdening the description with matter within the ken of those skilled in the art, a block diagram approach has been followed, with a detailed functional description of each block and specific identification of the circuits it represents. The individual engineer is free to select elements and components such as flip-flop circuits, shift registers, etc., from the individual's own background or available standard references as given herein.

It will also be noted that the exact coding patterns for all microinstructions were not disclosed herein since the engineer is free to select alternate forms of coding. For further details and insight into techniques and deriving such coding and for additional background information concerning the system, reference may be made to the text titled, "Computer Design Fundamentals" by Chu, McGrawHill Book Company, Inc., copyright 1962, and the text titled, "Microprogramming Principles and Practice" by S.S. Husson, Prentice-Hall, Inc., copyright 1970.

While in accordance with the provisions and statutes there has been illustrated and described the best form of the invention known, certain changes may be made to the system described without departing from the spirit of the invention as set forth in the appended claims and, in some cases, certain features of the invention may be used to advantage without a corresponding use of other features.

What is claimed is:

1. A system for executing instructions of a target syste program, said system including a host processor, a main memory and a system control unit coupled to said host processor and to said main memory, said main memory including a plurality of memory areas, a first area storing said instructions of said target system program and a second area storing a plurality of channel commands, said plurality including at least one channel control command coded to specify a number of functions required for initiating the execution of said target system program by said system, said system further including an emulator coupled to said system control unit for fetching said commands and said instructions from said memory, said emulator comprising:
  a microprogrammed adapter for executing said plurality of said channel commands fetched from said second area, said adapter comprising:
    an addressable control store for storing a plurality of sequences of microinstructions;
    branch and test control means for controlling the addressing of said control store during the execution of each said channel command, and for testing the presence of operations coded in the control portion of said one channel control command for establishing next microinstruction sequences to be referenced;
    decoder circuits coupled to said control store for generating command control signals in response to the read out of said plurality of microinstruction sequences;
    control logic circuits coupled to said decoder circuits;
    an input/output processing section coupled to said control store, said decoder circuits, and said system control unit for receiving information from said main memory, including said one channel control command; and
    a control interface coupled to said decoder circuits and to said control logic circuits;
  said processing apparatus further including:
  a processing unit for processing said instructions, said processing unit being coupled to said input/output processing section and to said control interface, said processing unit comprising:
    control circuits;
    an arithmetic and logic unit; and
    a control memory;
  said control circuits, said arithmetic and logic unit and said control memory being coupled to said control interface,
  said control store being operative in response to receipt of said one channel command to reference a first one of said microinstruction sequences, said decoder circuits generating a set of said command control signals for conditioning said control logic circuits to apply signals to said control interface for presetting said arithmetic and logic unit, said control memory, and said control circuits to the proper operational states specified by said coded functions within said one channel command for proper execution of sid instructions of said target system program.

2. The system of claim 1 wherein said channel control command includes an op code portion coded to specify a control operation and a control field portion including a number of bits coded to specify different ones of said number of functions.

3. The system of claim 2 wherein said first one of said sequences includes a first type of microinstruction, said first type of microinstruction having an op code portion coded for specifying a direct control operation and a control portion coded to specify commands required for initiating the execution of at least one of said number of functions.

4. The system of claim 3 wherein said first one of said sequences includes a plurality of said first types of microinstructions, each having a control portion coded to specify a different one of said command required for the execution of a specific one of said number of functions.

5. The system of claim 3 wherein said control circuits include means for generating a control signal on said control interface indicating completion of execution of said one of said number of functions by said processing unit; and,
  said control logic circuits including means for detecting the presence of said control signal, said means for detecting conditioning said control store for referencing another one of said plurality of sequences for execution of another one of said functions.

6. The system of claim 3 wherein said number of bits of said control field portion corresponds to the number of different functions required for initiating proper execution of said program and wherein each of said bits when in a predetermined state specifies that the corresponding one of said number of said functions is to be performed by said adapter.

7. The system of claim 6 wherein first and second ones of said number when in said predetermined state specifies that said processing unit is to be placed in a ONE INSTRUCT and RUN mode of operation, respectively, for execution of one and a plurality of said instructions.

8. The system of claim 7 wherein said control store is conditioned to reference said first one of said sequences during a first phase of executing said channel control command and said control store being conditioned during a second phase of execution upon detecting that one of said first and second bits is in said predetermined state to reference another sequence for monitoring the state of said processing unit during said execution of each instruction.

9. The system of claim 8 wherein said processing unit further includes trap detection circuits coupled to said control interface and said control circuits, said detection circuits being operative in response to signals indicative of a trap condition to apply a signal to said control interface for conditioning said control store to reference other microinstructions within said first sequence, said decoder circuits in response to said other microinstructions generating signals for testing the state of a third bit of said control command for storing parameter signals indicative of the state of said processing unit in accordance with said coding of said control command.

10. The system of claim 9 wherein said trap detection circuits include op code detection signals operative upon detecting attempted execution of an instruction having an op code coded to specify a call for a supervisory function to generate said signal indicative of said trap condition.

11. The system of claim 9 wherein a third one of said areas of said main memory corresponds to a status saving area and wherein said processing unit further includes a plurality of registers for storing signals required for the processing of said instructions, said control store being conditioned by said third bit when in said predetermined state during execution of said first one of said sequences to reference a group of microinstructions of another one of said sequences and said decoder circuits in response to said microinstructions generating predetermined sets of signals for storing signals representative of the contents of said control memory and said plurality of registers in said third area for subsequent reference by said host processor.

12. The system of claim 11 wherein certain ones of said predetermined sets of signals successively condition said input/output processing section to store signals representative of a series of different predetermined types of system instructions executable by said processing unit for read out of said contents of said plurality of said registers for storing in said third area.

13. The system of claim 11 wherein said group of microinstructions includes a number of said first type of microinstructions similarly coded for conditioning said processing unit for read out of said contents of said control memory for storing in said third area.

14. The system of claim 11 wherein a fourth one of said areas corresponds to a communications area, said area being coded to store signals representative of a channel mailbox printer word, said word including a plurality of bits, a number of said plurality of bits being coded to define the state of a channel included in another one of said areas of main memory; and, said group of microinstructions including microinstructions for synchronizing the operation of said host processor with said emulator, said decoder circuits in response to said microinstructions generating signals for switching said number of said channel mailbox pointer word bits to a predetermined state for signalling the inactive status of said channel to said host processor.

15. The system of claim 14 wherein a fifth one of said areas corresponds to a slave memory area coded for storing signals representative of said instructions of said target system program and data required for execution of said program by said processing unit.

16. The system of claim 6 wherein said processing unit further includes a plurality of registers for storing parameter information required for the processing of said program instructions and wherein a third one of said areas of said main memory corresponds to a status saving area, said third area including a plurality of locations coded to store values of parameters to be loaded into said control memory and said plurality of registers in accordance with the coding of said control command.

17. The system of claim 16 wherein a predetermined one of said number of bits of said control field portion when in said predetermined state specifies that said processing unit is required to be loaded with said values of parameters stored in said third one of said areas for proper execution of said instructions, said control store being conditioned by said predetermined one of said bits being in said predetermined state during execution of said first one of said sequences to reference a group of microinstructions of another one of said sequences and said decoder circuits in response to said microinstructions generating predetermined sets of signals for loading said values of parameters into said control memory and said plurality of registers as required for execution of said instructions.

18. The system of claim 17 wherein said predetermined sets of signals condition said input/output processing section to store successively signals representative of a different one of a series of predetermined types of target system instructions executable by said processing unit for loading of said values of parameters into said plurality of registers.

19. The system of claim 18 wherein said group of microinstructions includes a number of said first type of microinstructions similarly coded for conditioning said processing unit for loading said control memory with different ones of said values of parameters.

20. The system of claim 18 wherein said processing unit further includes interrupt control circuits including storage circuits coupled to said control interface and to said control circuits and wherein said values of parameters include state parameter signals coded for defining one of a plurality of interrupt modes for said processing unit, said control logic circuits including interrupt mode control circuits coupled to said decoder circuits, said interrupt mode control circuits being conditioned by signals from said decoder circuits during execution of said first one of said sequences to apply control signals to said control interface for conditioning storage circuits to store signals specifying said interrupt modes in accordance with said state parameter signal for conditioning said interrupt control circuits in the manner required for execution of said instructions.

21. The system of claim 20 wherein said interrupt storage circuits include a plurality of pairs of series coupled bistable devices, each pair for defining one of said plurality of interrupt modes, a first bistable device of each pair when in a first state defining a predetermined interrupt mode and a second bistable device of said each pair when in a first state defining that said predetermined interrupt mode is allowed, each said first bistable device being coupled to receive said signals from said interrupt mode control circuits and each said bistable device being coupled to receive signals from said decoder circuits and predetermined ones of said sequences including said first type of microinstructions for switching each said second bistable device to a state required for execution of said instructions.

22. The system of claim 6 wherein one of said plurality of memory areas corresponds to a communications area, said area being coded to store signals representative of a channel mailbox pointer word, said word including a plurality of bits, a number of said bits being coded to define the state of a channel included in another one of said areas of main memory and said plurality of said sequences including an initial microinstruction sequence, said decoder circuits being conditioned upon read out of said initial microinstruction sequence from said control store to generate signals for switching said number of said channel mailbox pointer word bits to a state for indicating the active status of said channel to said host processor.

23. The system of claim 16 wherein a first predetermined one of said number of bits of said control field portion when in said predetermined state specifies that said processing unit is to be cleared and wherein a second predetermined one of said number of bits when in said predetermined state specifies that said processing unit is to be initialized, said control store being conditioned by said first and second predetermined ones of said number of bits being in said predetermined state during execution of said first one of said sequences to reference a group of microinstructions of another one of said sequences, said decoder circuits in response to said microinstructions generating signals for clearing and initializing said plurality of registers of said processing unit in accordance with the coding of said control portion of said channel control command as required for execution of said instructions.

24. A system for executing instructions of a native and a target system program, said system including a host processor, a main memory and memory control means for operatively coupling said host processor to said main memory, said memory control means having a plurality of ports, a first port coupled to said host processor, said main memory including a plurality of memory areas, first and second areas storing said instructions of said native and target system programs, respectively, and a third area storing a plurality of channel commands, said plurality including at least one channel control command having a control portion coded to specify a number of possible operations required for initiating the execution of said target system program, said system further including processing apparatus for executing said target system program, said processing apparatus being coupled to a second port of said plurality of ports, said processing apparatus comprising:
a microprogrammed adapter means for executing said plurality of said channel commands fetched from said third area, said adapter means including:
an addressable control store unit having a plurality of storage locations for storing a plurality of microinstruction sequences; branch and test control means for controlling the addressing of said control store during the execution of each said channel command, and for testing the presence of operations coded in the control portion of said channel control command for establishing next microinstruction sequences to be referenced;
decoder circuit means coupled to said control store unit for generating command control signals in response to the read out of said plurality of microinstruction sequences;
control logic circuits coupled to said decoder circuit means; and,
a control interface coupled to said decoder circuit means and to said control logic circuits; and,
a non-microprogrammed processing means coupled to said adapter means, said processing means including facilities for executing a number of different types of said instructions of said target system program, said processing means comprising:
arithmetic and logic means for performing arithmetic and logic operations upon operands applied thereto, said arithmetic and logic means being coupled to said control interface;
control memory means for storing information required for execution of said instructions, said control memory means being coupled to said arithmetic and logic means and to said control interface; and,
decode and cycle control means for generating signals required for the execution of said instructions, said decode and cycle control means being coupled to said arithmetic and logic means, to said control memory means, and to said control interface;
said branch control means being responsive to said one channel control command fetched from said main memory to condition said control store unit to branch to microinstructions of a first sequence designated to test said control portion of said channel control command to determine those operations required to be performed by said adapter means for initiating execution of said target system program by said non-microprogrammed processing means.

25. The system of claim 24 wherein said channel control command further includes an op code portion coded to specify a control operation and wherein said control field portion includes a number of bits, each bit being coded to specify a different one of said number of operations, said first sequence including a plurality of control type of microinstructions coded to test the states of different ones of said number of bits.

26. The system, of claim 25 wherein said first sequence includes a plurality of first type of microinstructions, each having an op code portion coded to specify a direct control operation and a command portion coded to specify commands required for initiating the execution of different ones of said operations.

27. The system of claim 26 wherein said decode and cycle means includes circuits for generating a predetermined signal on said control interface indicating that said nonmicroprogrammed processing means has completed execution of the operation specified by any one of said first type of microinstructions.

28. The system of claim 27 wherein said control logic circuits include means for detecting the presence of said predetermined signal, said means for detecting being coupled to condition said branch control means to branch to another one of said plurality of sequences for execution of another one of said operations.

29. The system of claim 28 wherein each of said number of bits when in a predetermined state conditioning said branch control means to cause said control store unit to reference a predetermined one of said plurality of sequences required for performance of the operation specified by said each bit.

30. The system of claim 29 wherein a fourth one of said areas corresponds to status saving area, said fourth area including a plurality of locations coded to store values of parameters and wherein a first one of said number when in said predetermined state specifies that said microprogrammed adapter is to store said values of parameters in said non-microprogrammed processing means, said branch control means in response to said first one of said number conditioning said control store unit to reference a first predetermined one of said plurality of said sequences, said decoder circuit means in response to said first predetermined sequence generating first predetermined sets of signals for loading said values of parameters into said control memory means.

31. The system of claim 30 wherein a second one of said number when in said predetermined state specifies that said microprogrammed adapter is to store signals representative of the contents of said control memory means, said branch control means in response to said second one of said number conditioning said control store unit to reference a second predetermined one of said plurality of said sequences, said decoder circuit means in response to said second predetermined sequence generating second predetermined sets of signals for read out of said contents of said control memory means to said fourth area.

32. The system, of claim 31 wherein said non-microprogrammed processing means further includes a plurality of registers for storing information required for the processing of said instructions and wherein said adapter further includes an input/output processing section coupled to said control store unit and to said decoder circuit means, said different ones of said first and second predetermined sets of signals successively conditioning said input/output processing means to store signals representative of different types of target system instructions for execution by said non-microprogrammed processing means for storage of said values of parameters in said registers and read out of the content of said registers, respectively.

33. The system of claim 32 wherein said first and second predetermined sequences, each includes said first type of microinstructions, each having a control portion coded to specify a command for initiating execution of one of said series of instructions stored by said processing section by said non-microprogrammed processing means.

34. The system of claim 30 wherein other ones of said number when in said predetermined state specify that said adapter is to initiate the execution of one or more of said instructions starting at a point defined by a predetermined one of said values of parameters previously stored in said control memory means, said branch control means being conditioned by one of said other ones of said control store unit to reference a second one of said sequences following the initiation of instruction execution for generating control signals for monitoring the operation of said non-microprogrammed processing means during an execution phase of said channel control command.

35. The system of claim 29 wherein a first predetermined one of said number of bits when in said predetermined state specifies that said adapter means in to clear said non-microprogrammed processing means, said branch control means in response to said first predetermined one of said number to cause said control store unit to branch to a predetermined one of said plurality of sequences, said decoder circuit means generating signals in response to said predetermined one of said sequences for conditioning said control logic circuits to apply a clear signal to said control interface.

36. The system of claim 35 wherein a second predetermined one of said number of bits when in said predetermined state specifies that said adapter means is to initialize said non-microprogrammed processing means to a predetermined state, said branch control means in response to said second one of said number to cause said control store unit to branch to a predetermined one of said plurality of sequences, said decoder circuit means generating signals in response to said predetermined one of said sequences for conditioning said control logic circuits to apply an initialize signal to said control interface.

37. The system of claim 36 wherein said predetermined one of said plurality of sequences includes said first type of microinstruction, said first type of microinstruction having a control portion coded to specify a command for placing said non-microprogrammed processing means in a stop state, said decoder circuit means in response to said first type of microinstruction generating signals for conditioning said control logic circuits to apply a stop signal to said control interface.

38. A system for executing instructions of a native and a foreign system program, said system including a host processor for processing said instructions of said native program while being operated in a normal mode of operation, a main memory and memory control means for operatively coupling said host processor to said memory control means, said memory control means having a plurality of ports, a first port coupled to said host processor, said main memory including a plurality of memory areas, first and second areas storing said instructions of said native and foreign system programs, respectively, and a third area storing a plurality of channel commands, said plurality including at least one channel control command having a control portion coded to specify a number of possible operations required for initiating the execution of said target system program, said system further including processing adapter apparatus for executing said target system program, said apparatus being coupled to a second port of said plurality of ports, said processing apparatus comprising:

a microprogrammed processing unit for executing said plurality of said channel commands fetched from said third area, said microprogrammed processing unit including:

addressable control store having a plurality of storage locations for storing a plurality of microinstruction sequences;

branch and test control means for controlling the addressing of said control store during the execution of each said channel command, and for testing the presence of operations coded in the control portion of said channel control command for establishing next microinstruction sequences to be referenced;

decoder circuit means coupled to said control store for generating control signals in response to the read out of said plurality of microinstruction sequences;

logic circuits coupled to said decoder circuit means; and, a control interface coupled to said decoder circuit means and to said logic circuits; and,
a processor for executing said instructions of said foreign program, said processor comprising:
arithmetic and logic means for performing arithmetic and logic operations upon operands applied thereto, said arithmetic and logic means being coupled to said control interface;
memory means for storing information required for execution of said instructions, said memory means being coupled to said arithmetic and logic means and to said control interface; and,
decode and cycle control means for generating signals required for the execution of said instructions, said decode and cycle control means being coupled to said arithmetic and logic means, to said memory means, and to said control interface;
said branch control means being responsive to said one channel control command fetched from said main memory to reference a first one of said plurality of sequences, said first sequence including a plurality of control type microinstructions for testing said control portion of said channel control command to determine those operations required to be performed by said microprogrammed processing unit, said decoder circuit means responsive to the results of said testing to generate signals for conditioning said branch control means to cause said control store to reference other ones of said plurality of said sequences for conditioning said logic circuits to apply signals to said control interface for presetting said memory means, said arithmetic and logic means and said decode and cycle control means to the proper operational state for execution of said foreign program.

39. The system of claim 38 wherein different ones of said plurality each includes a first type of microinstruction having an op code portion for specifying a direct control operation and a control portion coded to specify commands for conditioning said logic circuits to apply signals to said control interface for initiating different ones of said operations by said processor.

* * * * *